United States Patent [19]
Runyon et al.

[11] Patent Number: 5,969,642
[45] Date of Patent: *Oct. 19, 1999

[54] AIRFIELD LIGHTING SYSTEM

[75] Inventors: Edwin K. Runyon, Gahanna; Harold R. Williams, Columbus; Todd E. McCorkle, Newark; Mark E. Weihs, Toledo; Earl R. Williams, Columbus, all of Ohio

[73] Assignee: Siemens Energy & Automation, Inc., Alpharetta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/722,400

[22] Filed: Sep. 30, 1996

Related U.S. Application Data

[63] Continuation of application No. 08/503,759, Jul. 18, 1995, abandoned, which is a continuation of application No. 08/059,023, May 6, 1993, Pat. No. 5,485,151.

[51] Int. Cl.$^6$ .................................. B64F 1/18; G08G 5/00
[52] U.S. Cl. ......................... 340/953; 315/130; 340/642; 340/933; 340/947
[58] Field of Search ..................................... 340/947, 953, 340/642, 931, 933; 315/130; 244/114 R

[56] References Cited

U.S. PATENT DOCUMENTS 3,715,741  2/1973  McWade et al. ....................... 340/642
3,771,120  11/1973  Bonazoli et al. .

(List continued on next page.)

FOREIGN PATENT DOCUMENTS

| 0 284 592 | 9/1988 | European Pat. Off. . |
|---|---|---|
| 0 437 214 A2 | 7/1991 | European Pat. Off. . |
| DD-A-125444 | 12/1997 | European Pat. Off. . |
| 2689643 | 10/1993 | France . |
| 470324 | 1/1929 | Germany . |
| 2 931 445 B1 | 10/1980 | Germany . |
| 4 109 586 A1 | 10/1992 | Germany . |
| 64-88900 | 4/1989 | Japan . |
| 367430 | 2/1932 | United Kingdom . |
| 568622 | 4/1945 | United Kingdom . |
| 1057401 | 2/1967 | United Kingdom ................... 340/953 |
| 1424802 | 2/1976 | United Kingdom . |
| 2 174 852 | 11/1986 | United Kingdom . |
| PCT/SE89/ 00546 | 4/1990 | WIPO . |
| PCT/SE90/ 00582 | 4/1991 | WIPO . |

OTHER PUBLICATIONS

Airport Technology, "Stop Bar—Utilizing Smart Power Technique Concept".
Airport Technology, "Taxiway Guidance—Uilizing Smart Power Technique Concept".
"Automatic Monitoring System for the CCR and Aerodrome Lighting System on Airport System"; Nobuyuki Matsunaga, Yorio Hosokawa and Osafumi Takemoto, 1980.
"A New System For Selective Control of Taxiway Lights"; Goran Eriksson, 1988.
"The Swedish Approach To Airfield Lighting Control"; N. Goran Eriksson.
"The Swedish Approach To An SMGC System"; Gorn Eriksson, Jul. 29, 1989.
Engineering and Automation, vol. 14, No. 3/04. May 1, 1992, pp. 24–27, H. Kieswalter, "Operations Monitoring System For Safe Airport Lighting".

Primary Examiner—Brent A. Swarthout

[57] ABSTRACT

A microprocessor-controlled airfield lighting control and monitoring system having bi-directional communication between the controlling microprocessor and the airfield lights and/or sensors. The system also includes a metal container for the remote control microprocessor and an improved attachment arrangement for the power transistor associated therewith. A DC power supply is connected to the remote controller microprocessor and has an integrated circuit adapted to sense a threshold voltage, which causes the power transistor to short around the associated power source.

24 Claims, 50 Drawing Sheets

U.S. PATENT DOCUMENTS

| | | |
|---|---|---|
| 3,819,980 | 6/1974 | Mullersman . |
| 3,943,339 | 3/1976 | Koerner et al. .......................... 340/939 |
| 4,085,389 | 4/1978 | Kuroda et al. .......................... 325/182 |
| 4,216,413 | 8/1980 | Plas . |
| 4,242,614 | 12/1980 | Vatis et al. . |
| 4,295,079 | 10/1981 | Otsuka et al. . |
| 4,297,632 | 10/1981 | Glaser et al. . |
| 4,330,778 | 5/1982 | Yamazaki et al. . |
| 4,363,105 | 12/1982 | Plassmeier . |
| 4,396,868 | 8/1983 | Watanabe et al. . |
| 4,418,333 | 11/1983 | Schwarzbach . |
| 4,449,073 | 5/1984 | Mongoven et al. . |
| 4,466,071 | 8/1984 | Russell, Jr. . |
| 4,481,516 | 11/1984 | Michelotti . |
| 4,590,471 | 5/1986 | Pieroway et al. . |
| 4,646,088 | 2/1987 | Inoue . |
| 4,675,574 | 6/1987 | Delflache ................................ 340/642 |
| 4,901,257 | 2/1990 | Chang et al. .......................... 364/557 |
| 4,939,505 | 7/1990 | Cappellini et al. ..................... 340/642 |
| 4,951,046 | 8/1990 | Lambert et al. . |
| 5,220,321 | 6/1993 | Sauer ..................................... 340/931 |
| 5,239,236 | 8/1993 | Backstrom et al. . |
| 5,243,340 | 9/1993 | Norman et al. ........................ 340/642 |
| 5,426,429 | 6/1995 | Norman et al. ........................ 340/642 |
| 5,485,151 | 1/1996 | Runyon et al. ........................ 340/642 |

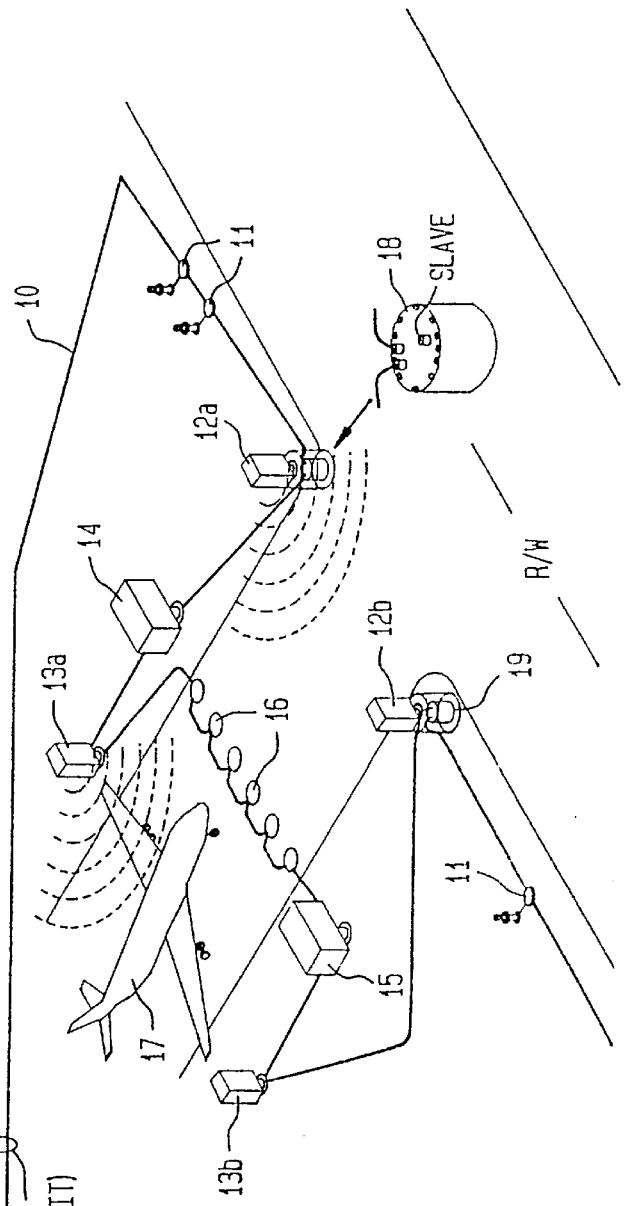
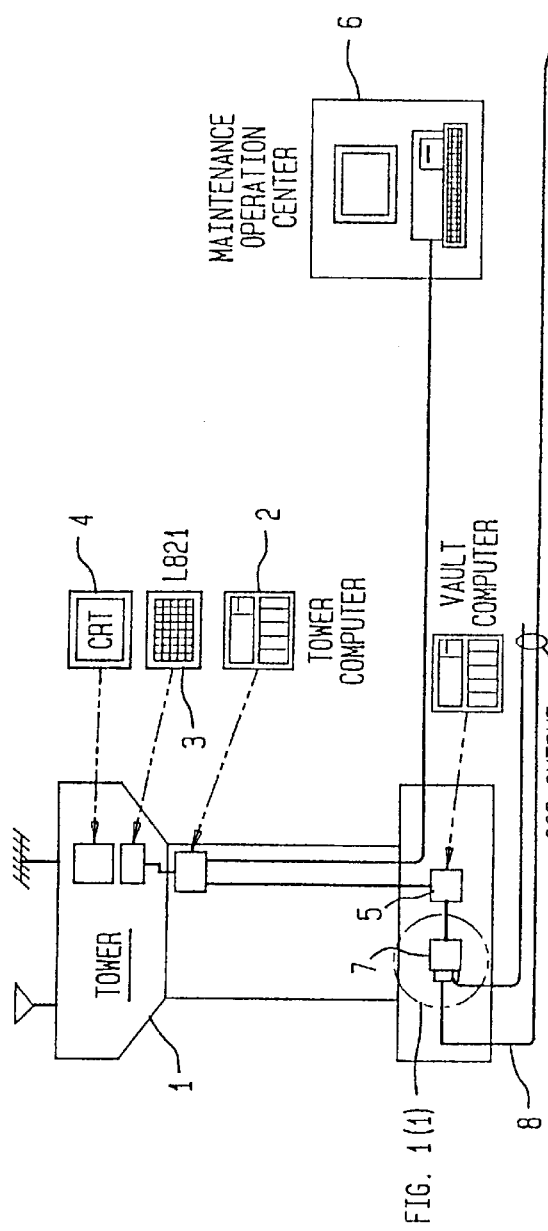
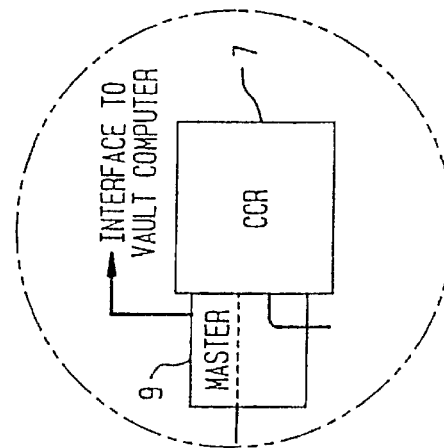
FIG. 1
FIG. 1(1)

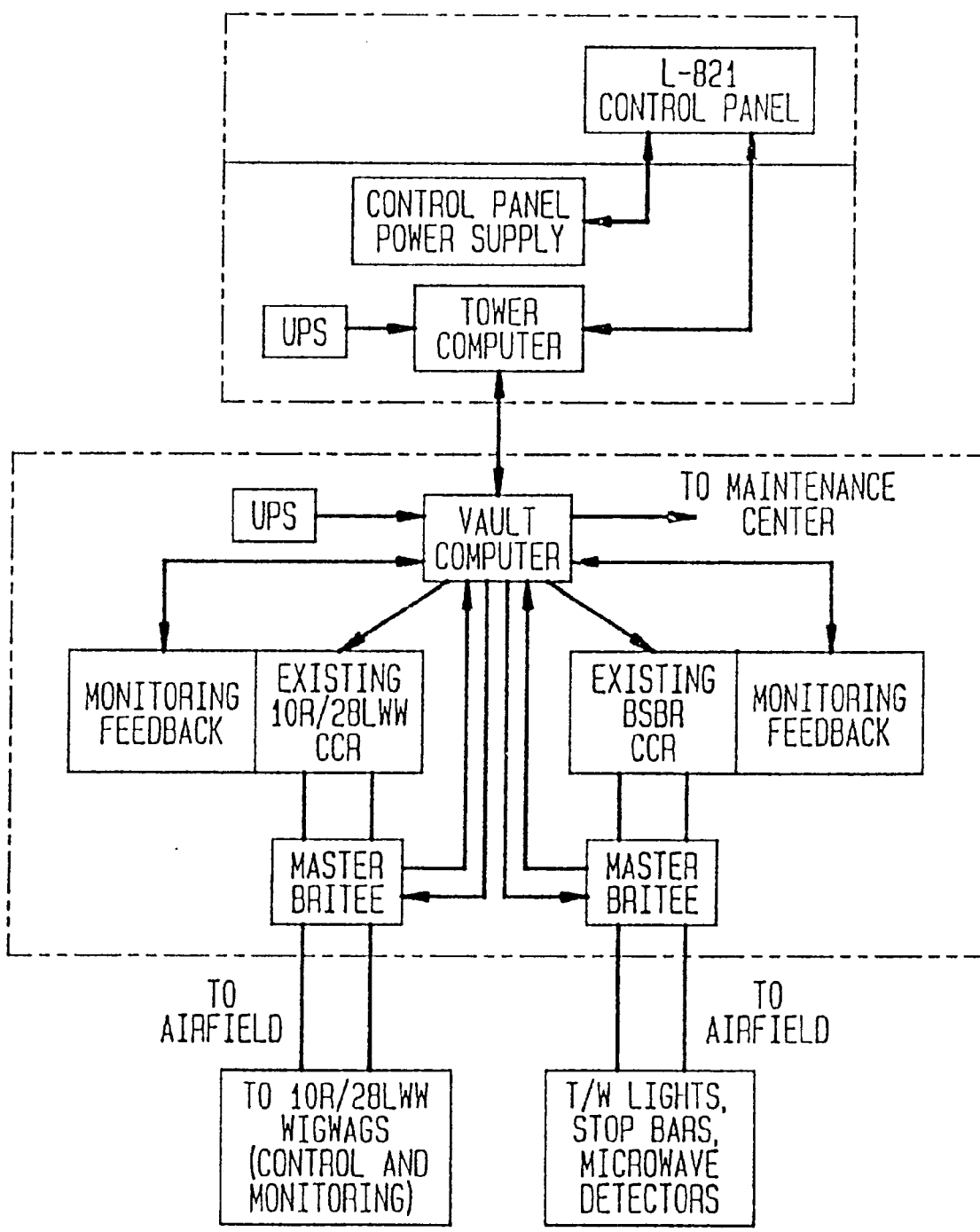
FIG. 1B1
BLOCK DIAGRAM

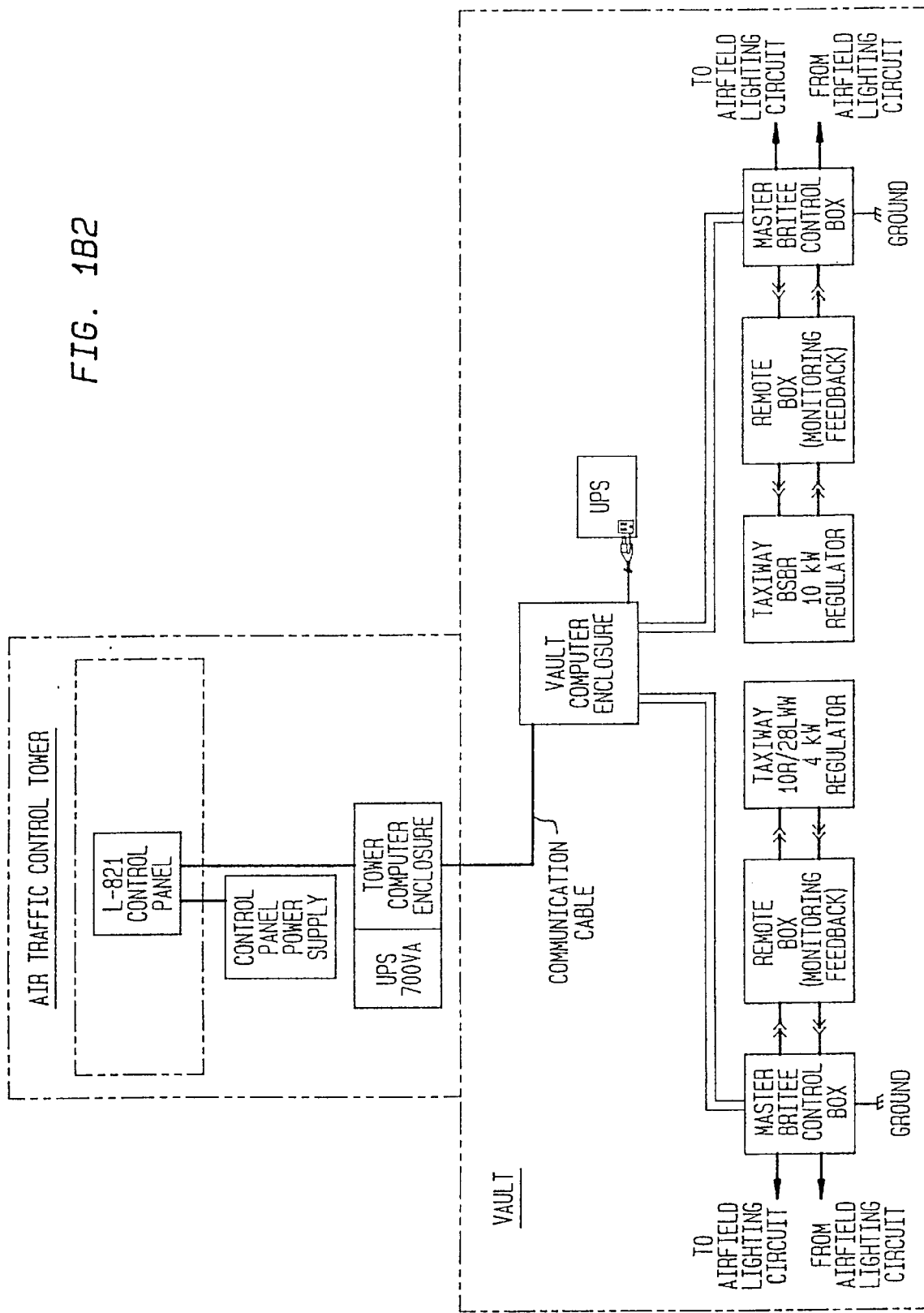

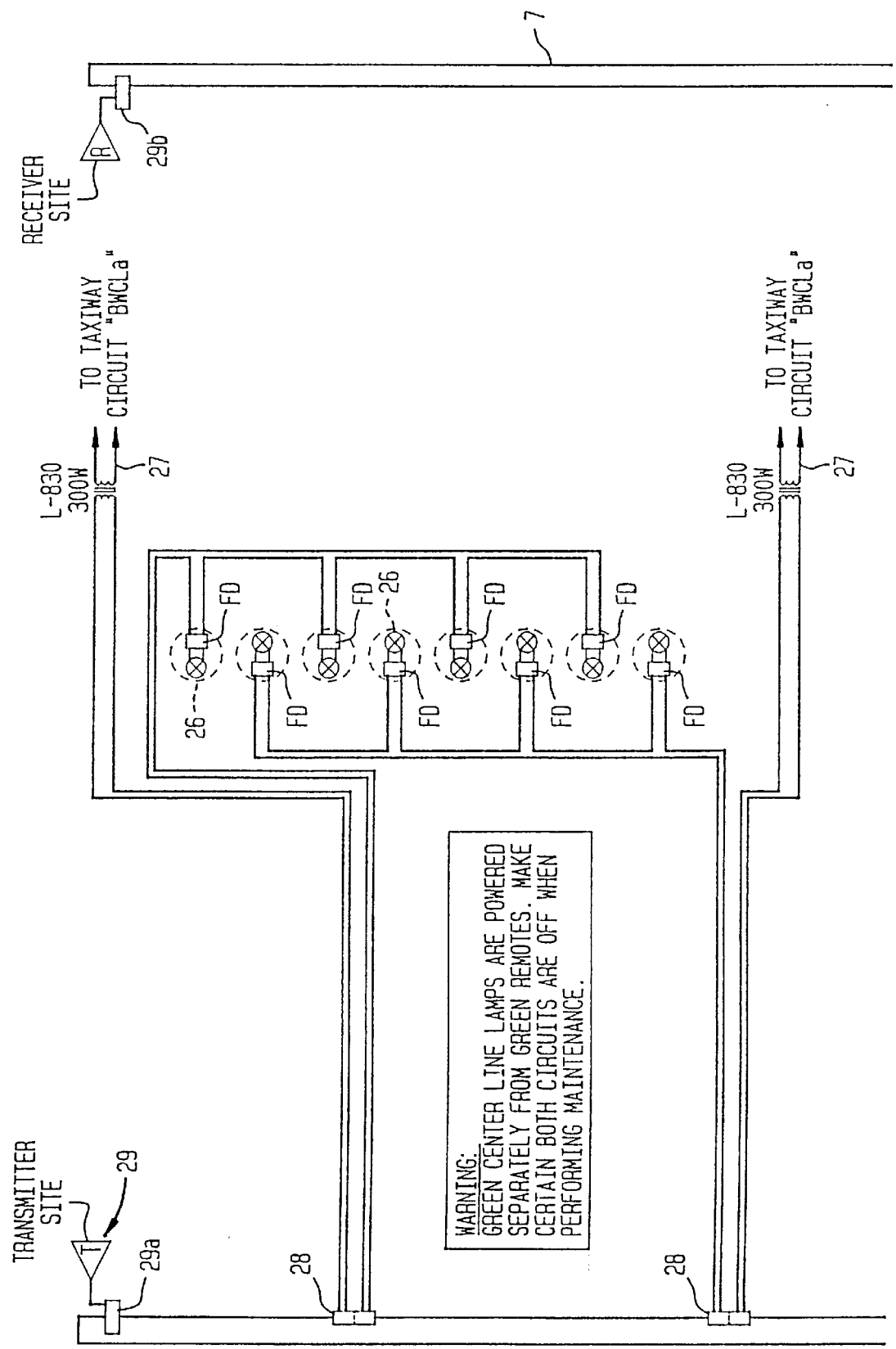

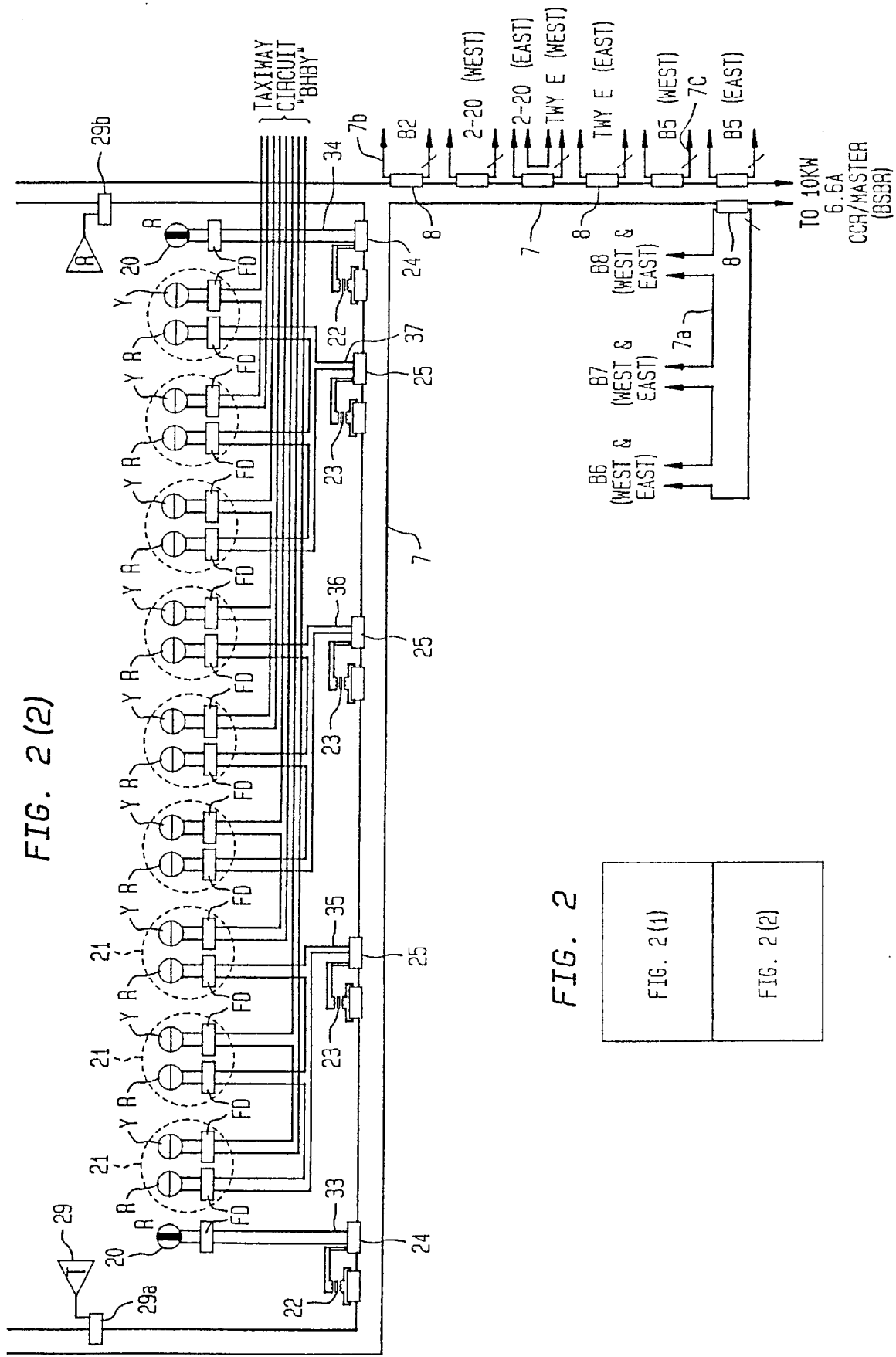

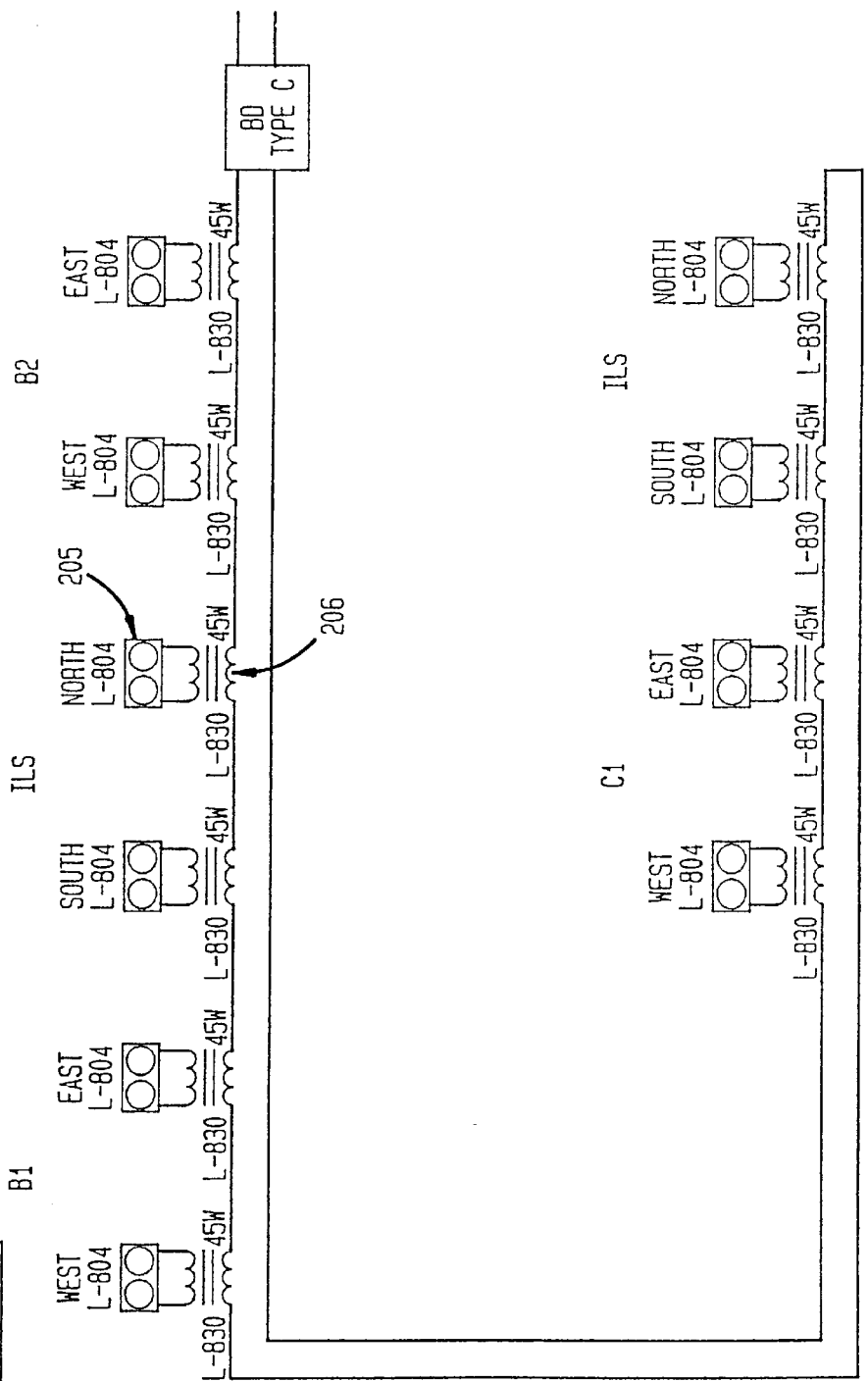
FIG. 2B1

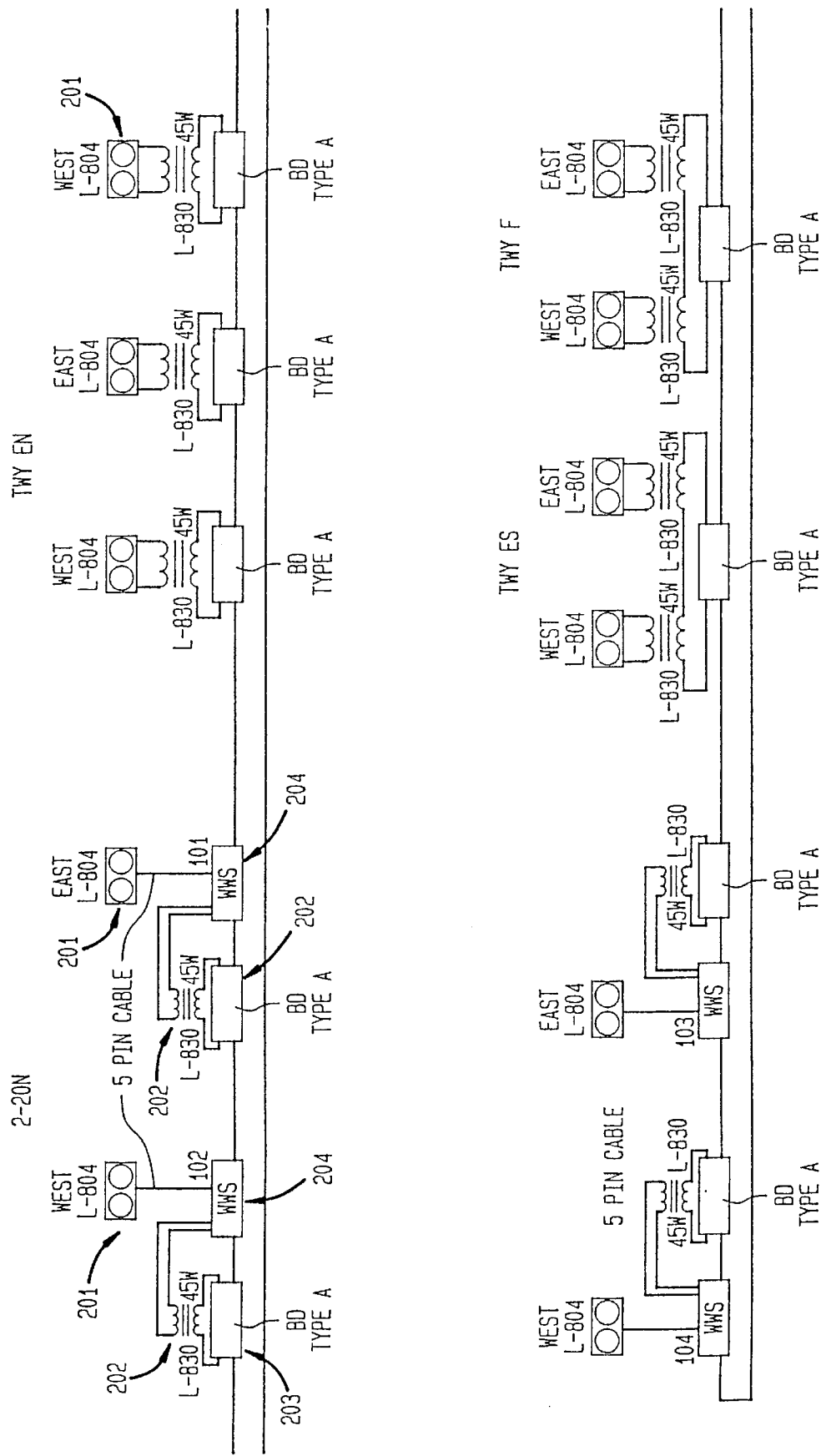
FIG. 2B2

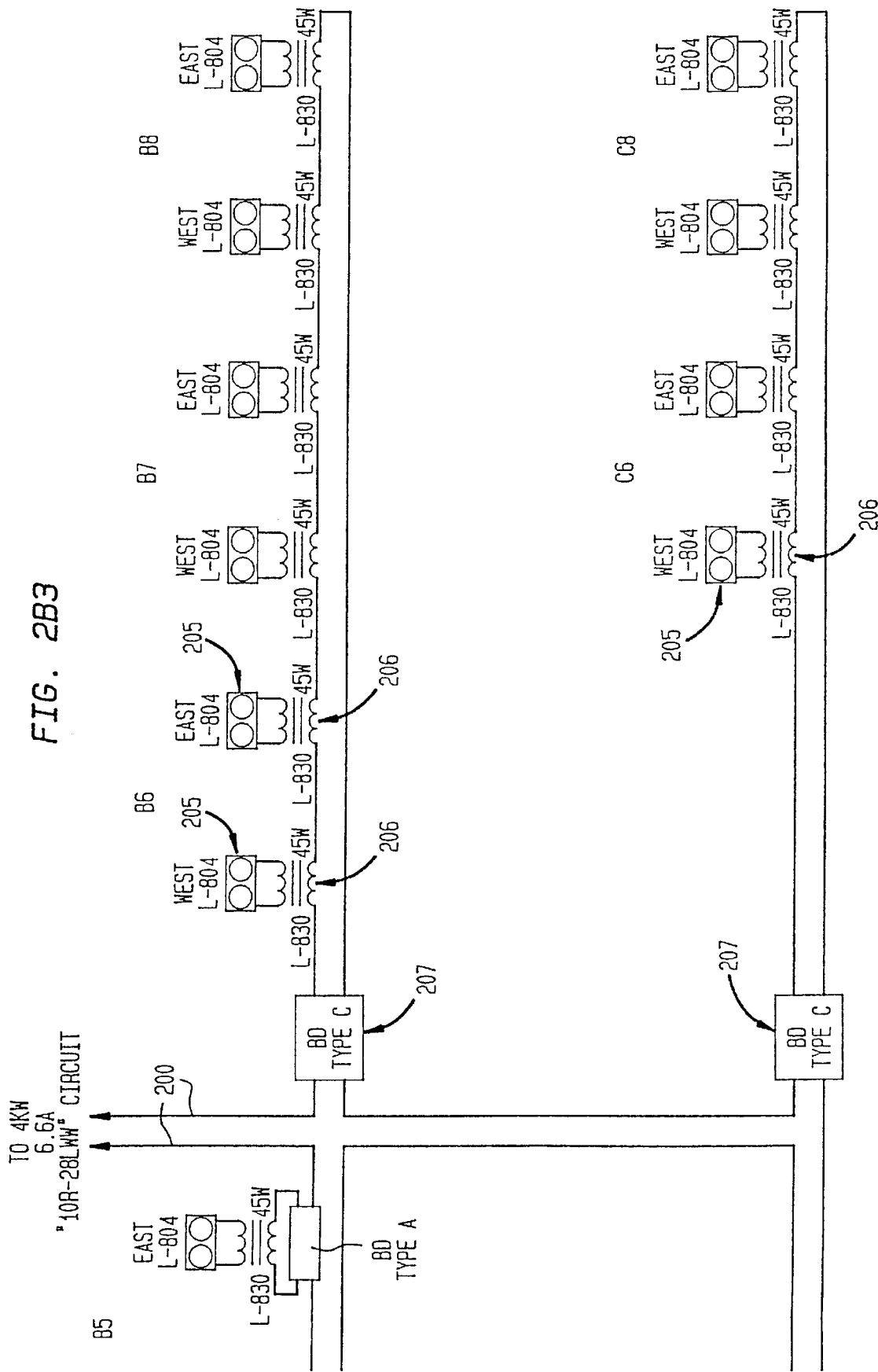
FIG. 2B3

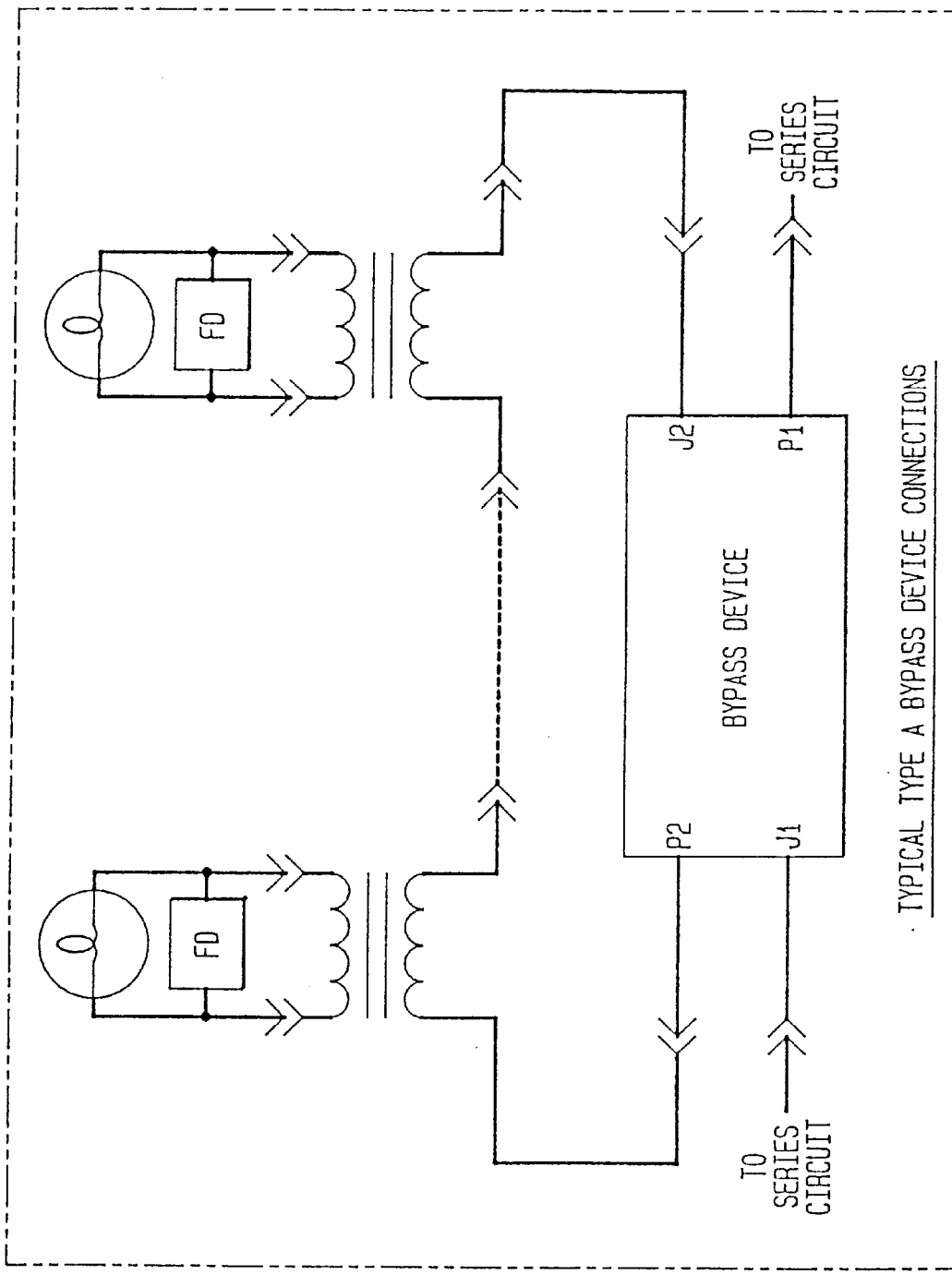

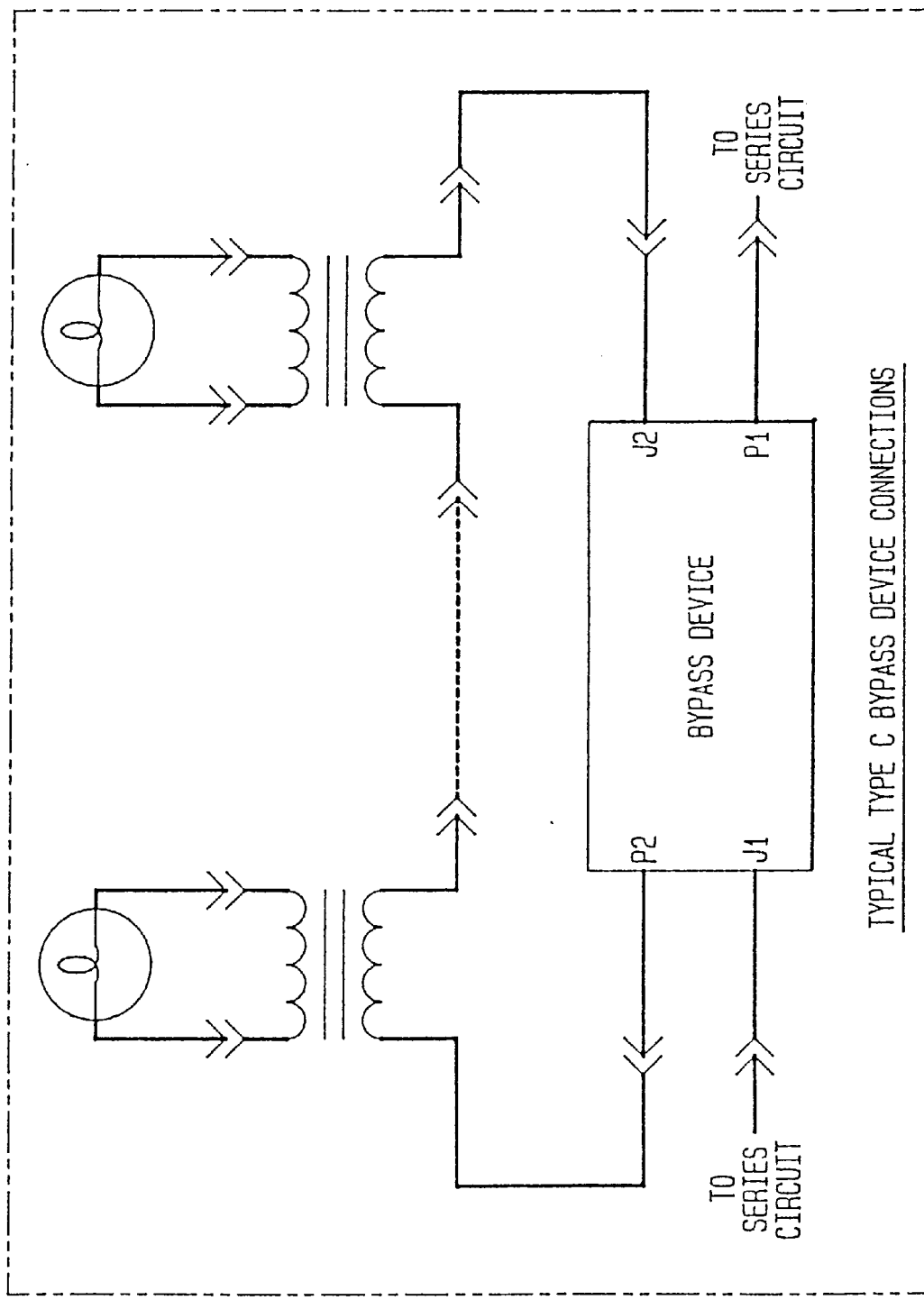

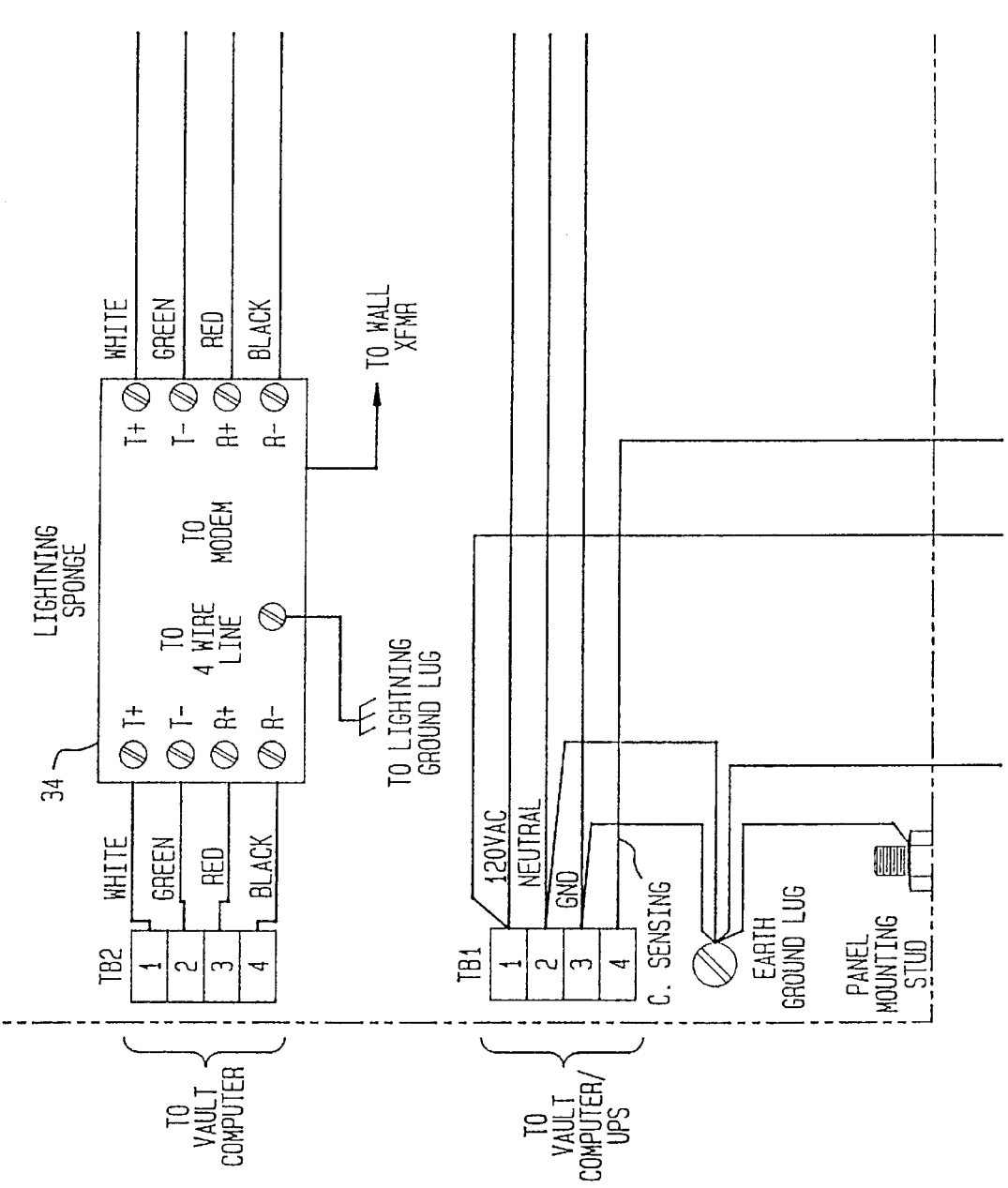
FIG. 3 (1)

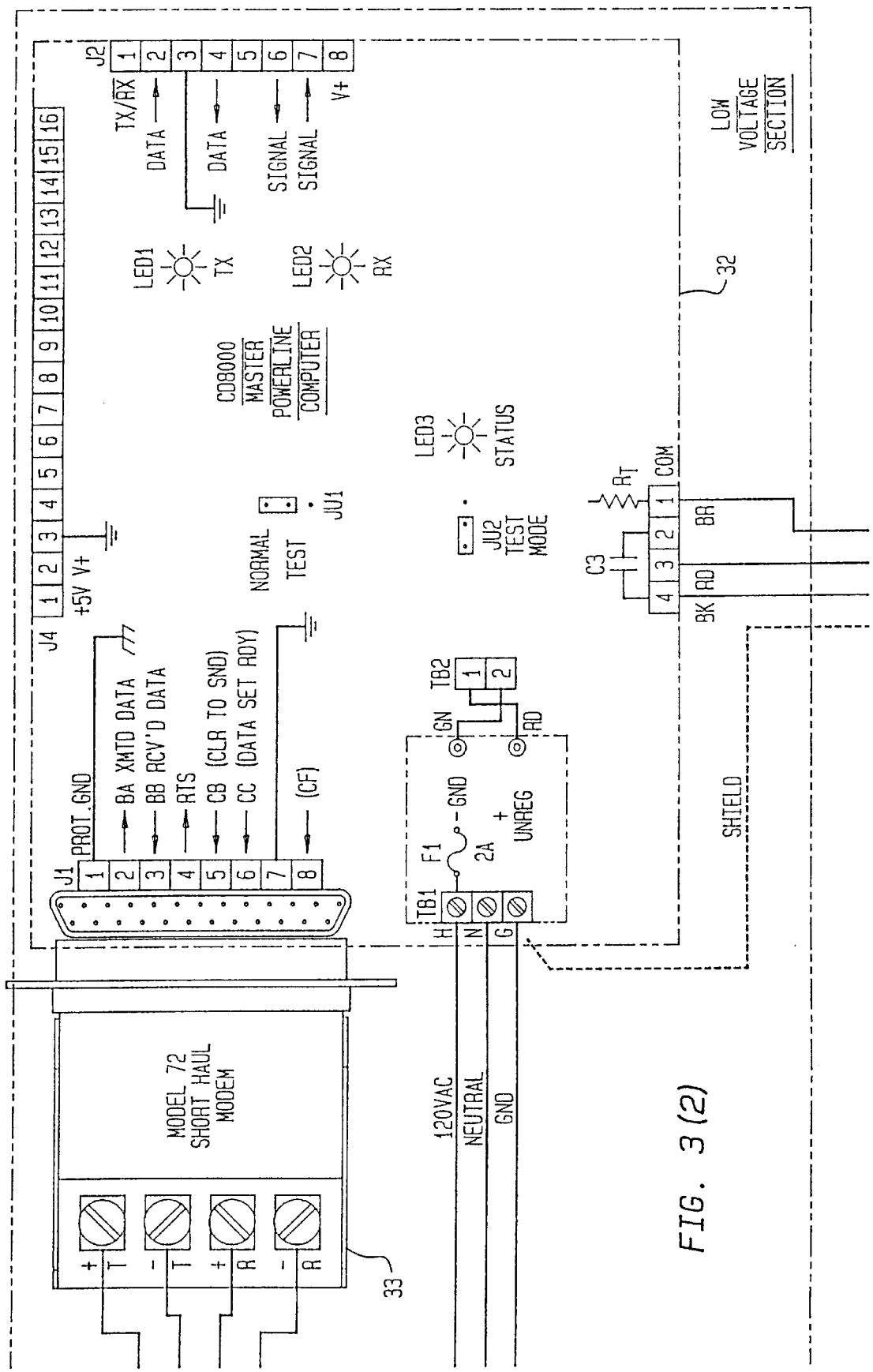
FIG. 3 (2)

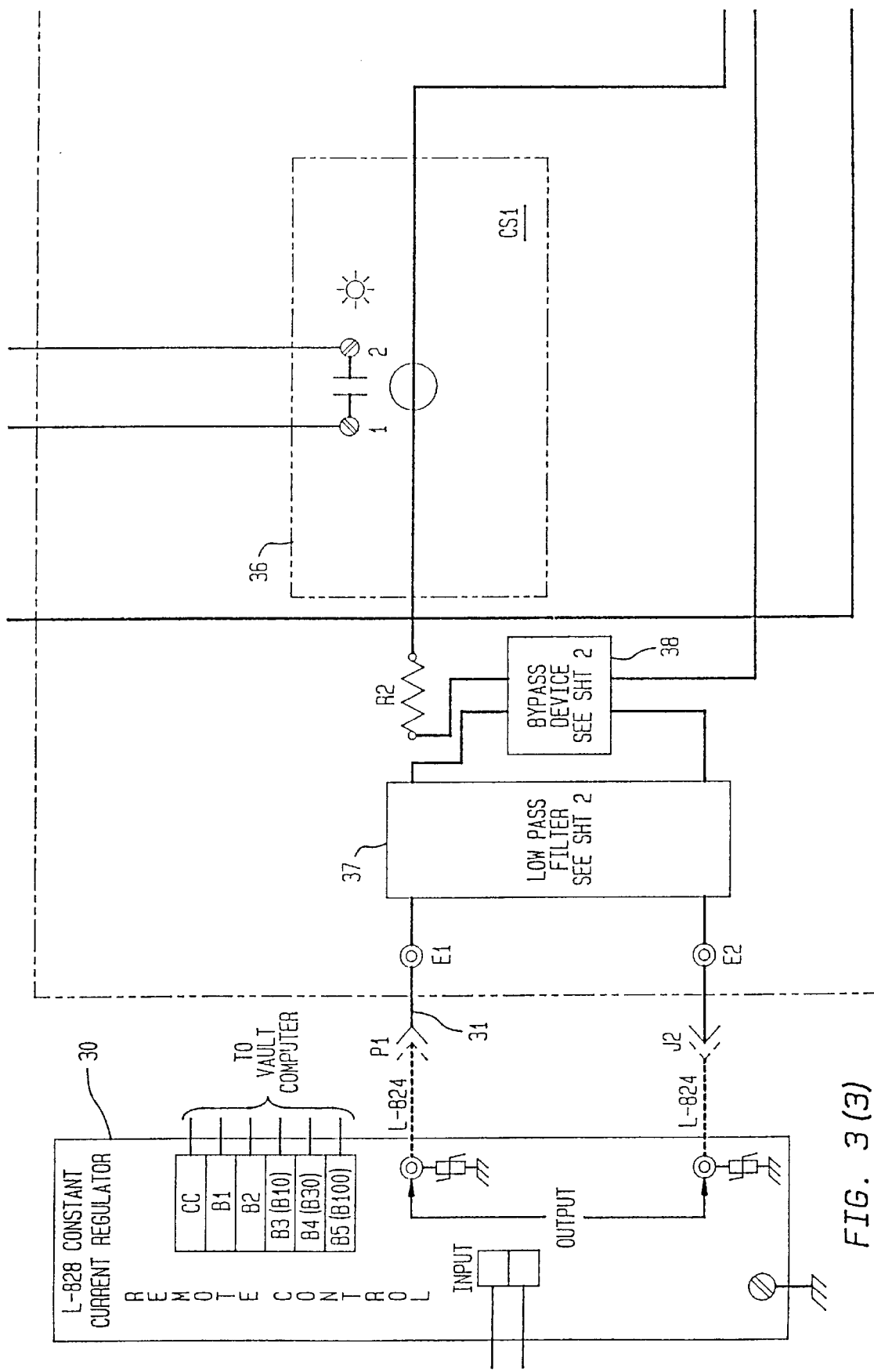
FIG. 3 (3)

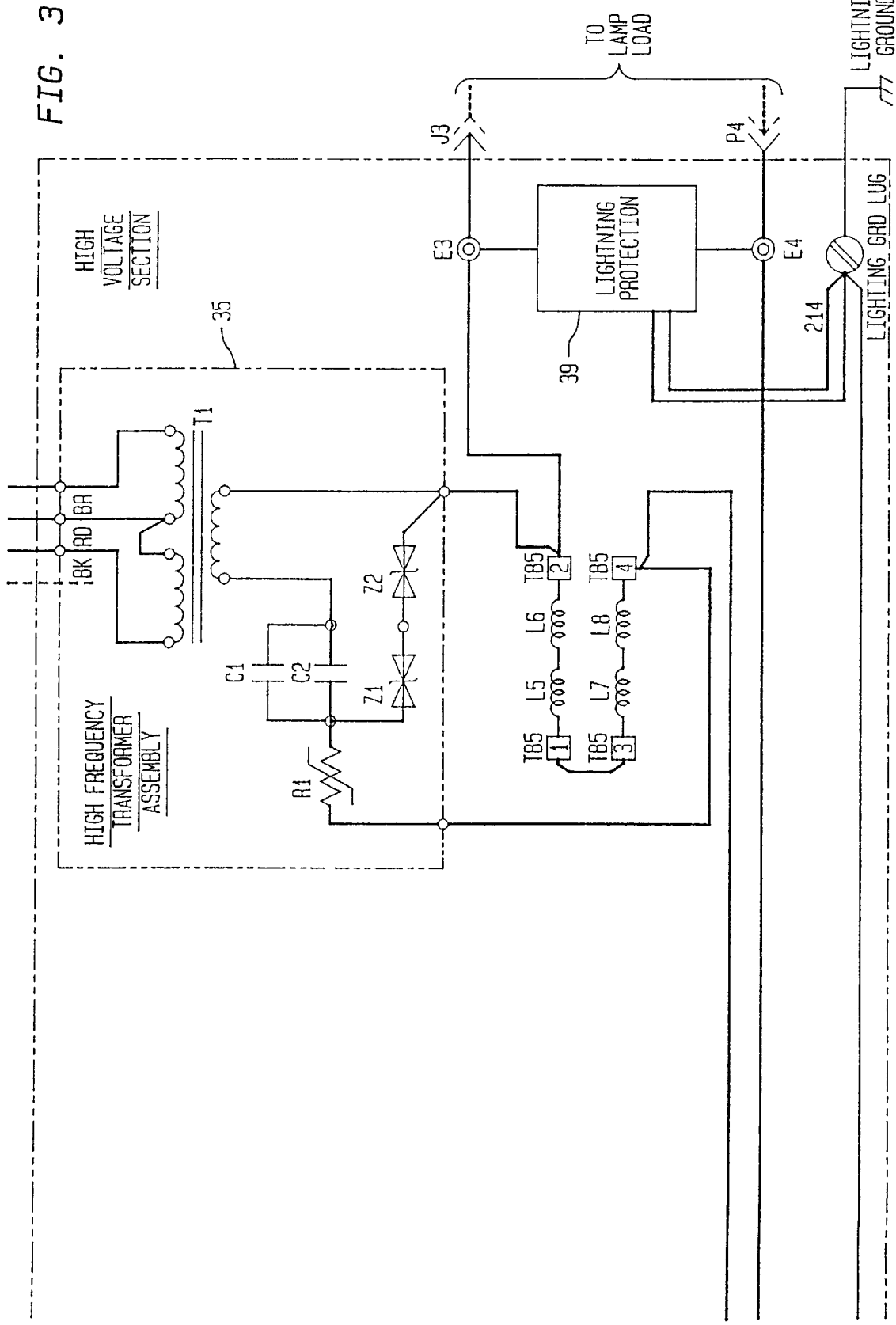
FIG. 3 (4)

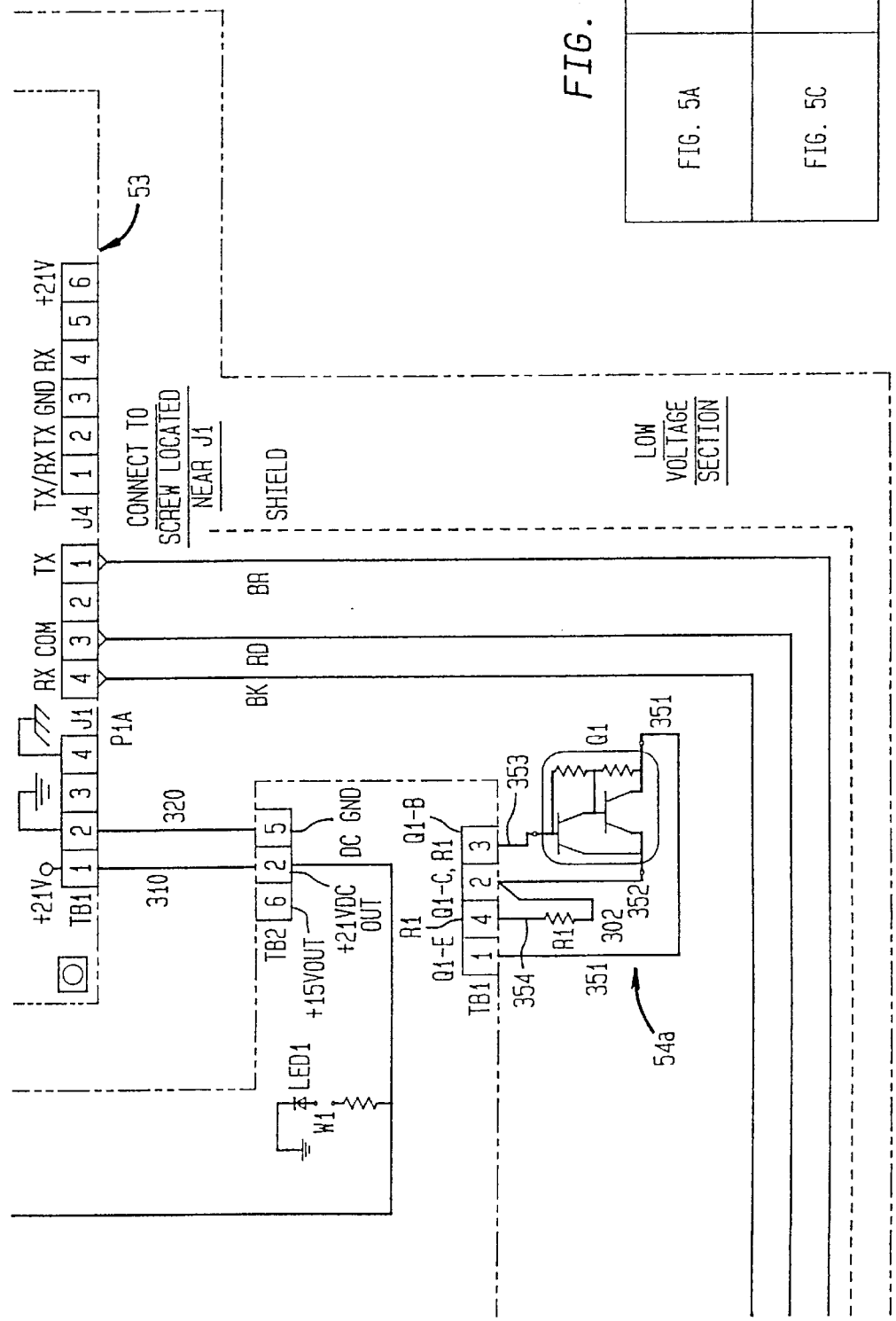

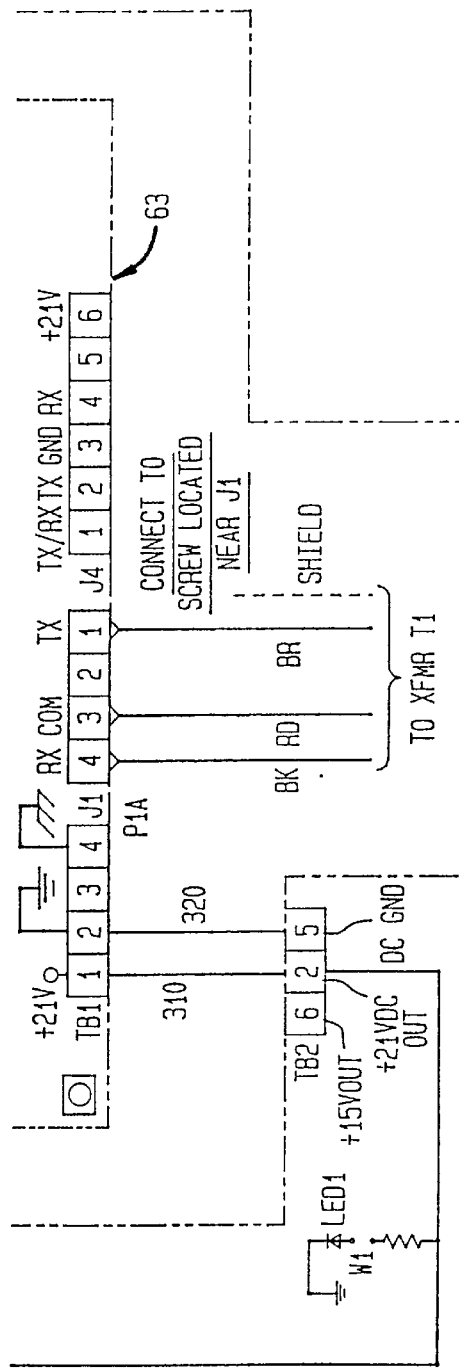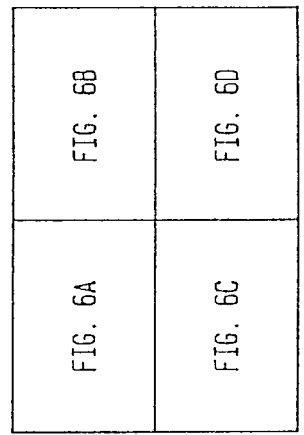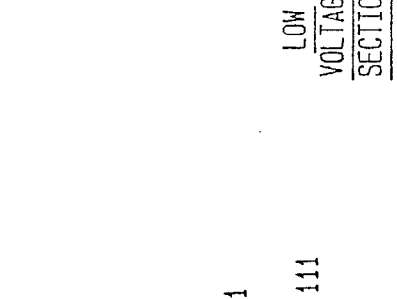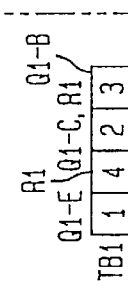
FIG. 6D

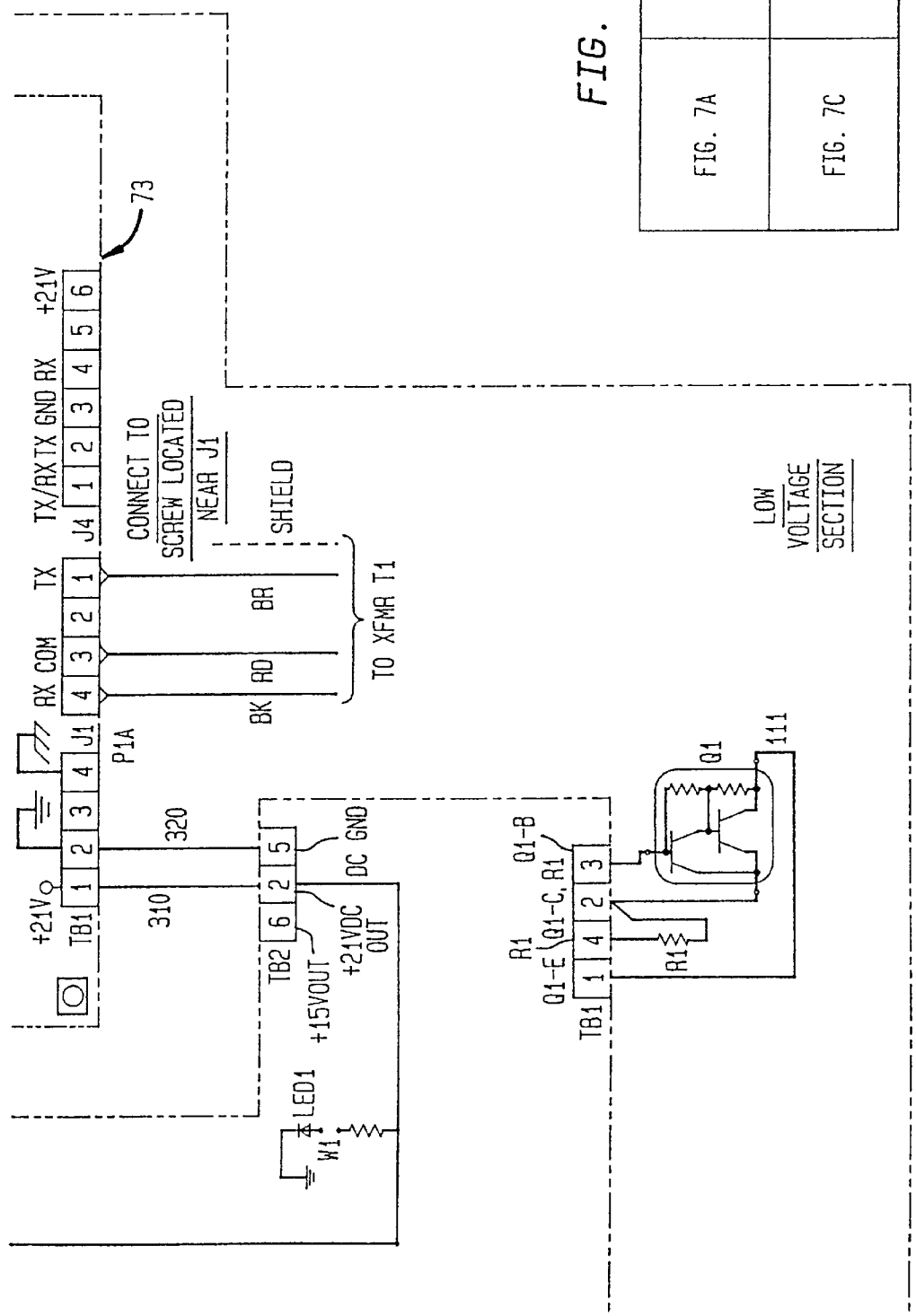

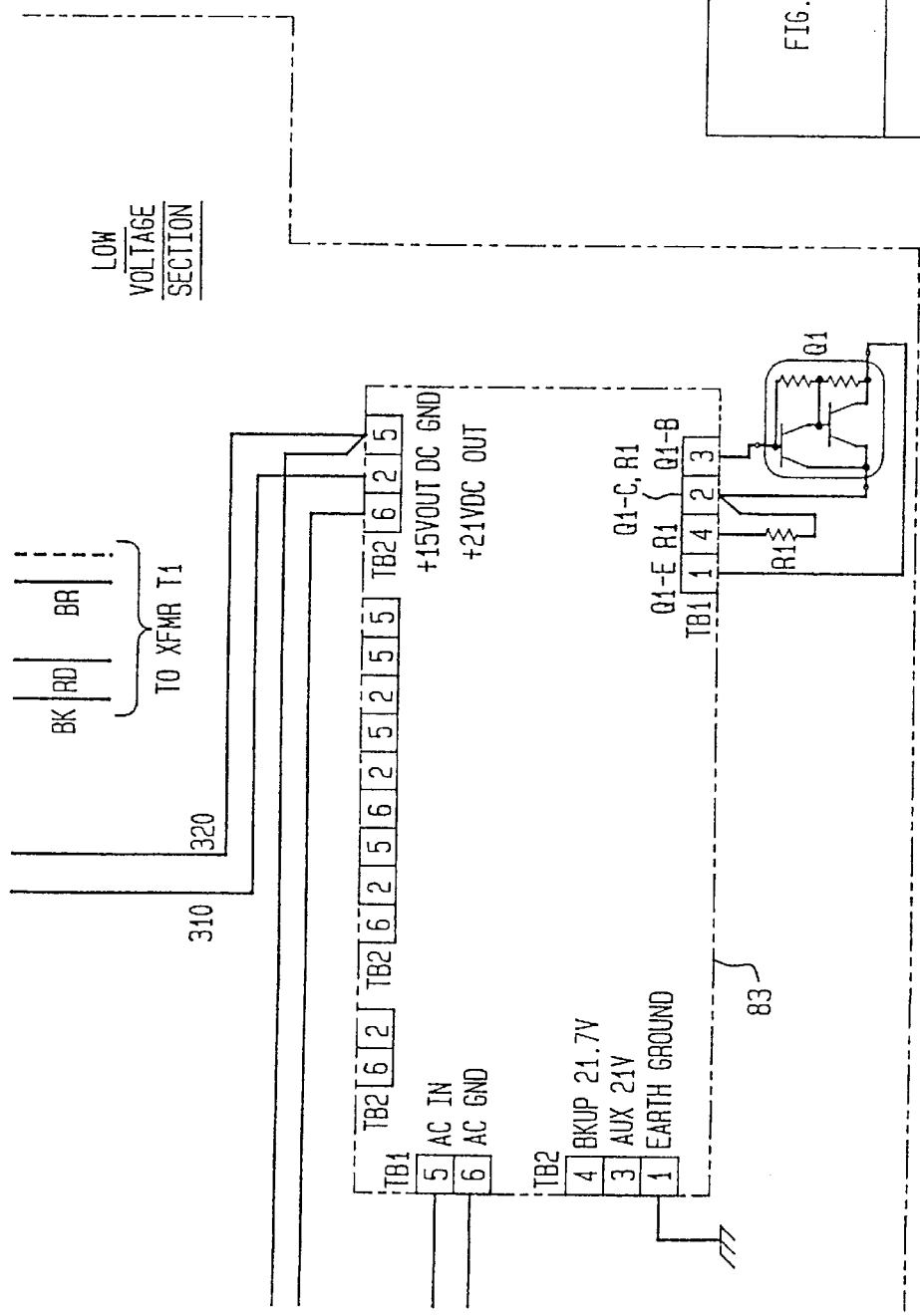

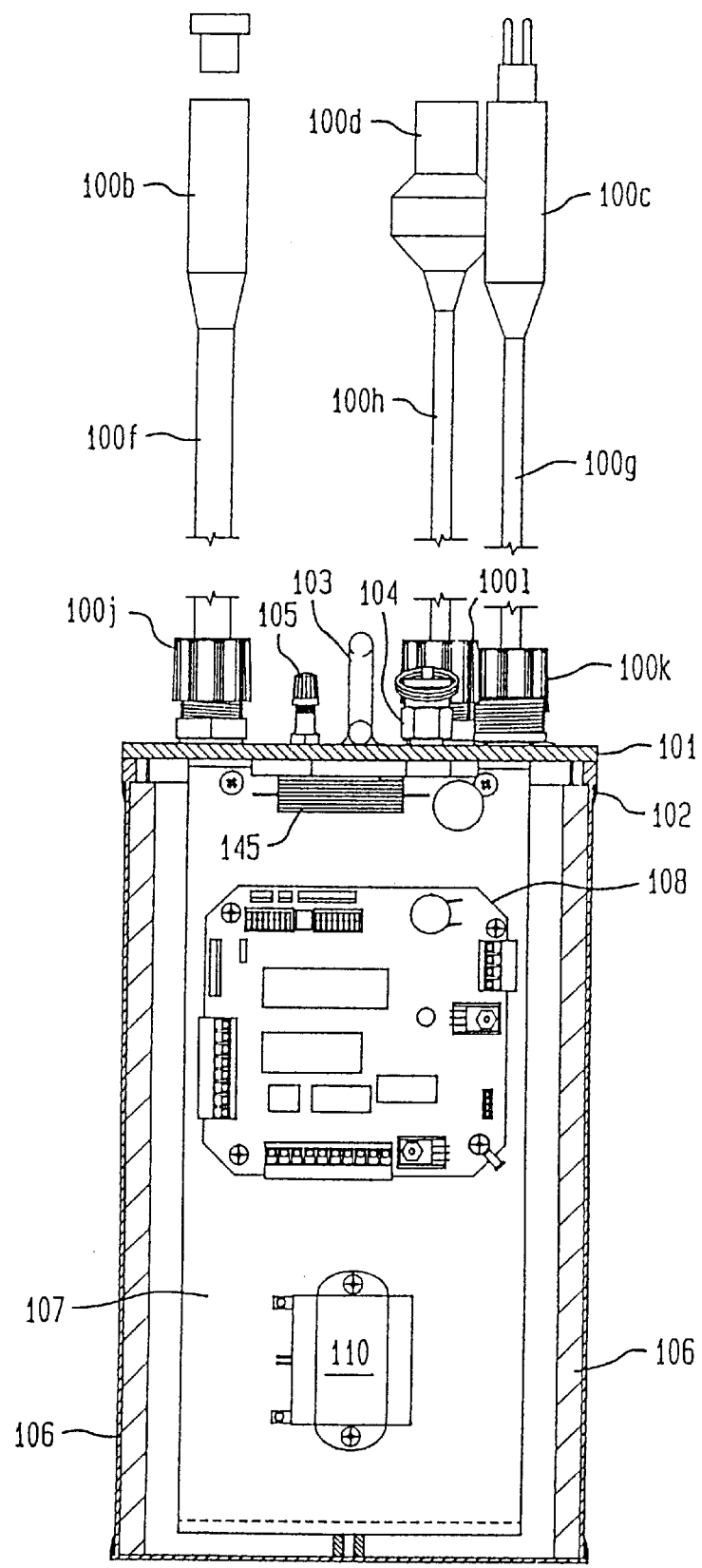

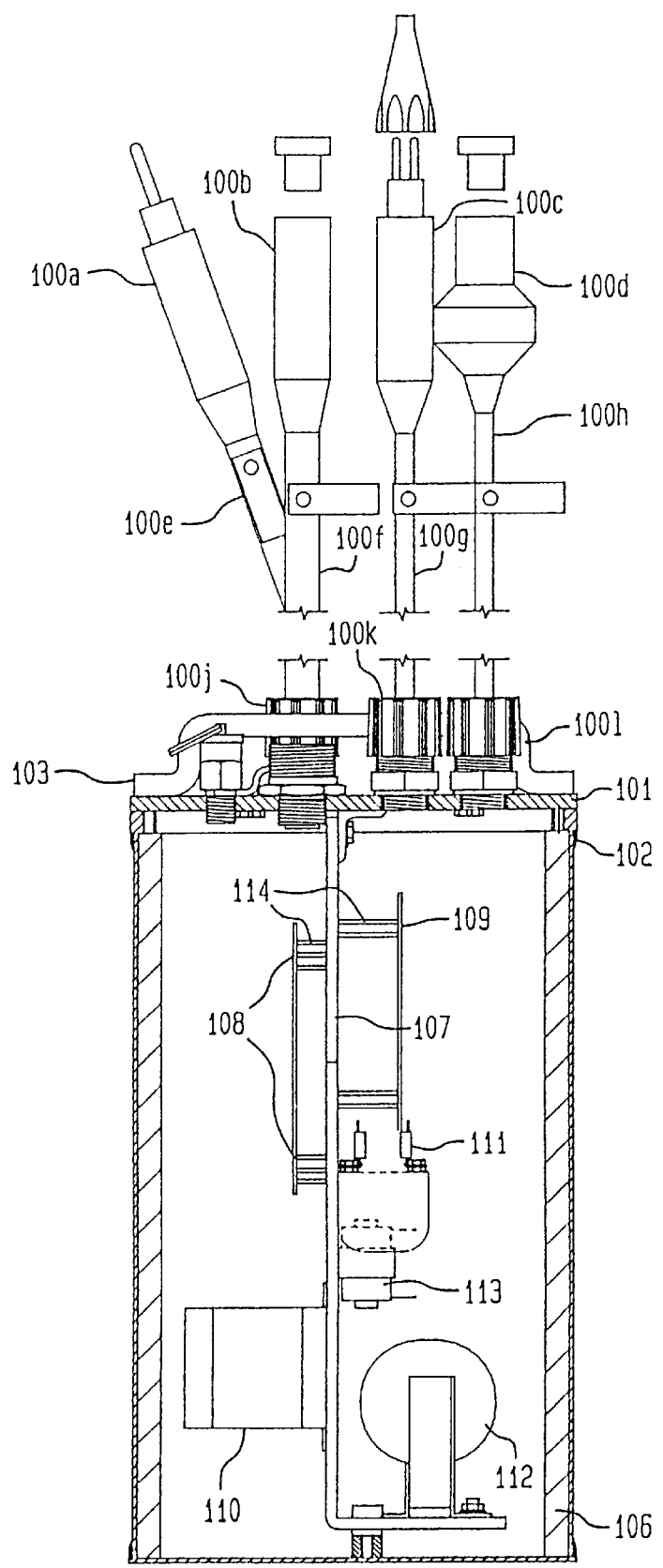
FIG. 10A1

FIG. 10A2
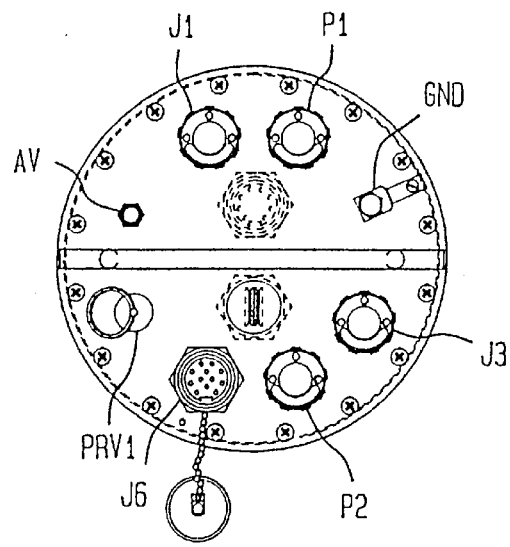
FIG. 10B
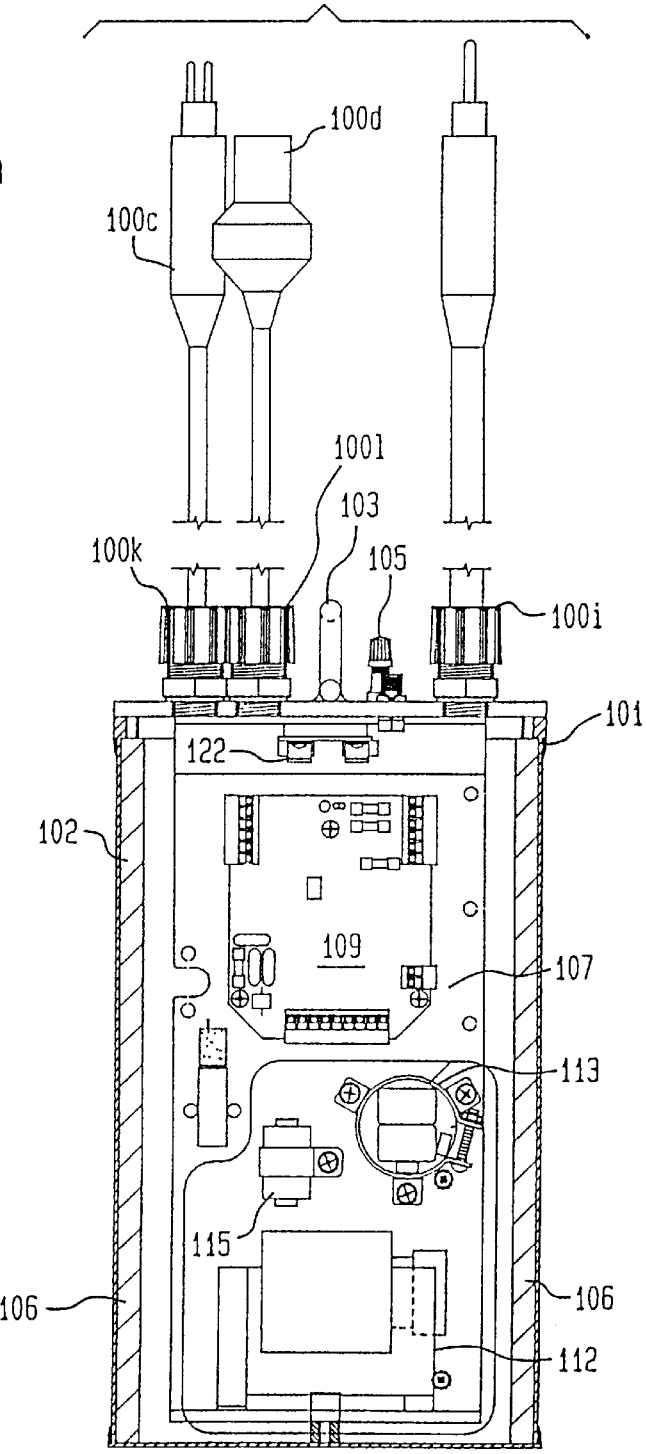

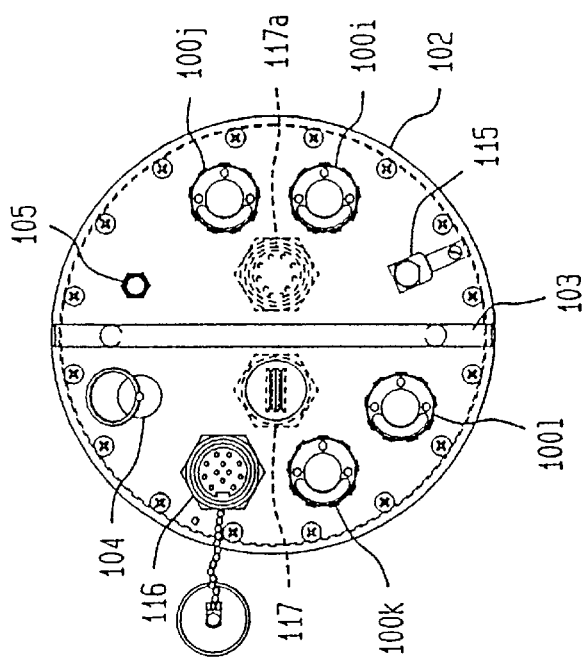
FIG. 10D
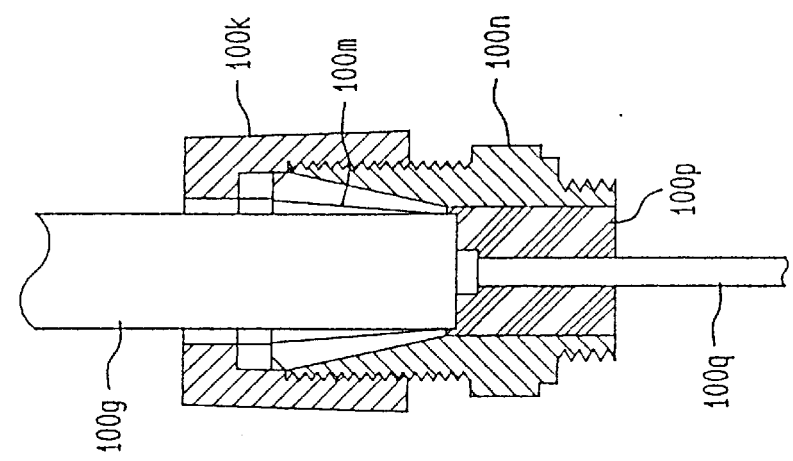
FIG. 10C2
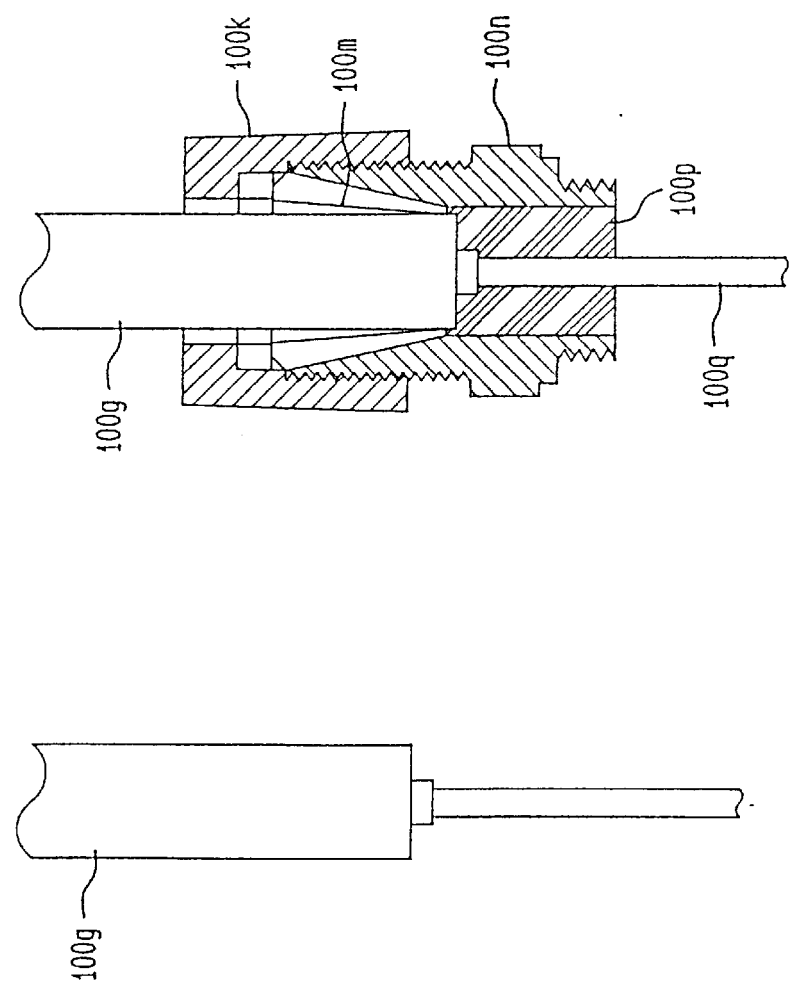
FIG. 10C1

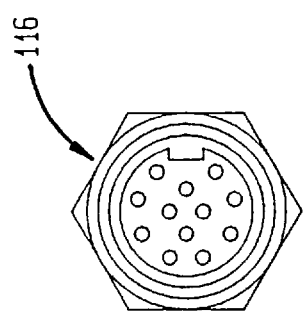
FIG. 10E2
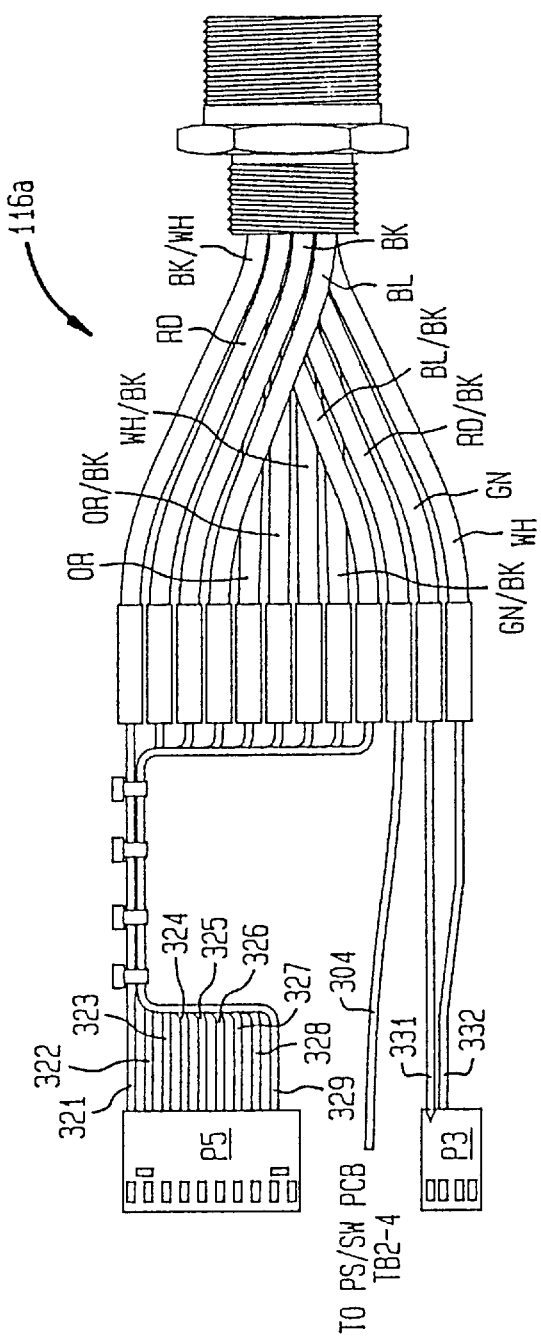
FIG. 10E1
FIG. 10E3

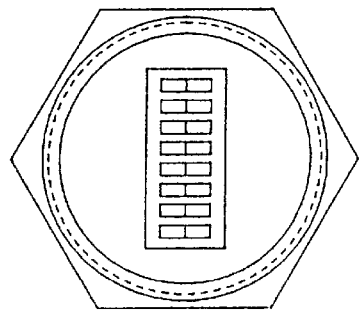
FIG. 10F2
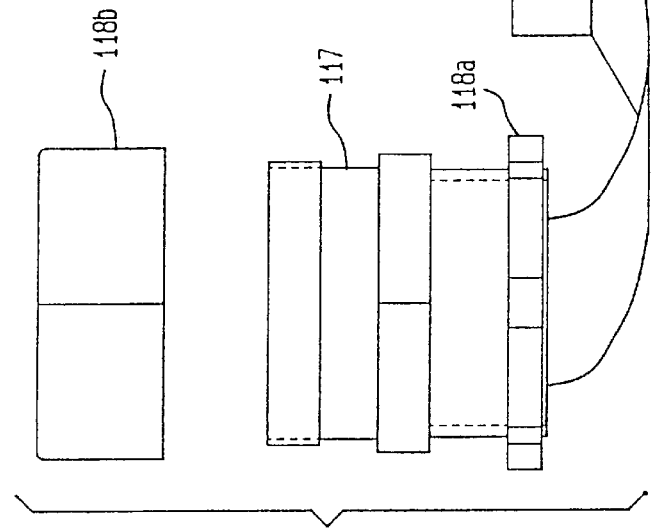
FIG. 10F3
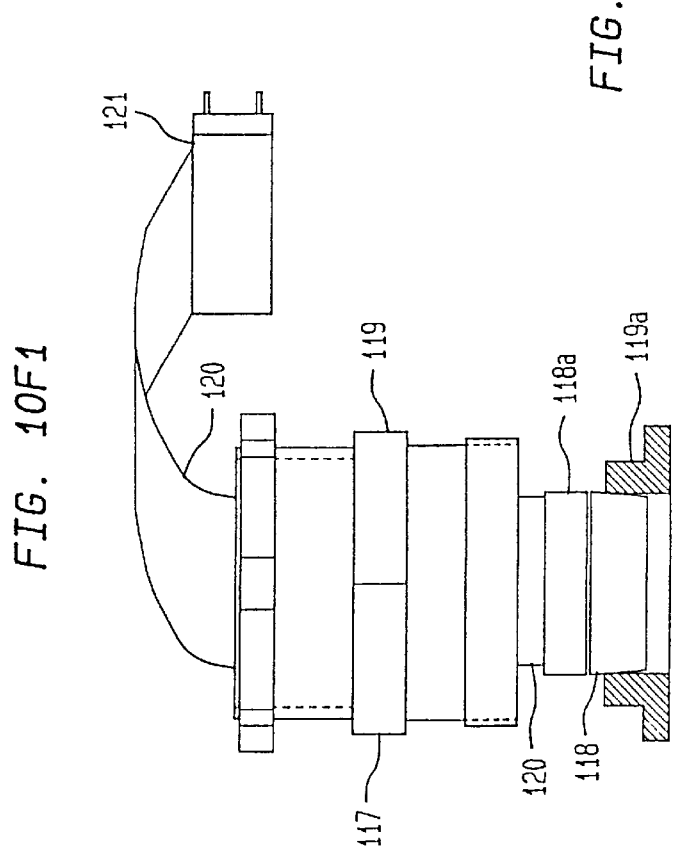
FIG. 10F1

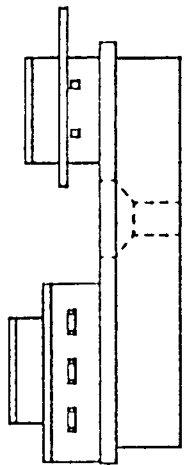
FIG. 10G2
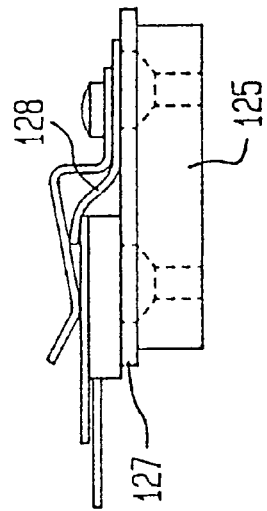
FIG. 10G3
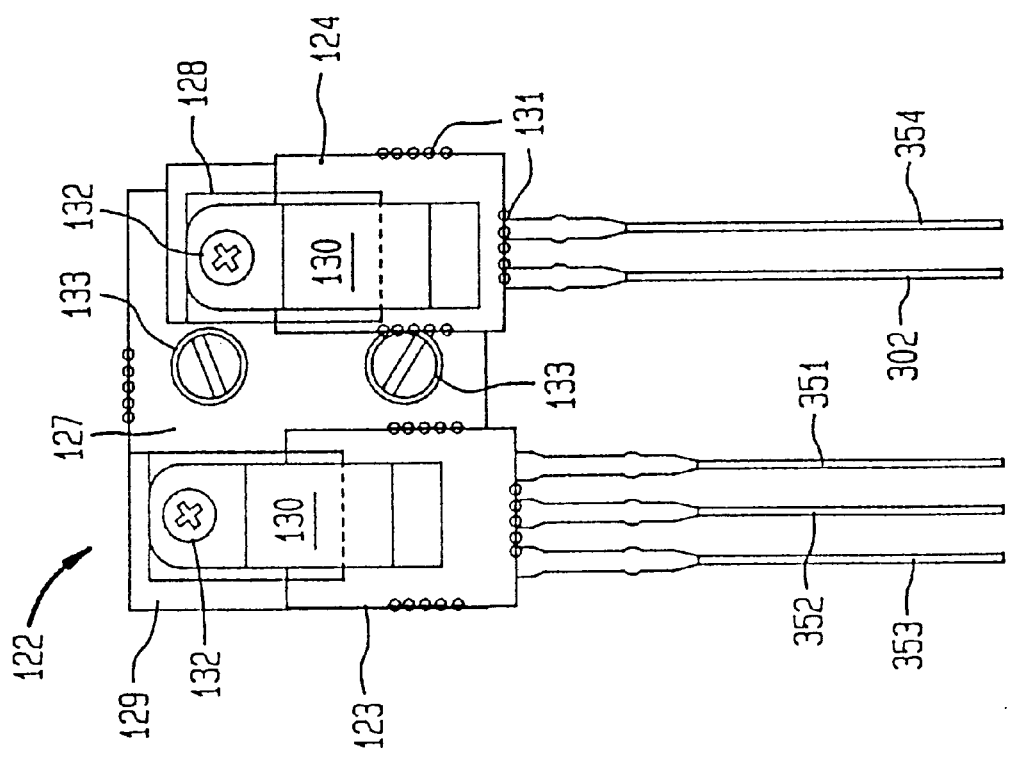
FIG. 10G1

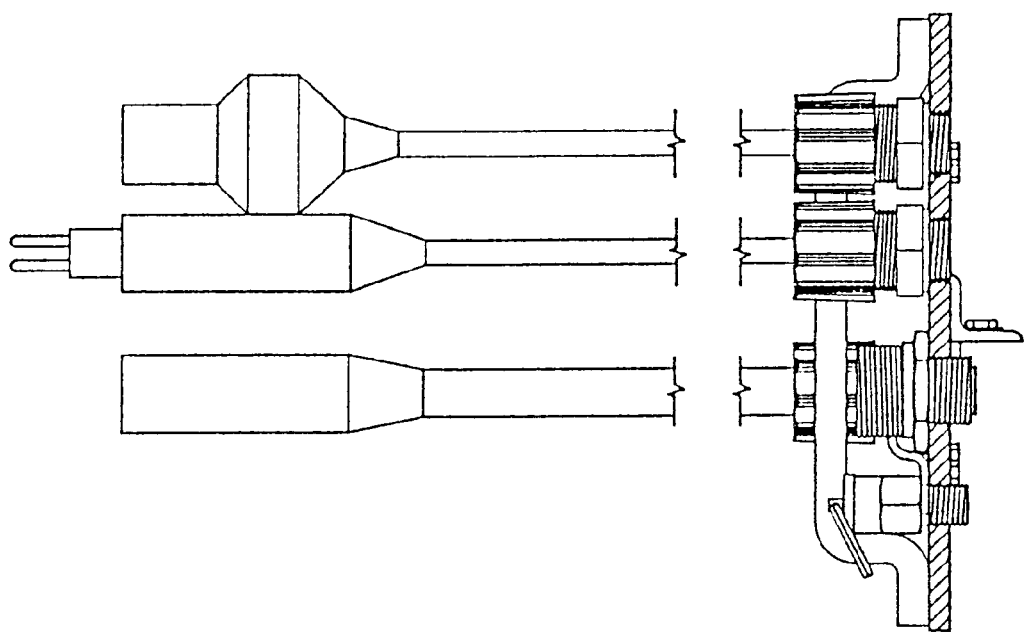
FIG. 10H2
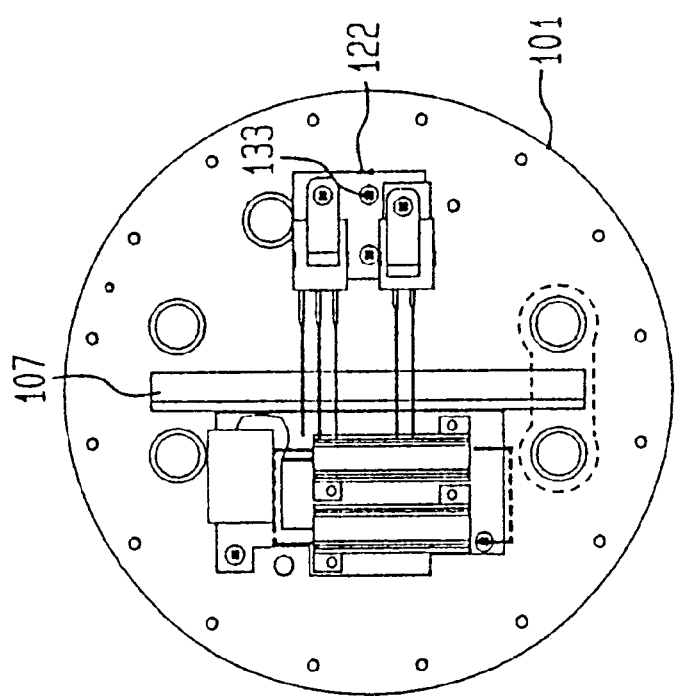
FIG. 10H1

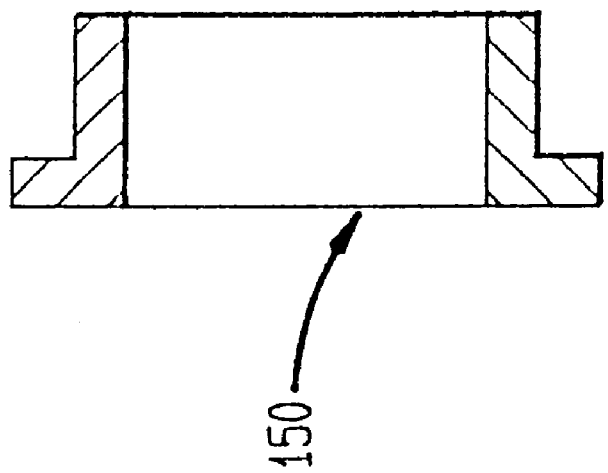
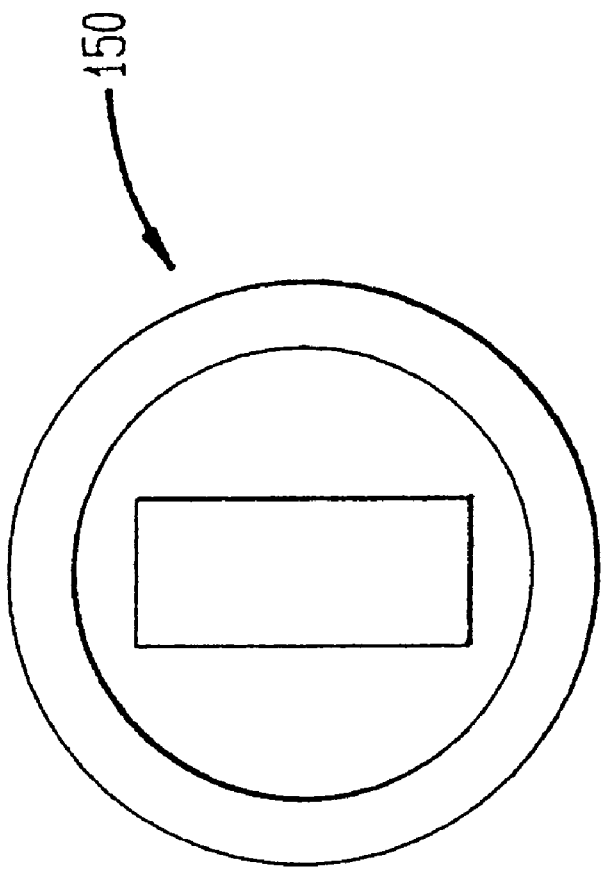

AIRFIELD LIGHTING SYSTEM

This application is a continuation of application Ser. No. 08/503,759 filed Jul. 18, 1995, now abandoned, which is a continuation of application Ser. No. 08/059,023, filed May 6, 1993, now U.S. Pat. No. 5,485,151.

TECHNICAL FIELD

The present invention is a microprocessor-controlled airfield lighting control and monitoring system. The present invention has a variety of features related to the bi-directional communication between the controlling microprocessor and airfield lights and sensors. The many aspects of the invention are also directed to improving the communication over a series circuit, and to improving component reliabilty.

BACKGROUND OF THE INVENTION

The control of aircraft on the ground is a very complicated and dangerous task. Airfields must often provide control and guidance to aircraft while taxiing or standing both before takeoff and after landing.

Safety and reliability are at a premium in the field of aircraft control. For this purpose, airfield lighting control systems have been developed to prevent incursions onto an active runway or taxiway, thereby reducing the possibility of collisions between aircraft, especially during conditions of low visibility.

Accordingly, it is an object of the many aspects of the present invention to provide improvements over existing airfield lighting control and monitoring systems (ALCMS). Such improvements include those to the control and monitoring system of an ALCMS which render it better able to apprise the operator of the status of the ALCMS through improved communication capabilities between and among the components of the system. The present invention furthers the goals of safe and efficient aircraft ground control.

SUMMARY OF THE INVENTION

Toward accomplishing the above-described objects, the present invention has several aspects.

The first aspect of the invention is a system for current carrier communication with component devices of an ALCMS, such as lights and aircraft presence detectors. This aspect of the invention is a dual redundant high frequency communication by-pass device on a series electrical circuit for powering the ALCMS devices. The series circuit has several power isolation transformers in series. Bypass capacitors, preferably dual capacitors are placed across the primary or primaries of the isolation transformer(s) to provide a redundant communication path should one of the capacitors fail. These capacitors are preferably housed in a potted module. This improvement provides a low impedance path around one or more primaries of the isolation transformer(s) while also providing lightning protection and high dielectric strength.

One of the ways this can be done is to provide a number of parallel line rated AC capacitors suspended in a high dielectric strength enclosure. A lightning protective device may also be placed across each end of the capacitors. The enclosure may then be potted with a high dielectric strength material, in accordance with known practices in the art, after assembly is complete. External electrical connections may be made through use of L-823 connectors.

As an alternative, a high AC rating may be obtained by using large AC rated capacitors mounted in a NEMA 6P rated metal can.

Another aspect of the present invention is the use of a load placed across the open circuit secondary of a power isolation transformer (such as an L-830) in order to minimize the high AC peak voltage that has been found to occur if the lamp fails. This construction reduces the voltage spike that has been found to occur after zero-crossing when a secondary is open circuited. This helps to prevent electrical components (such as switching elements placed across the secondary of an L-830 transformer) from failing, and improves communication quality.

As an example, an electrical load is placed across an L-830 secondary when operative; the load having a high impedance when the lamp is working. When the lamp fails, this load draws sufficient current such that the L-830 secondary experiences a load much less than an open circuit; and therefore provides less voltage to drive the current through this load.

The present invention provides for a supplemental load across the secondary. This load is calculated to draw a minimal current such that when the lamp is operating the light output meets desired standards, such as FAA requirements. This load may be in the form of a resistor (R) and a capacitor (C), but may optionally include an inductor (L) as well. The R+C or R+C+L can be placed on the secondary of the L-830 and mounted internally in a remote controller canister. It is preferred that the R+C or R+C+L are separately contained in a water-proof box to separate them from the balance of the remote controller, to better isolate any heat given off. Alternatively, the R+C or R+C+L may also be either mounted on the bottom of the lid of the remote controller canister, or immersed in a non-PCB type oil to provide heat sinking.

As an alternative, upon sensing an open circuit, a relay or electronic intensity control switch (providing anywhere from full voltage to no load at zero voltage) may be disposed so as to short across the L-830 secondary. A box containing such a load may optionally be plugged into the L-830 secondary.

Another aspect of the present invention pertains to an electrical component mounting method for use in a waterproof canister used to hold a remote controller in accordance with the present invention. Electrical components of the ALCMS are mounted inside a water-proof canister (e.g. NEMA 6P) such that high dielectric strength is achieved while providing a low thermal resistance. This mounting arrangement provides high dielectric strength and low thermal impedance to provide a novel solution to achieve electrical parameters that are often incongruent (i.e. high dielectric strength and good heat sinking) at relatively low cost.

An electrical component, such as a power transistor or a resistor in a DC power supply, is mounted between mica members which are in turn clipped to a metal surface (or other heat sink) using a metal clip. In the present invention, the component, such as the power transistor, is mounted to the inside surface of the canister top. Optionally, the components so mounted may also be mounted on such a surface which allows them to be immersed in oil. Such a mounting may allow the elimination of components that are intended to heat sink the "face" of the power transistor/resistor. The mounting of the present invention may also be used for devices that may be used under water.

Another improvement of the present invention is a waterproof remote controller address and lamp fail-safe device. In this device, electrical components are mounted external to the container holding the airfield lighting microprocessor to enable the address or fail-safe mode to be set without requiring that the water-proof container (i.e. NEMA 6P rated) be opened. This minimizes the number of remote controller devices that must be built for a range of addresses and also different fail-safe conditions (i.e. lamp on or lamp off).

In this construction, a dip switch (or other similar address selection device) is plugged into a DIP connector (eliminating the need to solder wires onto the fragile switch legs). This is done using a series of small tines having a series of small male receptacles (such as a section of a product known as "Sip Strip," commercially available from Welcon Products of South Bend, Ind.) which are shaped to accommodate the DIP connector plug holes and dip switch tines. This assembly is then plugged into a ribbon connector assembly. The dip switch is then centered inside a metallic structure using a special centering jig. The assembly then is turned upside down and filled with resin.

For the fail-safe setting, a two position switch, such as a lockable toggle switch, is placed in the center of a metallic structure, and is mechanically held in position also using a special centering jig, in case the user accidentally bumps the switch. The assembly is then turned upside down and filled with resin.

As an alternative, pluggable jumpers instead of a toggle switch may also be used to set the fail-safe mode.

As used herein, "potting" may also include positioning with resin, Permex or RTV (silicone materials), rubber or similar appropriate material.

Another improvement of the present invention is the use of a regulated DC power supply powered by the airfield lighting series circuit. An electronic circuit is placed across the secondary of a current-to-current isolation transformer in the airfield lighting series circuit to provide regulated DC voltage. Its function is to provide appropriate voltages and currents, such as +21 Vdc at 700 mA, over an input current range, such as 2.8 A to 6.6 A or 4.8 A to 6.6 A. Such a construction allows one to regulate the DC voltage without reducing the current to the lamp(s) or load connected to the secondary. The circuitry of this device is described further hereinbelow.

As an alternative, using this regulated DC power supply, the microprocessor can be deleted from the remote controller canister and be used as a stand-alone power supply for such things as aircraft presence detection sensors.

Still another improvement of the present invention is a circuit for controlling and monitoring airfield lighting load. Generally, this improvement involves an isolation transformer (such as an L-830) supplying current to one or more airfield lights, being switched using an electronic current shunt. Taps are brought outside the remote controller to allow the user to select the fail/safe lamp setting. The isolation transformer can be internal or external to the remote controller. This improvement provides for control and monitoring of an airfield lighting load. It allows the user the selection of a fail/safe mode, and allows that selection to be made either internal or external to the isolation transformer housing. This also allows control of the lamps with minimal arcing during switching because the current is shunted around the lamp.

In this construction, an isolation transformer (mounted internally or externally) powers a circuit with one or more relays or other electronic switching device; and one or more lamps with one or more circuit junctions that set the fail/safe (energized or de-energized) setting of the electronic switch. A current transformer measures the analog value of the current through each lamp. Alternatively, a voltage transformer may measure the analog voltage across a block of lamps. Surge protection in the form of lightning arrestors (across the transformer) and a resistor/capacitor (across the electronic switching device or relay contact) may also be provided.

The use of an external transformer reduces the heat inside the remote controller container. This also allows the load or lamp wattage to change along with the transformer wattage. Also, bringing the No and Nc contacts outside the remote controller container allow the user to use the fail/safe condition.

Shunting current around the lamp (as opposed to opening the transformer secondary) eliminates the high voltage that would be present on the secondary and also minimizes arcing when the load is switched.

Accordingly, the several aspects of the present invention can be summarized as follows.

The invention comprises an airfield lighting system comprising: (a) an electrical circuit adapted to conduct a current and a control electrical signal, and comprising a plurality of transformers connected in series, each of the transformers adapted to energize at least one airfield light or detection device; (b) a general control microprocessor; (c) a master control module adapted to accept a control digital signal from the general control microprocessor, to convert the control digital signal to a control electrical signal, such as a high frequency signal (e.g. FSk or spread spectrum; typically 30 kHz to 450 kHz), and to send the control electrical signal through the circuit; (d) remote controller means connected to each of the transformers, each of the remote controller means comprising: (i) means to accept the control electrical signal and to convert said control electrical signal to a converted control digital signal, (ii) switching means to control the at least one airfield light, and (iii) remote controller microprocessor means adapted to process the converted control digital signal and control the switching means in accordance with the converted control digital signal; and (e) a constant current regulator adapted to control the current flowing through the circuit.

The remote controller microprocessor means may also be adapted to generate a return digital signal, and may further comprise means to convert the return digital signal to a return electrical signal and to send the return electrical signal through the circuit; with the master control module being adapted to accept the return electrical signal, to convert the return electrical signal to a converted return digital signal, and to send the converted return digital signal to the general control microprocessor.

The remote controller microprocessor may also be supplied with supplemental communication paths (such as a fiber optic or radio frequency) via its other communication ports (e.g. RS-232).

The master control module may also be adapted to accept a detection control digital signal from the general control microprocessor, to convert the detection control digital signal to a detection control electrical signal, and to send the detection control electrical signal through the circuit, where the circuit also includes at least one additional transformer connected to the electrical circuit and adapted to energize an aircraft detection means; and detection remote controller means connected to each of the transformers, each of the detection remote controller means comprising: (a) means to accept the detection control electrical signal and to convert the detection control electrical signal to a converted detection control digital signal, (b) electrical control means to control the at least one aircraft detection means, and (c) detection remote controller microprocessor means adapted to process the converted detection control digital signal and control the electrical control means in accordance with the converted detection control digital signal.

Analogous to the lamp control system, the detection remote controller microprocessor means may also be adapted to generate a detection return digital signal, the detection remote controller means further comprising means to convert the detection return digital signal to a detection return electrical signal and to send the detection return electrical signal through the circuit; and wherein the master control module is adapted to accept the detection return electrical signal, to convert the detection return electrical signal to a converted detection return digital signal, and to send the converted detection return digital signal to the general control microprocessor.

The aircraft detection means may comprise a microwave receiver and a microwave transmitter adapted to transmit a microwave frequency to the microwave receiver; and may include electrical control means is adapted to disturb the microwave frequency (such as by modulating the frequency) to simulate the effect of an aircraft passing between the microwave receiver and the microwave transmitter.

The transformer(s) may additionally comprise at least one by-pass capacitor parallel to the primary(ies) of the transformer(s), preferably being a plurality of by-pass capacitors, and most preferably being a plurality of parallel by-pass capacitors.

The transformer(s) may additionally comprise lightning arresting means.

The transformer(s) may also include a series comprising at least one by-pass capacitor and at least one by-pass resistor parallel to the secondary of the transformer(s), preferably including a plurality of by-pass capacitors and/or a plurality of by-pass resistors; and most preferably a plurality of parallel by-pass capacitors and/or a plurality of parallel by-pass resistors.

The by-pass series on the secondary of the transformer(s) may optionally include at least one inductor.

It is preferred that the resistor(s) be placed in contact with a heat sink material, such as a metal surface; or disposed a sufficient distance from the transformer and remote controller means with which the resistor(s) is associated so as to sufficiently insulate the resistor(s) therefrom.

The airfield lighting system of the present invention may also have at least two transformers in a given series (such as would occur in a branch circuit) by-passed by at least one capacitor. These are generally large size capacitors which are disposed in water-proof canisters.

The remote controller microprocessor are typically energized by the electrical circuit through a power transistor disposed in a metal container having an inner surface, the power transistor being attached to the inner surface by attachment means comprising: (1) an aluminum member supported on the inner surface; (2) a mica member supported on the aluminum member; with the power transistor supported on the mica member.

In a preferred embodiment, the power transistor is attached to the inner surface by attachment means comprising: (1) an aluminum member supported on the inner surface; (2) a first mica member in contact with the aluminum member; (3) a second mica member; (4) a non-conductive clip attached to the first mica member urging the mica members toward one another; and (5) a metal clip attached to the inner surface urging the second mica member toward the inner surface; with the power transistor disposed between the mica members, whereby the power transistor is attached to the inner surface.

Typically, the remote controller means is disposed in a water-proof container the remote controller microprocessor has an addressable digital switch, with the addressable digital switch extending through respective water-proof container so as to be accessible from outside the container.

The remote controller microprocessor may also have a test port extending the water-proof container so as to be accessible from outside the container.

The water-proof containers used in accordance with the present invention may optionally and preferably have one or more air pressure valves adapted to allow air to be pressurized inside the water-proof container and to allow pressurized air to be released from inside the water-proof container.

The DC power supply of the remote controller microprocessor preferably comprises: (1) a full wave rectifier; (2) a diode; (3) a capacitor; (4) an integrated circuit; and (5) a power transistor; wherein the full wave rectifier, the diode and the capacitor connected in a series; and a voltage sensing point disposed between the diode and the capacitor, the voltage sensing point adapted to sense a threshold voltage and connected to an integrated circuit adapted to respond to the threshold voltage; and the integrated circuit connected to the power transistor; whereby, upon sensing the threshold voltage, the integrated circuit causes the power transistor to short around the remote controller microprocessor means.

The series electrical circuit may additionally and preferably include a low pass filter disposed between the master control module and the constant current regulator. The low pass filter comprises a pair of inductors disposed in series on either side of the circuit, and at least one capacitor connected across the circuit and connecting at points disposed between each of the pair of inductors. The series electrical circuit additionally and preferably comprises a by-pass device disposed between the master control module and the constant current regulator, the by-pass device comprising at least one by-pass capacitor disposed across the series electrical circuit, preferably being a plurality of by-pass capacitors, and most preferably being a plurality of parallel by-pass capacitors.

The switching means of the remote controller units may optionally and preferably include fail-safe circuit means which causes the airfield light(s) to be energized (or deenergized) in the event the remote controller microprocessor means ceases to be operative.

DESCRIPTION OF THE DRAWINGS

FIG. 1 is a perspective view of an airfield showing a portion of an airfield lighting control system in accordance with one embodiment of the present invention.

FIG. 1(1) is an enlarged view of the constant current regulator (CCR) shown in FIG. 1.

FIGS. 1B1 and 1B2 are block diagrams of an ALCMS according to one embodiment of the invention.

FIG. 2, comprising FIGS. 2(1) and 2(2), is a circuit schematic of a portion of an airfield lighting control and monitoring system in accordance with one embodiment of the present invention.

FIGS. 2B1, 2B2 and 2B3 are a circuit schematic of a portion of an airfield lighting control and monitoring system in accordance with one embodiment of the present invention.

FIGS. 2C and 2D are wiring schematics of by-pass devices used in accordance with one embodiment of the present invention.

FIG. 3, comprising FIGS. 3(1), 3(2), 3(3) and 3(4), is a wiring diagram of a master control module in accordance with one embodiment of the present invention.

FIG. 4, comprising

FIG. 5, comprising FIGS. 5A, 5B, 5C and 5D, is a wiring diagram of a remote controller for airfield lamps in accordance with another embodiment of the present invention.

FIG. 6, comprising FIGS. 6A, 6B, 6C and 6D, is a wiring diagram of a remote controller for airfield lamps in accordance with another embodiment of the present invention.

FIG. 7, comprising FIGS. 7A, 7B, 7C and 7D, is a wiring diagram of a remote controller for airfield lamps in accordance with yet another embodiment of the present invention.

FIG. 8, comprising FIGS. 8A, 8B, 8C and 8D, is a wiring diagram of a remote controller for a microwave detection device in accordance with another embodiment of the present invention.

FIG. 10 is a sectioned elevational view of a water-proof canister containing the component parts of a remote control unit used in accordance with one embodiment of the present invention.

FIGS. 10A1 and 10A2 are a sectioned elevational view of a water-proof canister containing the component parts of a remote control unit and showing another view of the canister of FIG. 10.

FIG. 10B is a sectioned elevational view of a water-proof canister containing the component parts of a remote control unit and showing another view of the canister of FIG. 10.

FIGS. 10C1 and 10C2 are a detailed sectioned view of a connector for the canister shown in FIGS. 10, 10A and 10B.

FIG. 10D is a detailed plan view of the lid of the canister shown in FIGS. 10, 10A1, 10A2 and 10B.

FIGS. 10E1, 10E2 and 10E3 are a detailed view of the remote test port and associated wiring harness, for the canister shown in FIGS. 10, 10A1, 10A2 and 10B.

FIGS. 10F1, 10F2 and 10F3 are a detailed view of the DIP switch port and associated wiring harness, for the canister shown in FIGS. 10, 10A1, 10A2, 10B and 10D.

FIGS. 10G1, 10G2 and 10G3 are a detailed plan and elevational view of the power transistor/resistor assembly shown in FIG. 10B.

FIGS. 10H1 and 10H2 are a detailed plan view of the power transistor/resistor assembly mounted on the underside of the lid of the canister shown in FIG. 10B.

FIGS. 11A and 11B are a sectioned view of the mounting jig shown in FIG. 10F.

DETAILED DESCRIPTION OF THE PREFERRED EMBODIMENTS

Figure 2A:
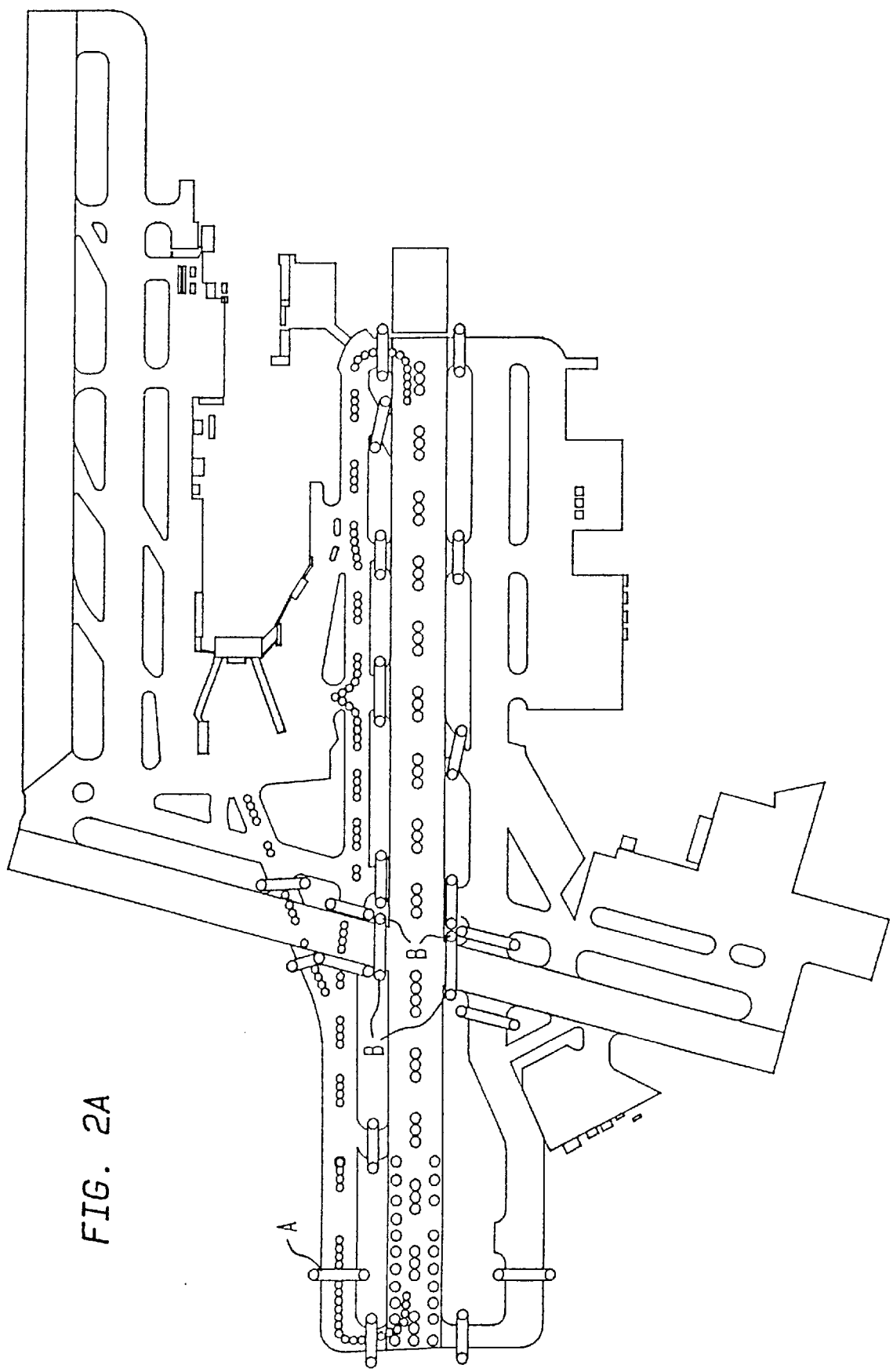
FIG. 2A is an airfield lighting map of an airfield provided with an airfield lighting control system in accordance with one embodiment of the present invention.

In accordance with the foregoing summary of the invention, the following presents a detailed description of the preferred embodiment of the many aspects of the present invention, which as to each, is considered to be the best mode thereof.

FIG. 1 shows a schematic of an airfield lighting control and monitoring system (ALCMS) in accordance with one embodiment of the present invention. FIG. 1 shows control tower 1 which contains general control microprocessor 2, control panel (or other human interface) 3 and CRT (or other human-readable display) 4. The central control microprocessor 2 may optionally be connected to vault computer 5 and/or maintenance operation center computer 6. The central control microprocessor 2 is connected (optionally via vault computer 5) to constant current regulator 7 which maintains the current in the series circuit 8 within a range of 2.8–6.6 amperes. The master control module 9 interfaces with the central control microprocessor 2 and/or vault computer 5 as shown in the drawing insert. Series circuit 8 extends through the runway/taxiway area 10 to power airfield lights 11, microwave (or other) presence detectors comprising microwave transmitters 12a and 13a and microwave receivers 12b and 13b. Also powered by series circuit 8 are so called "wigwag" lights 14 and 15 as well as taxiway stop-bar lights 16, which serve to control the movement of runway and taxiway traffic such as airplane 17. The lights and/or presence detectors are controlled by remote controller units 18 and 19.

FIG. 1B is a block diagram of the ALCMS in accordance with one embodiment of the present invention.

FIG. 2, which includes FIGS. 2(1) and 2(2), shows a circuit schematic of a typical ALCMS in accordance with the present invention, and showing a portion of an ALCMS as it would exist as part A of accompanying overhead airfield schematic 2A. FIG. 2 shows series electrical circuit 7 extending from the constant current regulator/master control module. The series circuit powers a number of lamps such as elevated red lamps 20 and red/yellow stop bar lights 21 via transformers/remote control units which contain bypass devices (shown schematically in FIG. 2C). Each of the transformers such as 22 and 23 are controlled by a respective remote controller units such as 24 and 25. Also powered are green lead lights 26 and via transformers 27 which are controlled by remote control units 28. FIG. 2 also shows the position of microwave transmitters 29, also controlled by remote control units 29a, and microwave receivers 29b. FIG. 2 also shows additional branches of electrical circuit 7 (such as branches 7a, 7b and 7c) which are provided with bypass circuits 8 (shown schematically in FIG. 2D) which are described in more detail herein.

FIG. 2B, which includes FIGS. 2B1, 2B2 and 2B3, shows a circuit schematic of a typical ALCMS in accordance with the present invention, and showing a portion of an ALCMS as it would exist as part B of accompanying overhead airfield schematic 2A. This Figure shows series electrical circuit 200 extending from the constant current regulator/master control module. The series circuit powers a number of lamps such as wigwag lamps 201 via transformers 202 which contain bypass devices 203 (shown schematically in FIG. 2C). These wigwag lamps 201 are controlled by remote control units 204. Also powered are common airfield lights 205 via transformers 206 which are in branches which are supplied with high voltage bypass devices 207 (shown schematically in FIG. 2D).

Figure 3A:
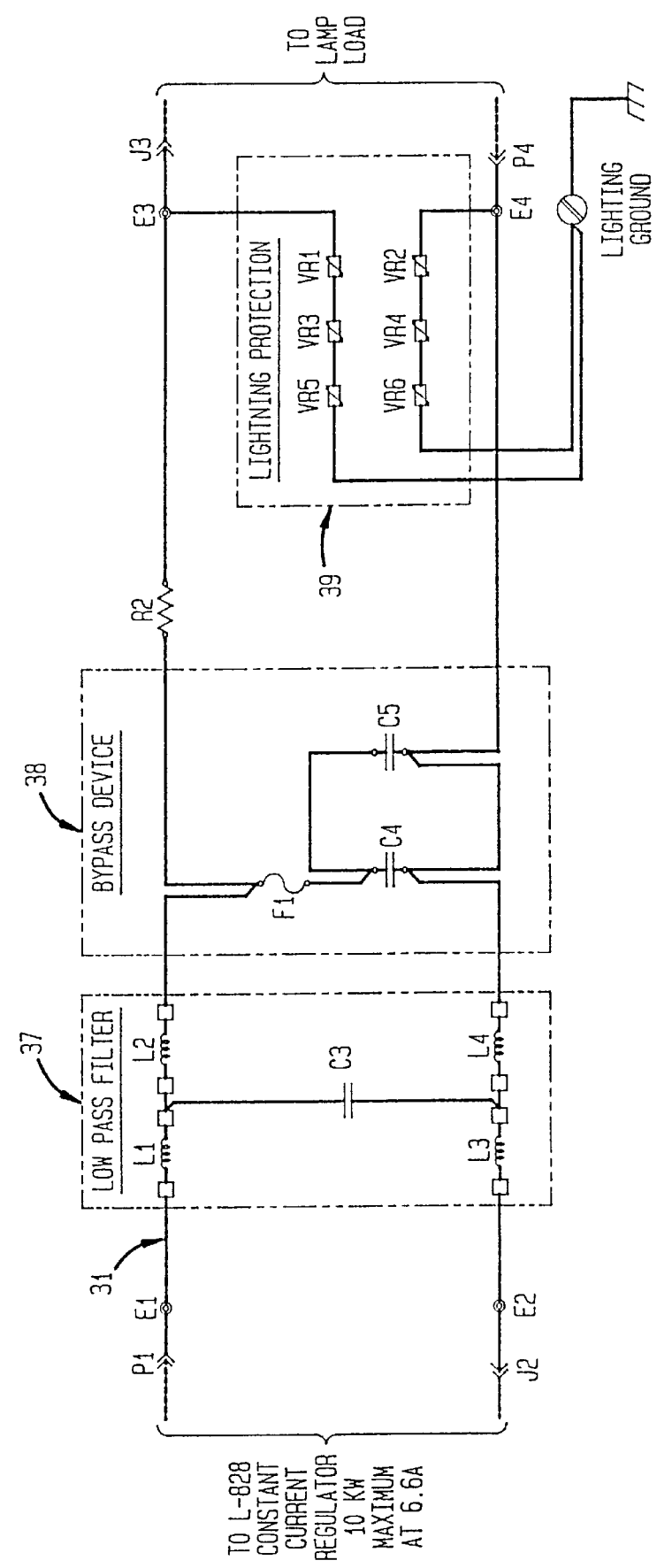
FIG. 3A is a detail of the wiring diagram shown in FIG. 3.
Figure 4A:
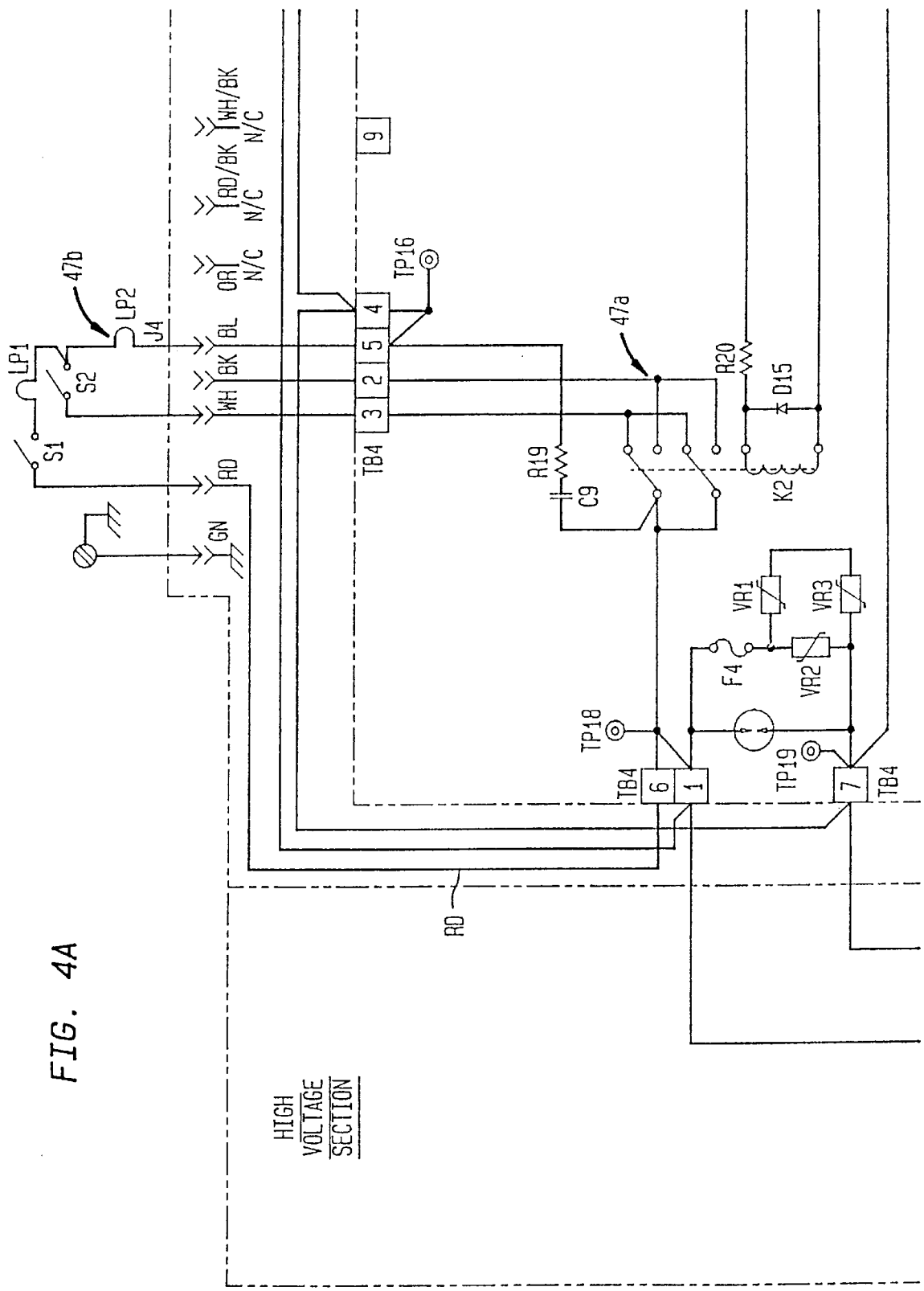
FIGS. 4A, 4B, 4C and 4D, is a wiring diagram of a remote controller for airfield lamps in accordance with one embodiment of the present invention.
Figure 4B:
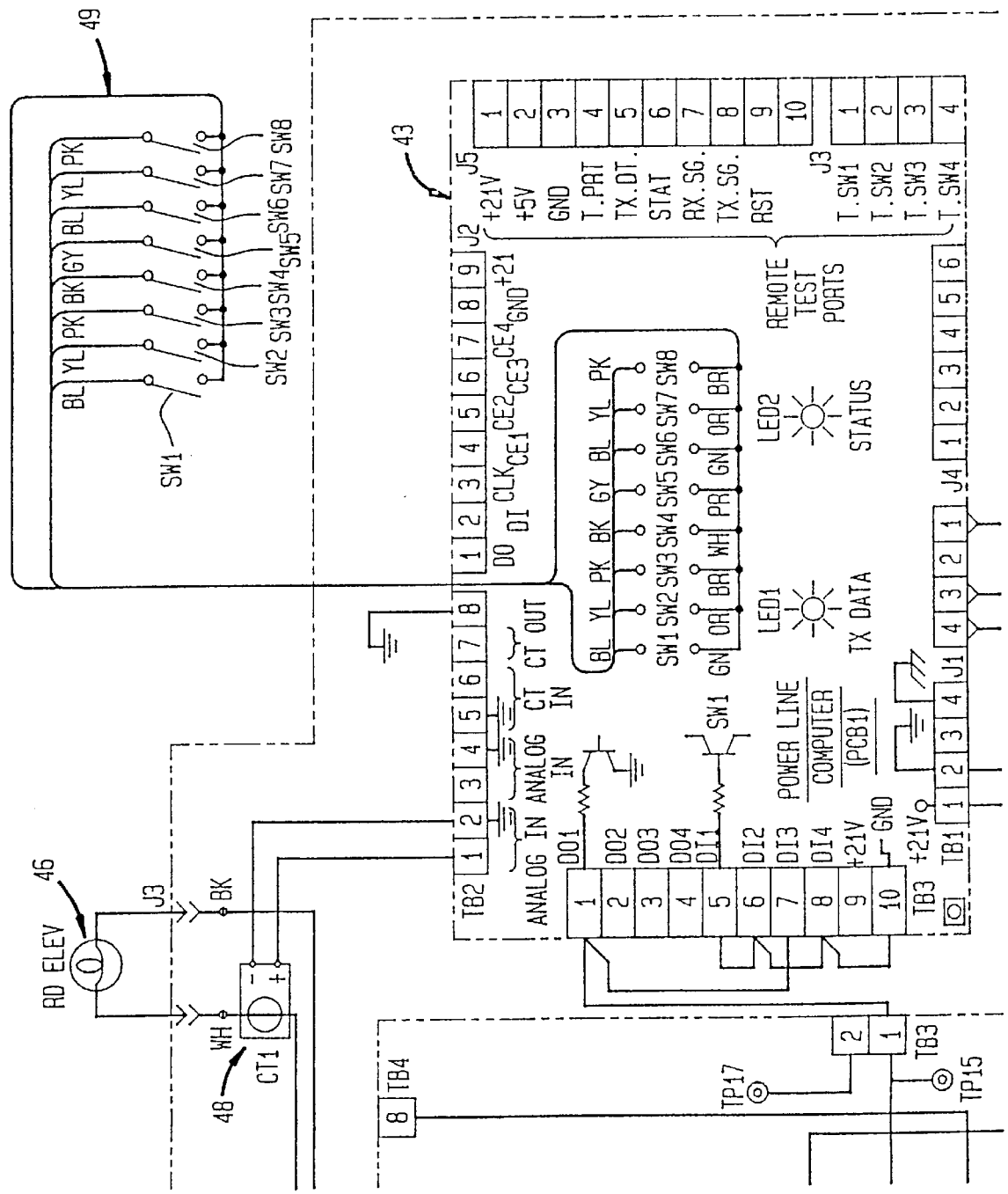
Figure 4C:
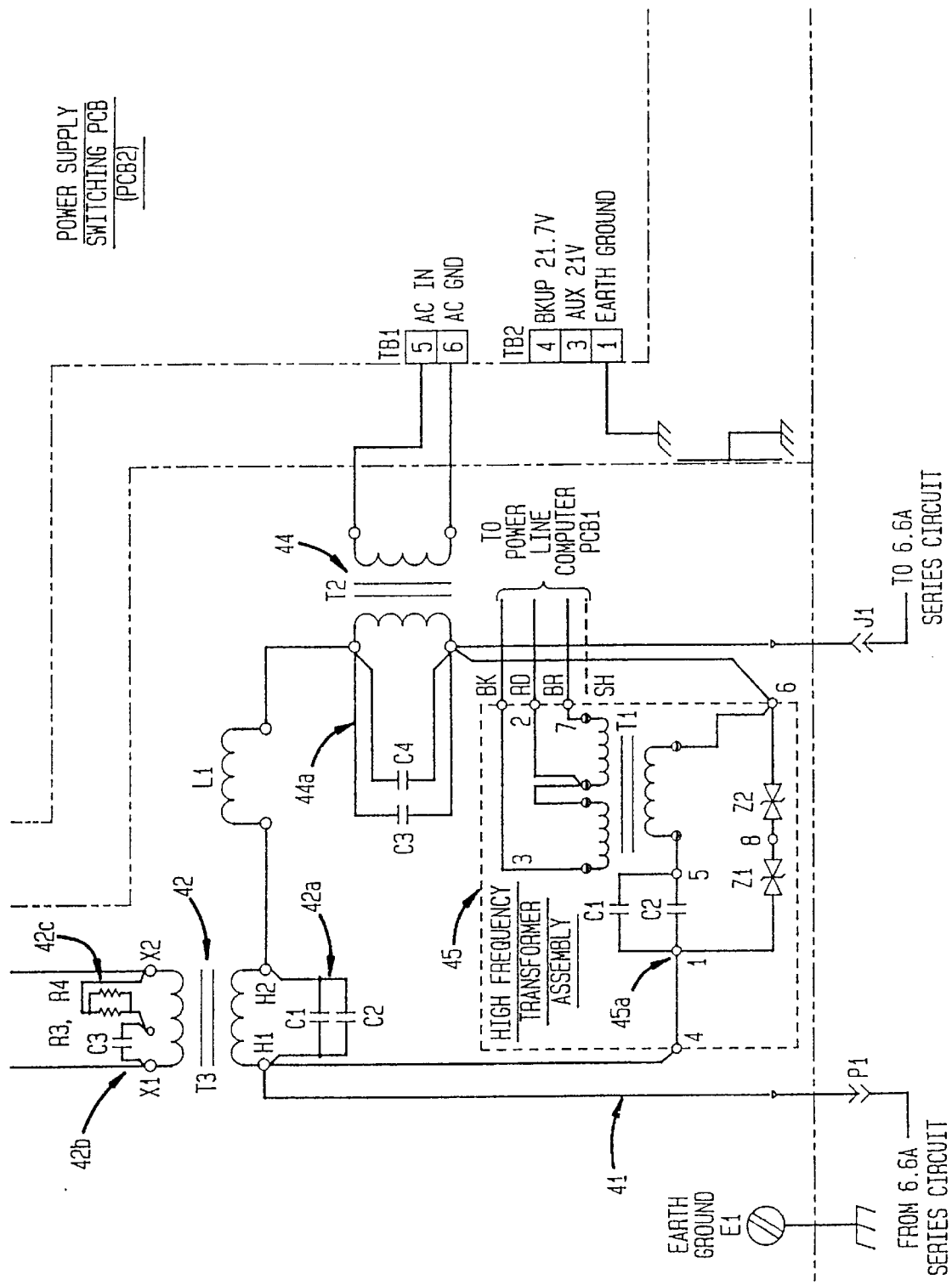
Figure 4D:
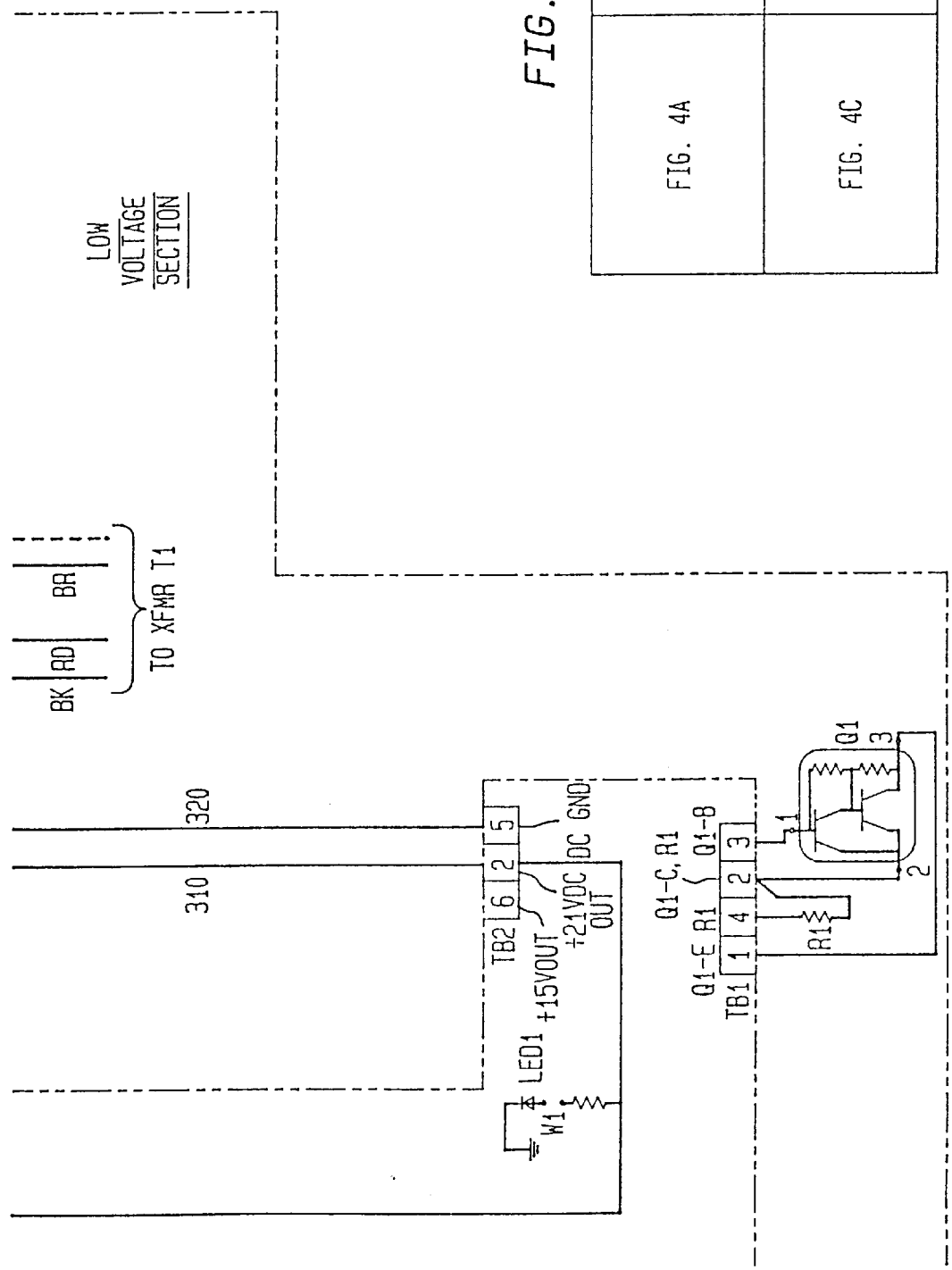

FIG. 3, which includes FIGS. 3(1), 3(2), 3(3) and 3(4), presents a circuit diagram of a master control module in accordance with one embodiment of the present invention. FIG. 3 shows constant current regulator (CCR) 30 which maintains the current in electrical circuit 31 at about 6.6 amps. The master control module comprises master power line computer 32 which is adapted to communicate with the vault computer and/or tower computer via short haul modem 33 through RS-232 cable (or optionally RS-485 cable) over lightning protective ground unit 34. Power line computer 32 is connected to electrical circuit 31 via high frequency transformer 35 which converts the high frequency signal to a digital signal. The vault computer and/or tower computer also interfaces with electrical circuit 31 through current sensing switch 36. Adjacent the master control module are the low pass filter 37, bypass device 38 and lightning protector 39, which are shown in more detail in FIG. 3A.

FIG. 3A shows the structures of low pass filter 37, bypass device 38 and lightning protector 39, along circuit 31.

The tower control computer may be interfaced with a control panel which may be a conventional L-821 panel, touch screen or a push button panel. The tower computer typically is an industrially hardened PC which contains software to control and monitor the airfield lighting system, and to communicate with the rest of the ALCMS. The tower computer translates operator inputs into airfield lighting commands. It also scans the control panel settings to determine which lights should be controlled and to which portion of the circuit they belong.

The vault computer receives commands from the tower computer and transmits the signals to the constant current regulator and the master control module. The vault computer also may check the status of the remote controller units over the electrical circuit.

Should communication between the tower computer and the vault computer fail, the vault computer is able to take command of the CCR and the master control module through a pre-set fail-safe operation mode.

The master control module receives digital signals from the vault and/or tower computer, and transmits them in the form of high frequency electrical signals to the remote controller units where they are reconverted to digital signals for processing. In a preferred embodiment, the master control module is also capable of similarly generated electrical signals from the remote controller units and translates and transmits them to the vault and/or tower computer as digital signals; thereby allowing bi-directional communication and control among the elements of the ALCMS.

FIG. 4, which includes FIGS. 4A, 4B, 4C and 4D, is a circuit diagram of one type of remote controller transceiver for a lamp control in accordance with one embodiment of the present invention. FIG. 4 shows electrical circuit 41 which is connected to power transformer 42. The primary of power transformer 42 has bypass capacitors 42a while the secondary of power transformer 42 has bypass resistors 42c and capacitor 42b. The remote controller transceiver also comprises a remote microprocessor (such as integrated circuit on EPROM 43) which is powered by transformer 44 having bypass capacitors 44a, and is adapted to communicate with the master control module via high frequency transformer 45. The primary of high frequency transformer 45 also contains bypass capacitors 45a allowing the high frequency transformer to bypass transformers 42 and 44. EPROM on microprocessor 43 controls light(s) 46 via relays 47a, and system failure mode may be set in accordance with wiring receptacles 47b and 47c. Wiring receptacle may be hardwired to set the system failure mode or the failure mode may be set by a toggle switch across the appropriate circuit portion. The EPROM 43 also monitors the status of the light(s) via voltage sensor 48. The address of the EPROM 43 may be set by ribbon dip switch assembly 49.

Figure 5A:
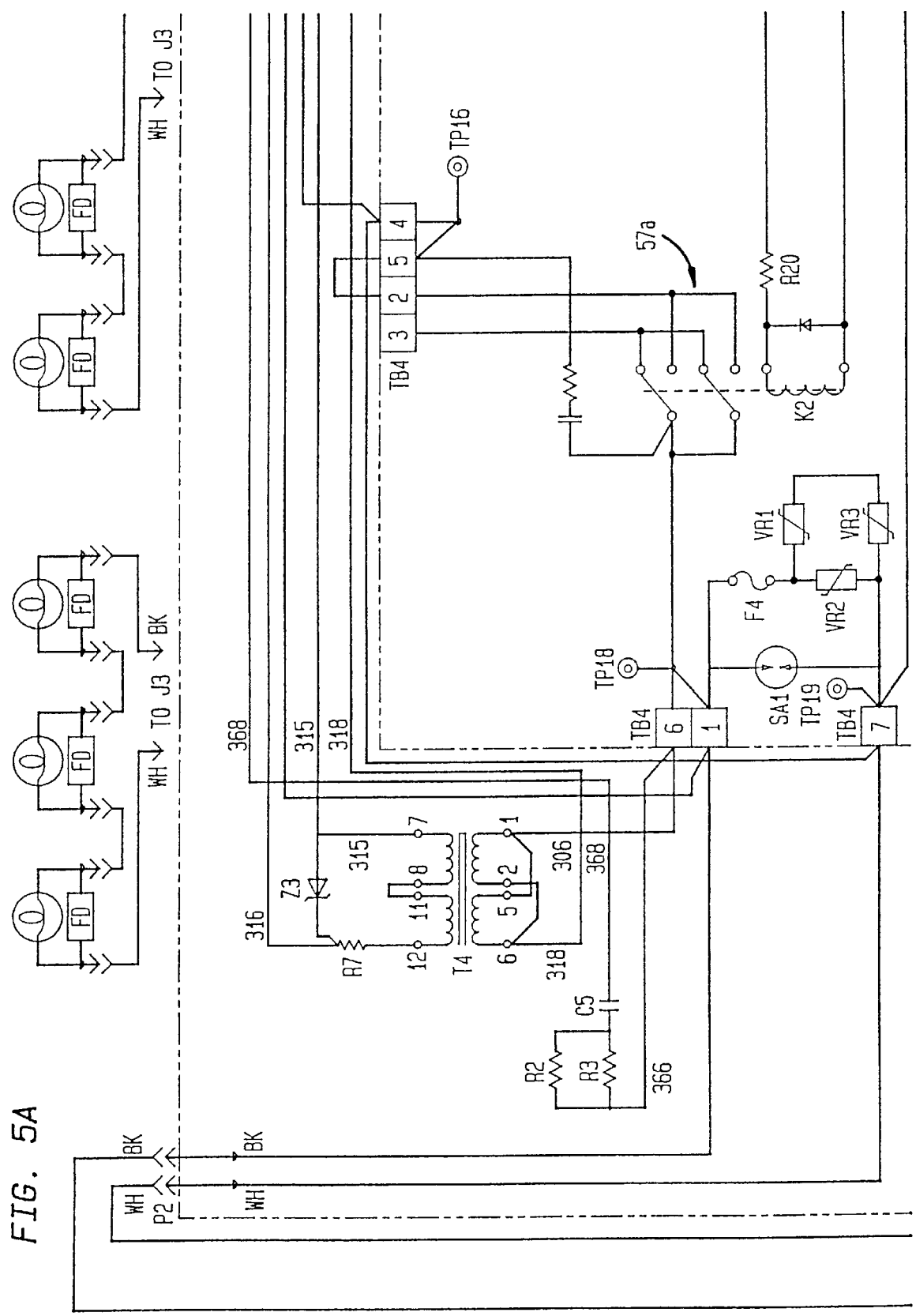
Figure 5B:
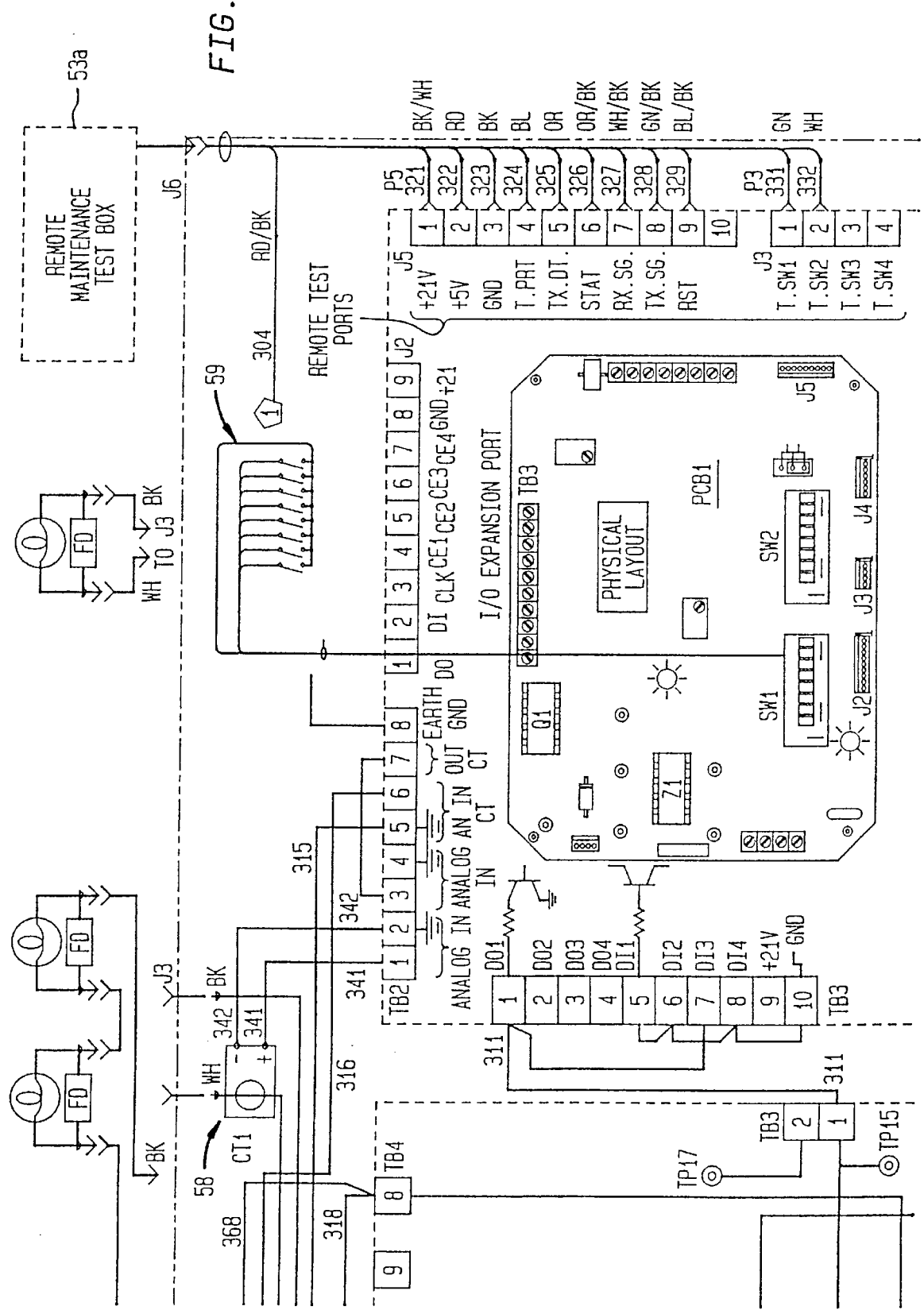
Figure 5C:
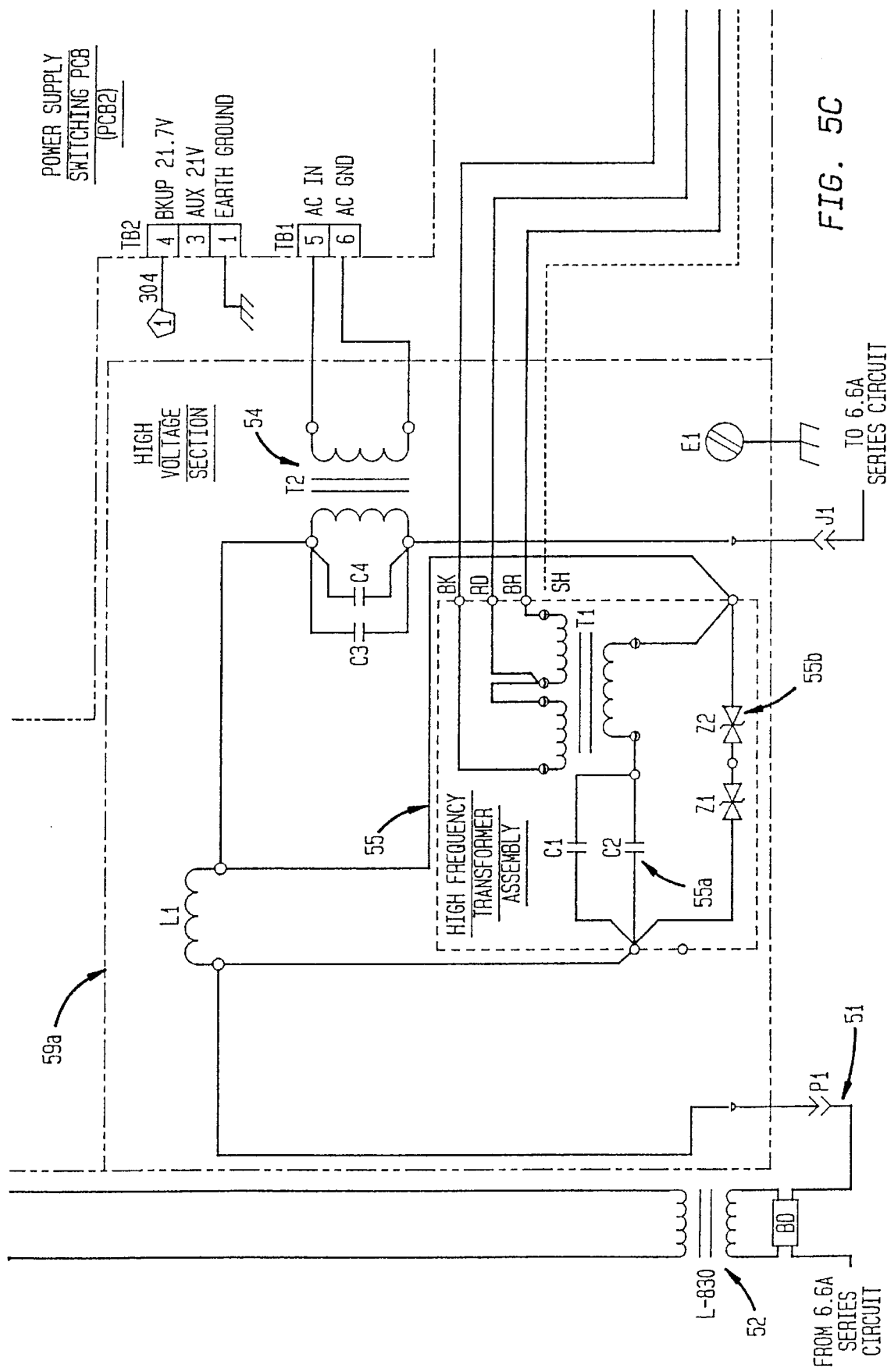

FIG. 5, which includes FIGS. 5A, 5B, 5C and 5D, is a circuit diagram of another type of remote controller transceiver for a lamp control in accordance with another embodiment of the present invention. FIG. 5 shows electrical circuit 51 which is connected to power transformer 52. The remote controller transceiver also comprises a remote microprocessor (such as integrated circuit on EPROM 53) which is powered by transformer 54 and power supply which includes power transistor 54a. The EPROM 53 is adapted to communicate with the master control module via high frequency transformer 55. The primary of high frequency transformer 55 also contains bypass capacitors 55a allowing the high frequency transformer to bypass transformers 54. A bypass resistor (not shown) may also accompany bypass capacitor 55a. Also shown is lightning arrestor 55b. EPROM 53 controls lights 56 via relays 57a, and system failure mode may be set in accordance with a wiring receptacle as shown in FIG. 4. The EPROM 53 also monitors the status of the light(s) via current sensor 58. The address of the EPROM 53 may be set by ribbon dip switch assembly 59. The test port 53a allows tests to be run on EPROM 53.

It should be noted that the transformer 52 is disposed outside the controller container as indicated by dotted line 59a. Such an arrangement is preferred. The circuitry of FIG. 5 is presently considered to represent the best mode of this portion of the invention.

Figure 6A:
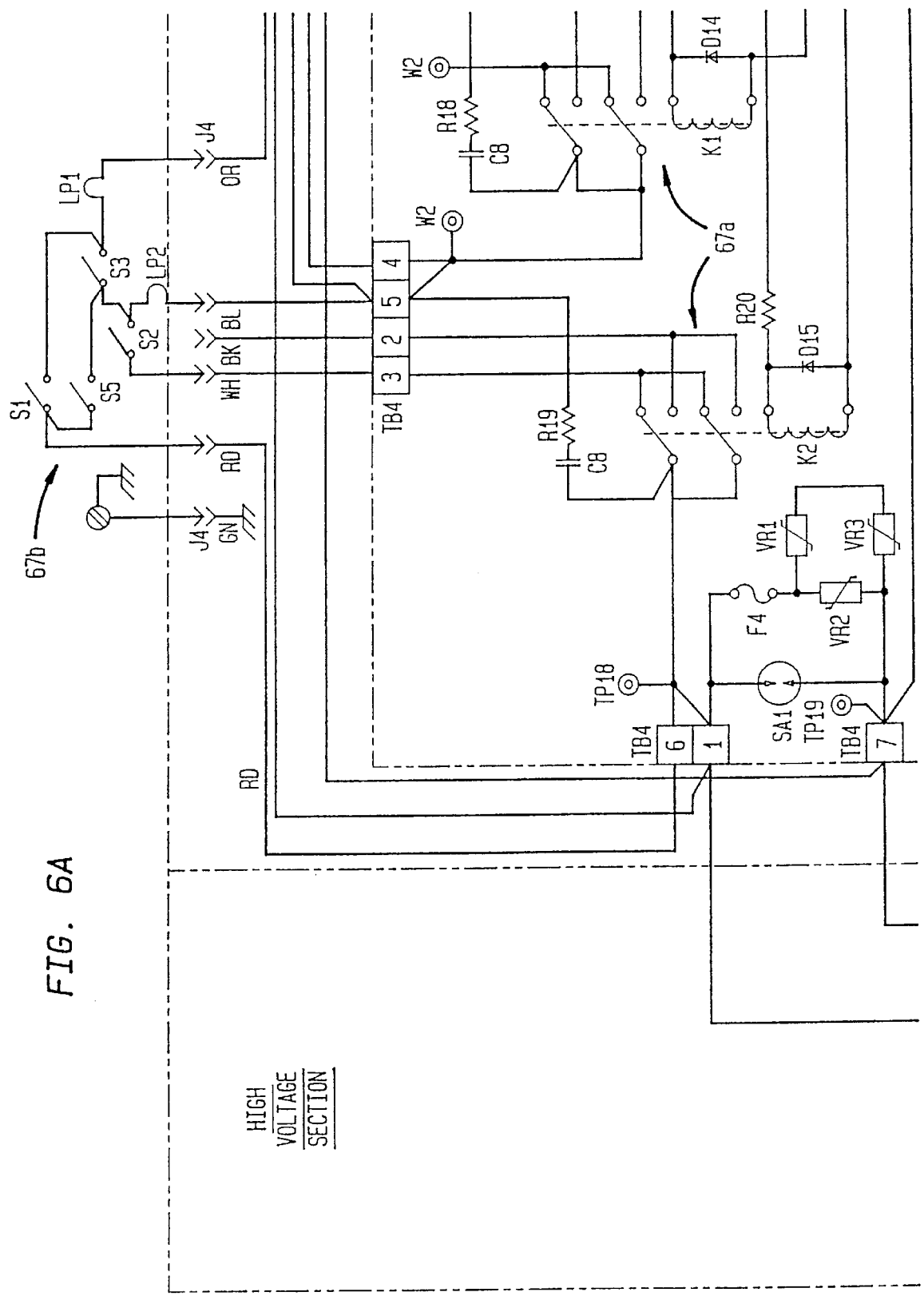
Figure 6B:
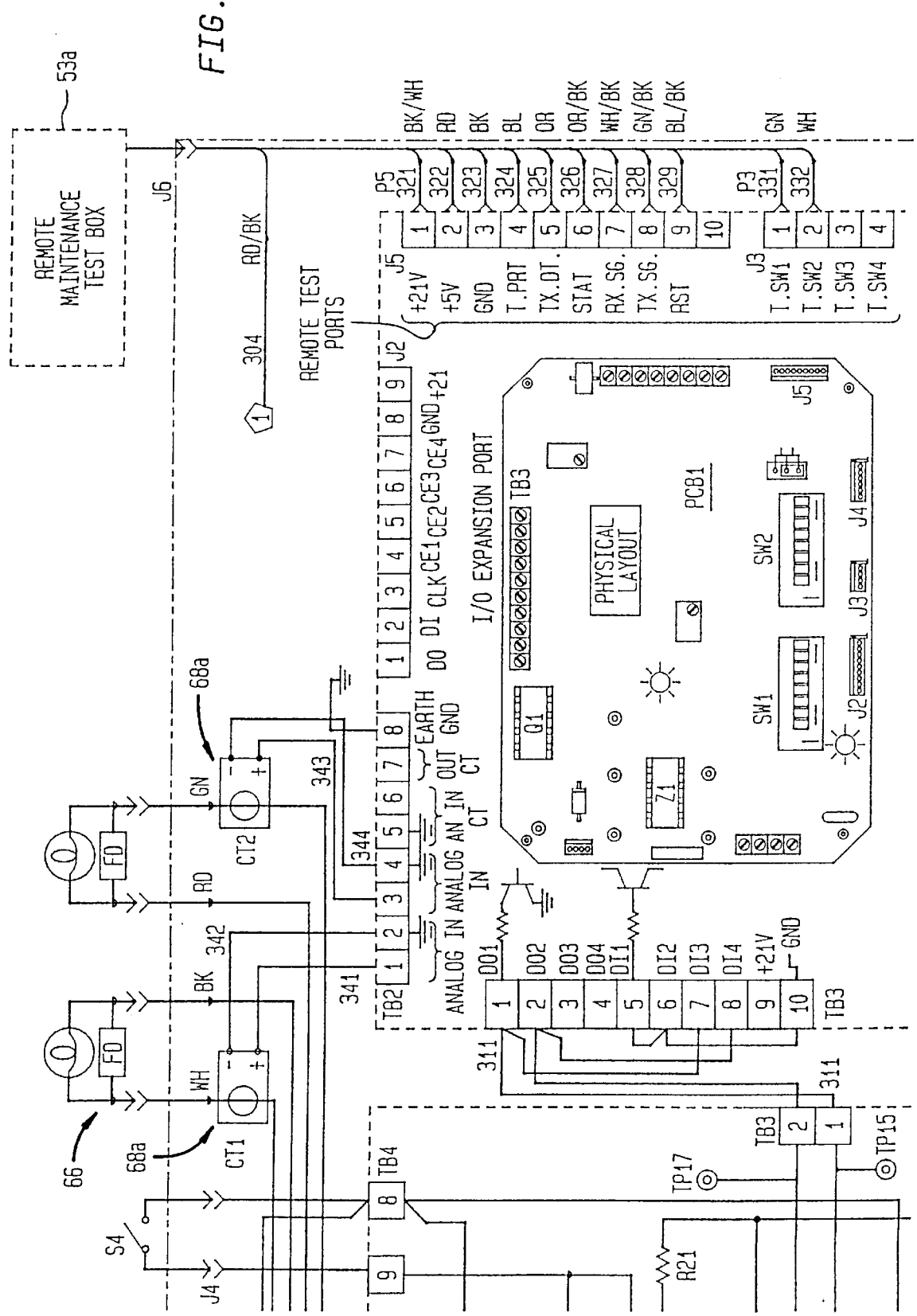
Figure 6C:
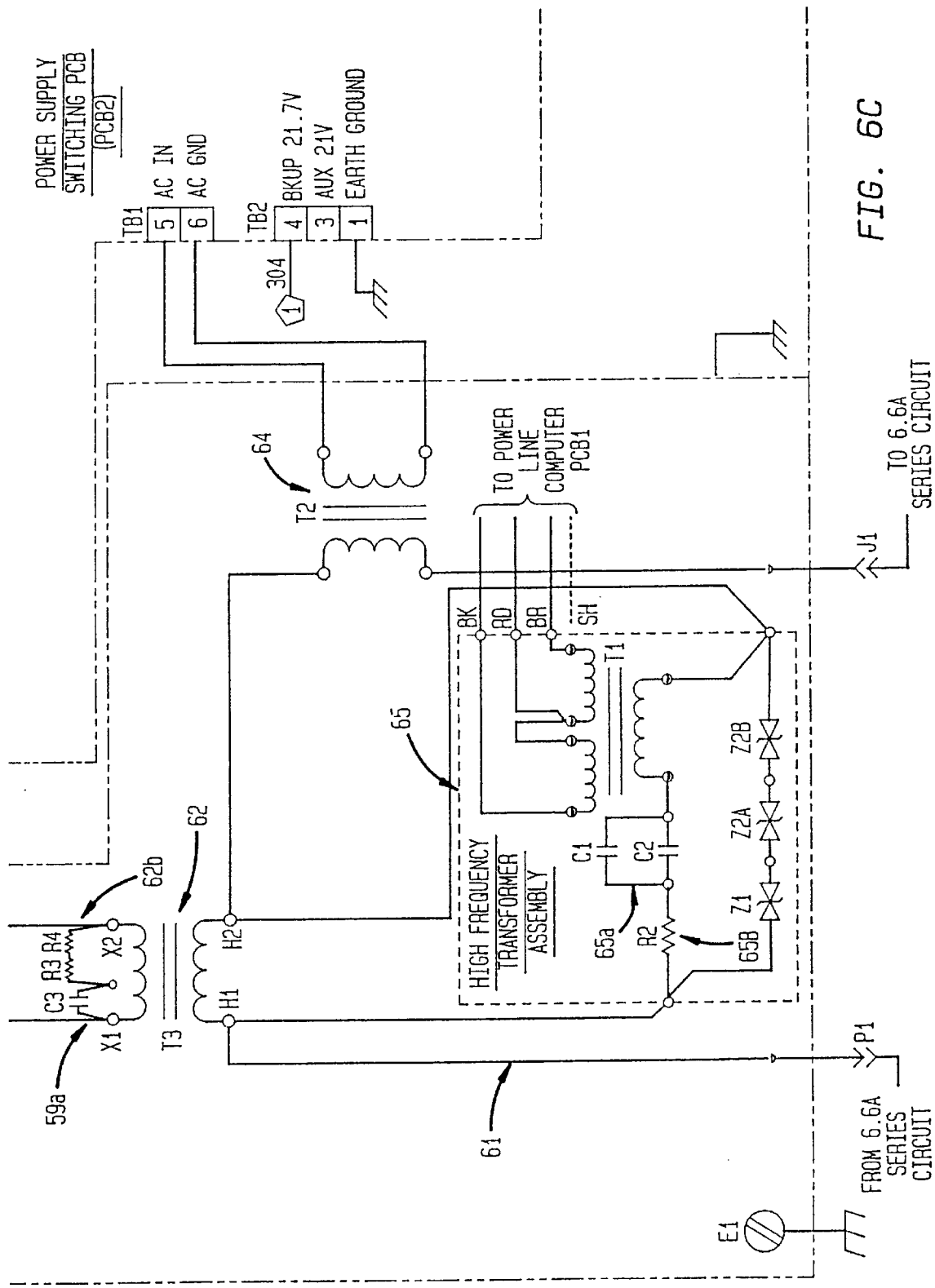

FIG. 6, which includes FIGS. 6A, 6B, 6C and 6D, is a circuit diagram of another type of remote controller transceiver for a red/yellow stop bar control in accordance with another embodiment of the present invention. This circuit particularly shows the input/output arrangement. FIG. 6 shows electrical circuit 61 which is connected to power transformer 62. The secondary of power transformer 62 has bypass resistors 62a and capacitor 62b. The remote controller transceiver also comprises a remote microprocessor (such as integrated circuit on EPROM 63) which is powered by transformer 64 and is adapted to communicate with the master control module via high frequency transformer 65. The primary of high frequency transformer 65 also contains bypass capacitors 65a and bypass resistors 65b allowing the high frequency transformer to bypass transformers 62 and 64. EPROM 63 controls lights 66 via relays 67a and 67b, and system failure mode may be set in accordance with wiring receptacle 67c. The EPROM 63 also monitors the status of the light(s) via voltage sensors 68a and 68b, which allow for control. Also shown is transistor 69.

Figure 7A:
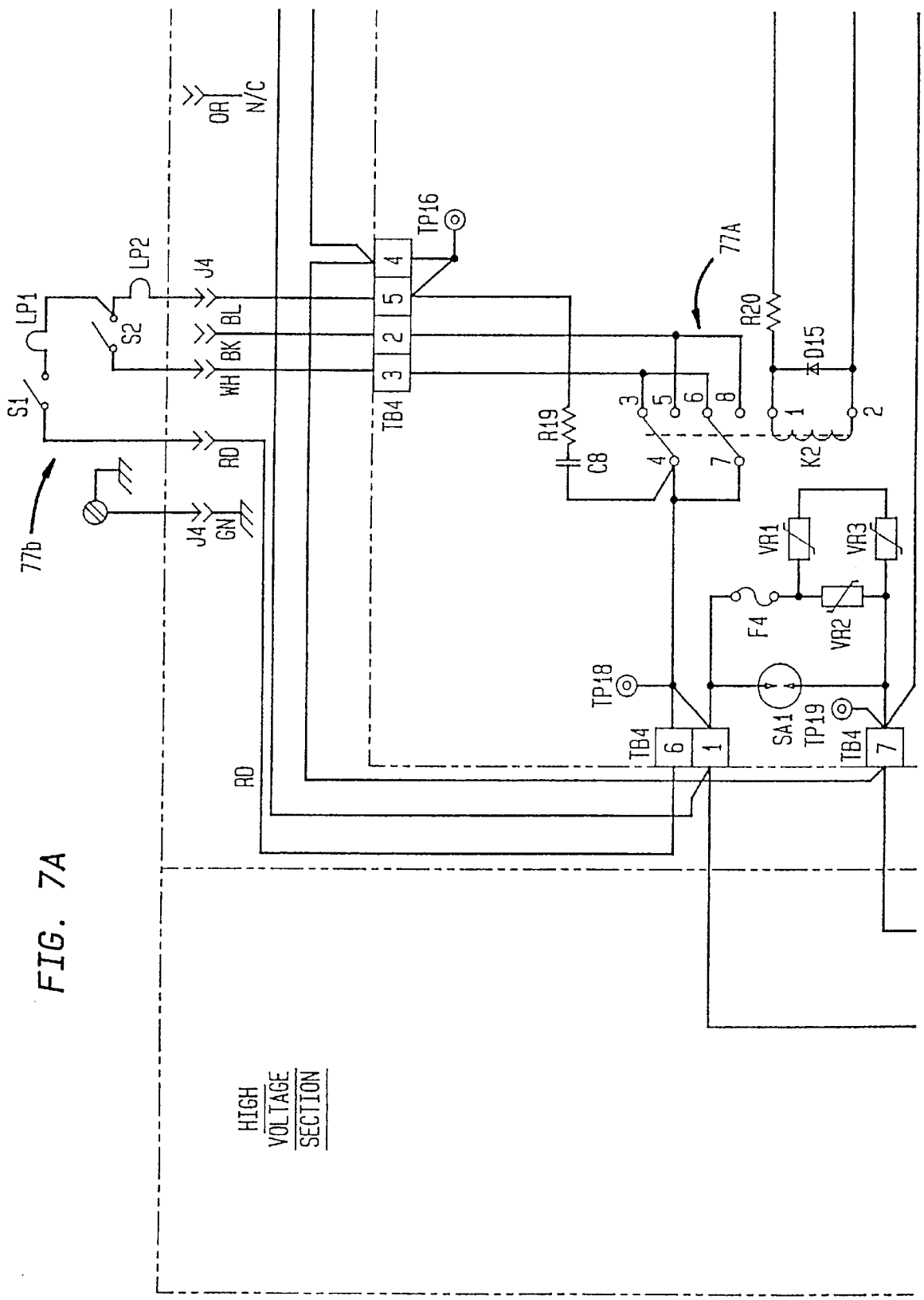
Figure 7B:
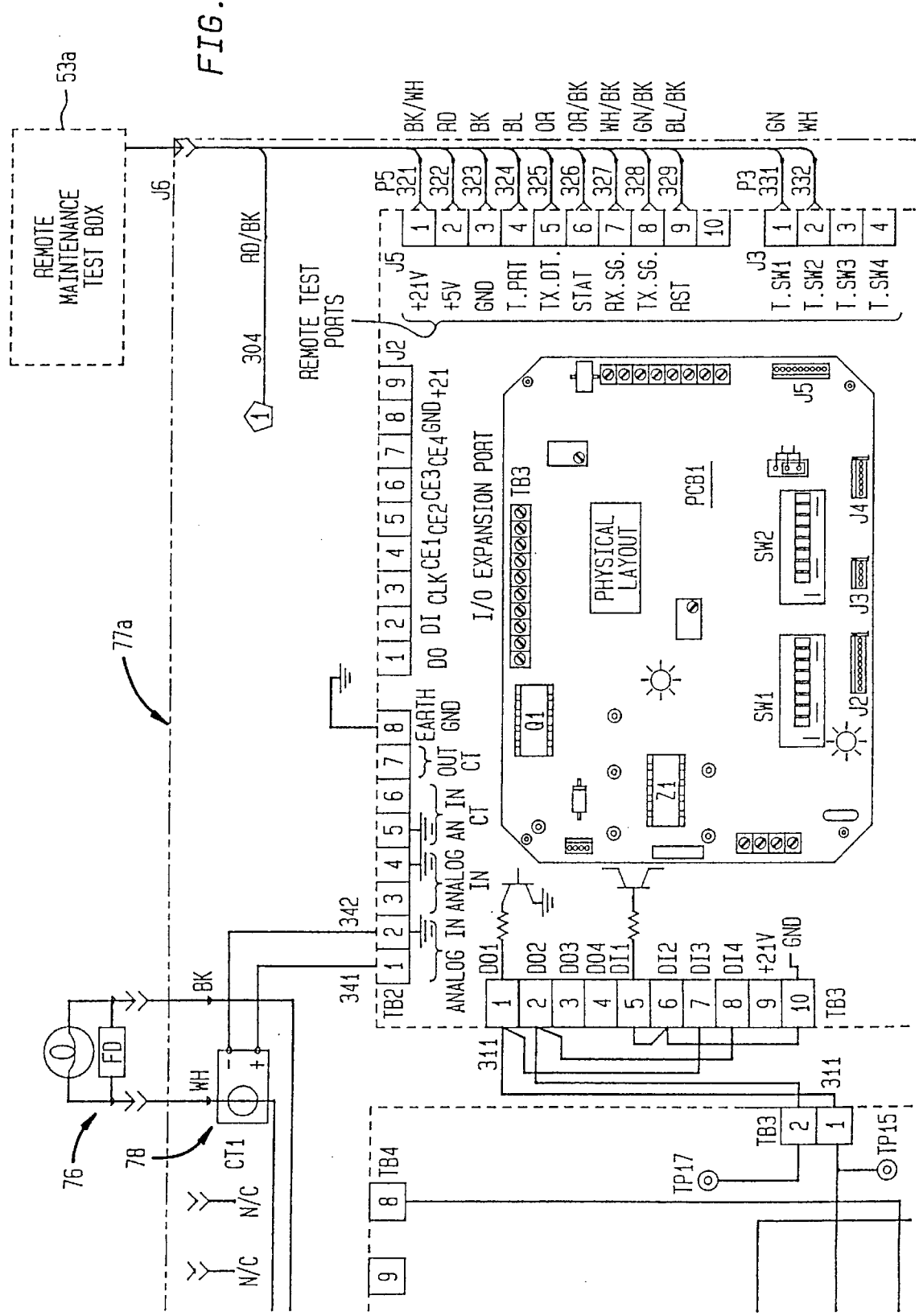
Figure 7C:
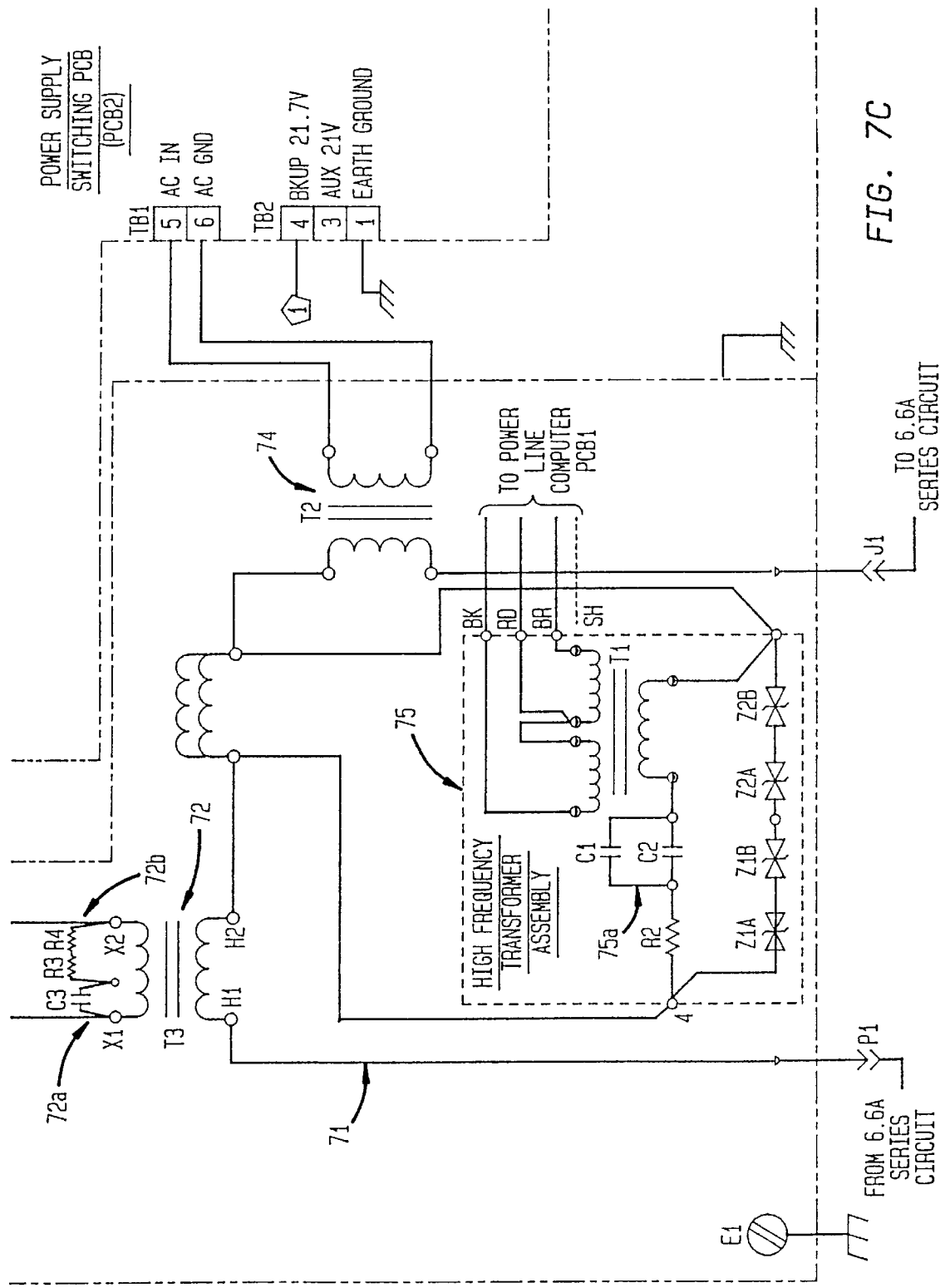

FIG. 7, which includes FIGS. 7A, 7B, 7C and 7D, is a circuit diagram of a remote controller transceiver for an elevated red stop bar lamp control as an alternative to that shown in FIG. 4. FIG. 7 shows electrical circuit 71 which is connected to power transformer 72. The secondary of power transformer 72 has bypass resistors 72a and capacitor 72b.

The remote controller transceiver also comprises a remote microprocessor (such as integrated circuit on EPROM 73) adapted to communicate with the master control module via high frequency transformer 75. The primary of high frequency transformer 75 also contains bypass capacitors 75*a* allowing the high frequency transformer to bypass transformers 72 and 74. EPROM 73 controls light(s) 76 via relays 77*a* and 77*b*, and system failure mode may be set in accordance with wiring receptacle 77*c*. The EPROM 73 also monitors the status of the light(s) via voltage sensor 78.

Figure 8A:
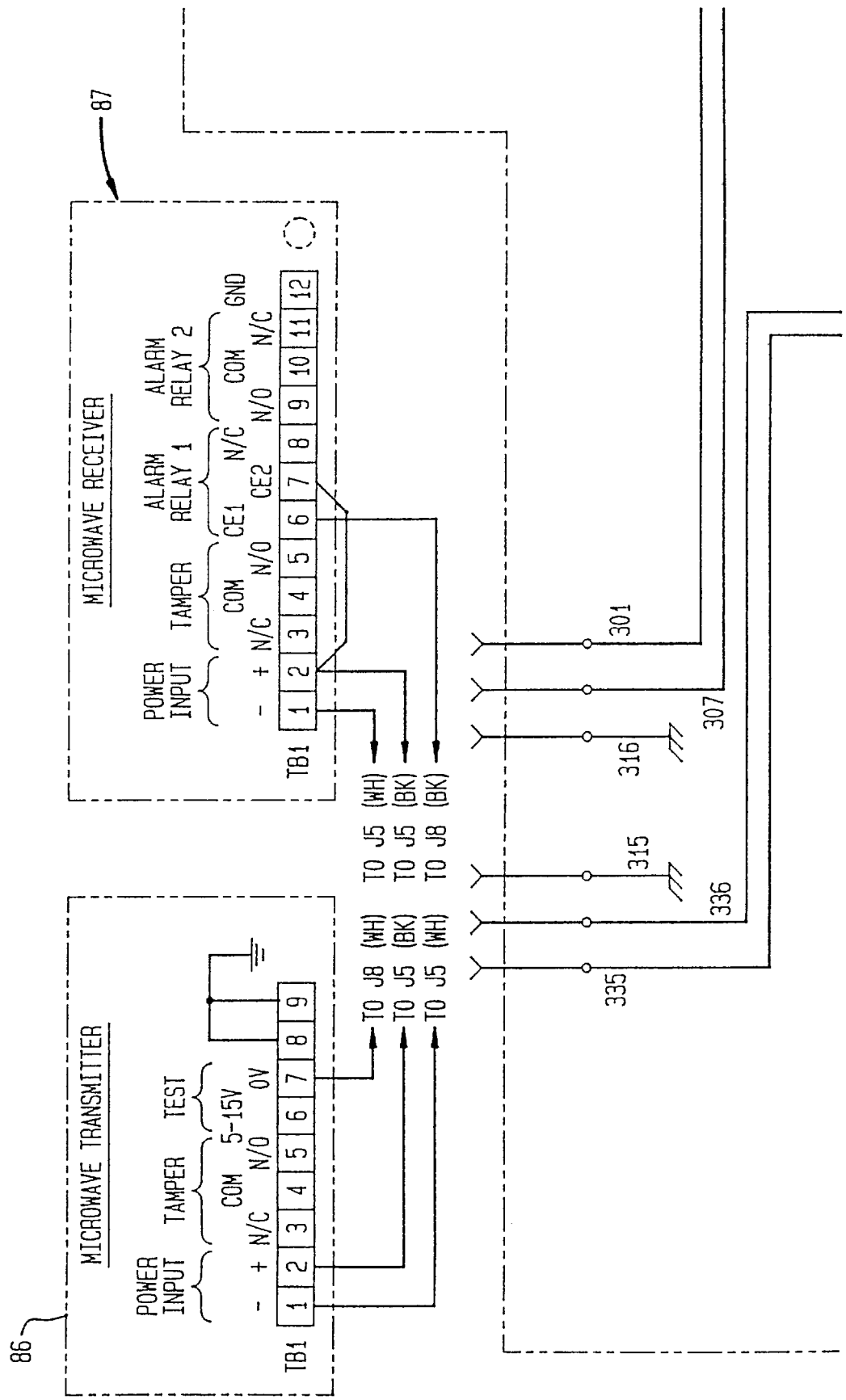
Figure 8B:
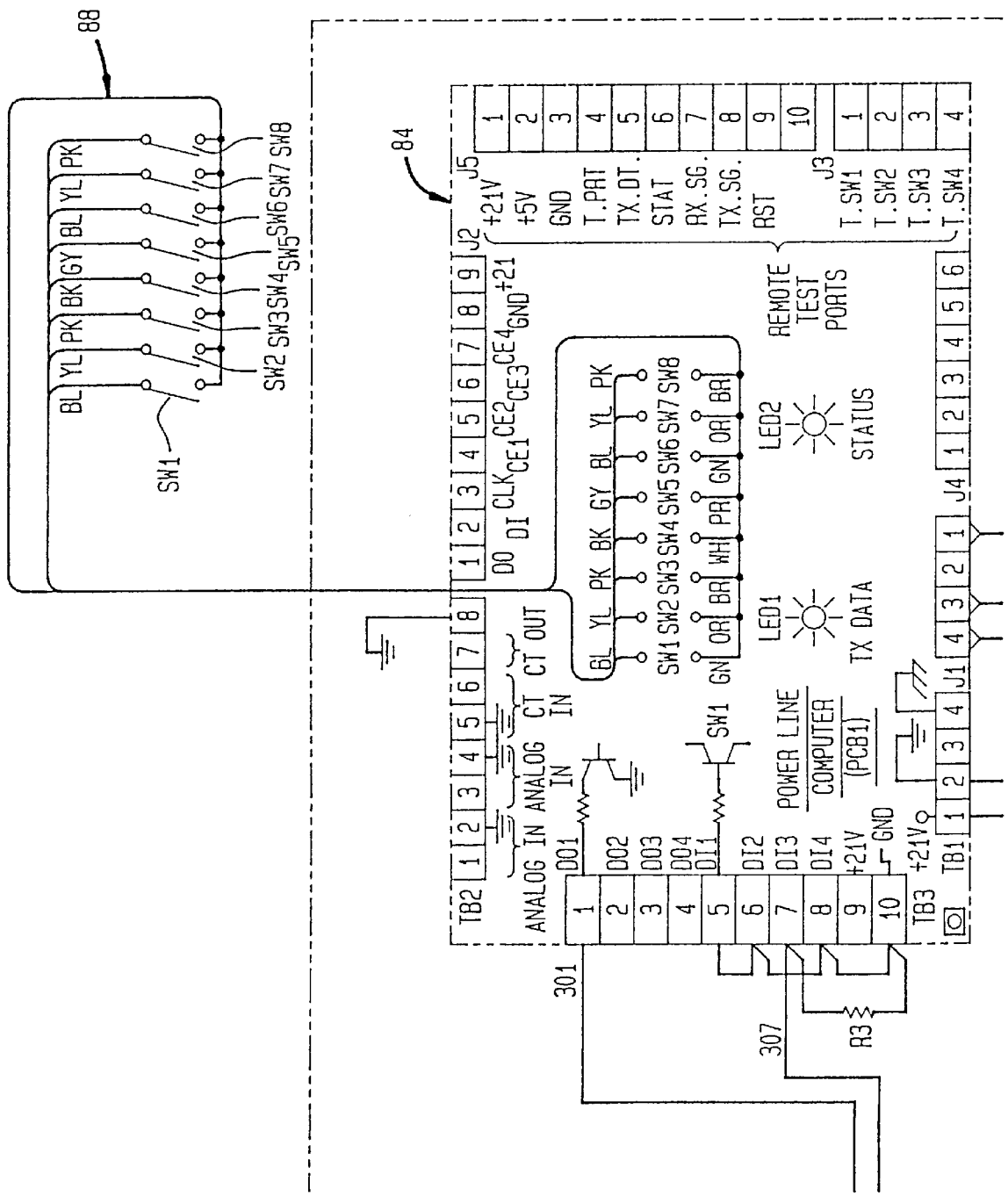
Figure 8C:
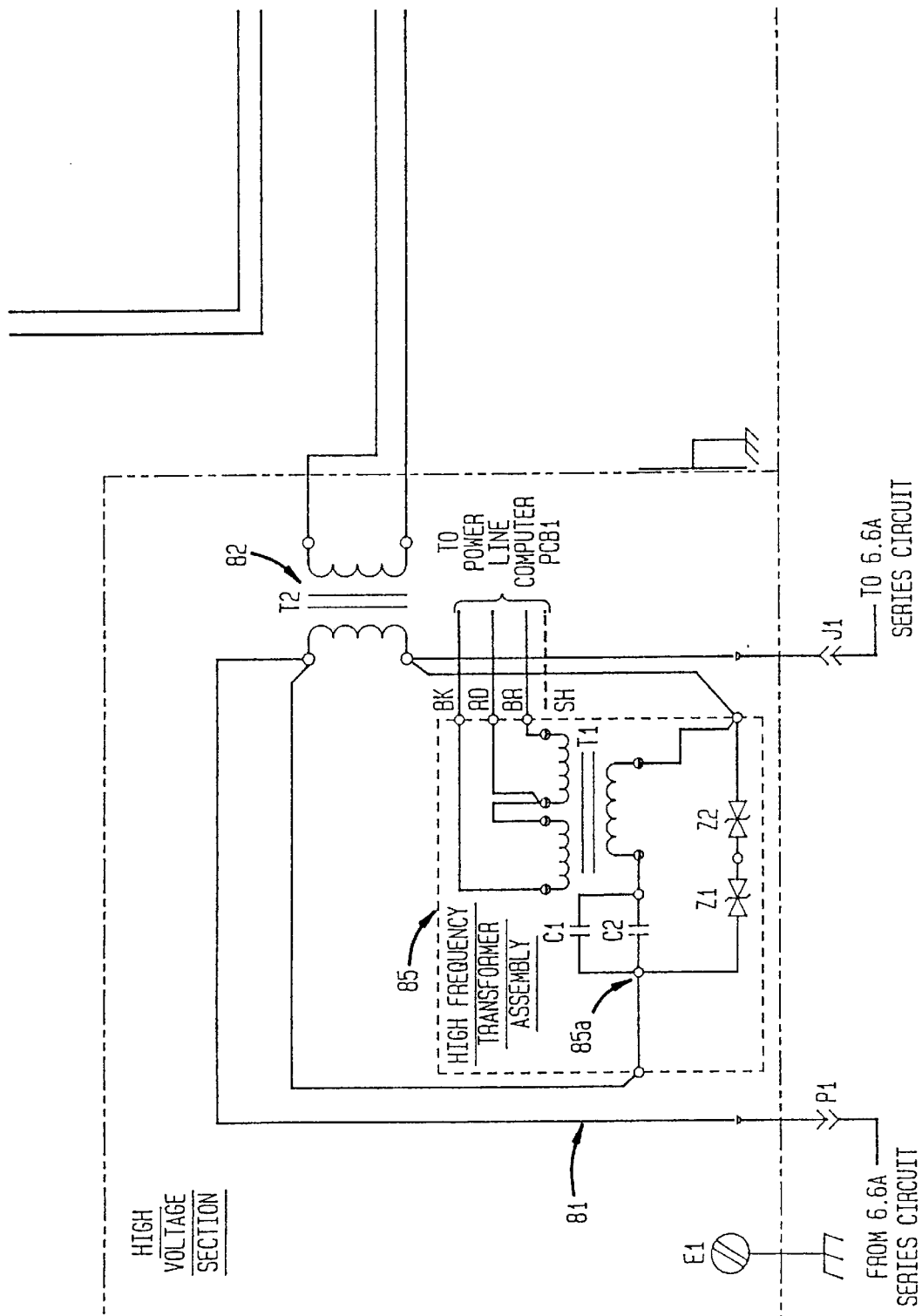

FIG. 8, which includes FIGS. 8A, 8B, 8C and 8D, is a circuit diagram of a remote controller transceiver for a typical microwave transmitter/receiver used as an aircraft presence detector in accordance with one embodiment of the present invention. FIG. 8 shows electrical circuit 81 which is connected to power transformer 82 which energizes power supply switching PCB 83. The remote controller transceiver also comprises a remote microprocessor (such as integrated circuit on EPROM 84) which is also powered by transformer 82 via power supply switching PCB 83, and is adapted to communicate with the master control module via high frequency transformer 85. The primary of high frequency transformer 85 also contains bypass capacitors 85*a* allowing the high frequency transformer to bypass transformer 82. EPROM 84 controls and receives input from microwave transmitter 86 and microwave receiver 87. The address of the EPROM 84 may be set by ribbon dip switch assembly 88.

Figure 9A:
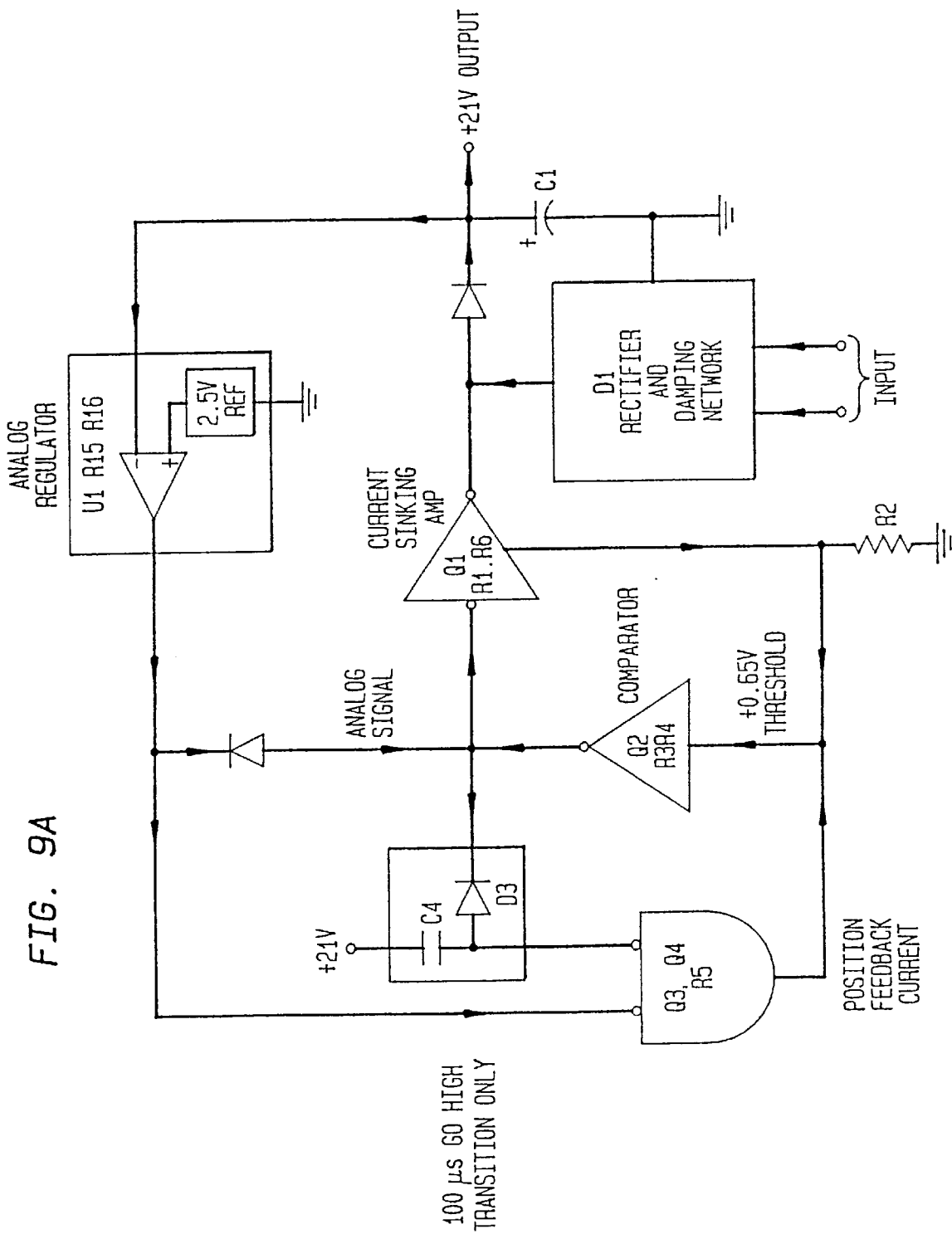
FIG. 9A is a circuit schematic for circuitry associated with a DC power supply used in accordance with another embodiment of the present invention.

FIG. 9A is a loop powered DC supply switching type function diagram, describing its theory of operation.

Regulation of the voltage in the storage capacitor C1 is maintained by shunt action of transistor Q1 when C1 has charged to the proper voltage as determined by U1; continued current entry in the circuit will be dissipated by Q1 into heat. In order to limit the heat production, transistor Q1 will enter switching mode when the voltage developed across the current sampling resistor R2 exceeds 0.65 volts. This diagram has the following features: (1) rectifier and damping network, (2) analog regulator, (3) current sinking amplifier, (4) comparator, (5) 100 uS delay, and (6) transistor nand gate.

Figure 9B:
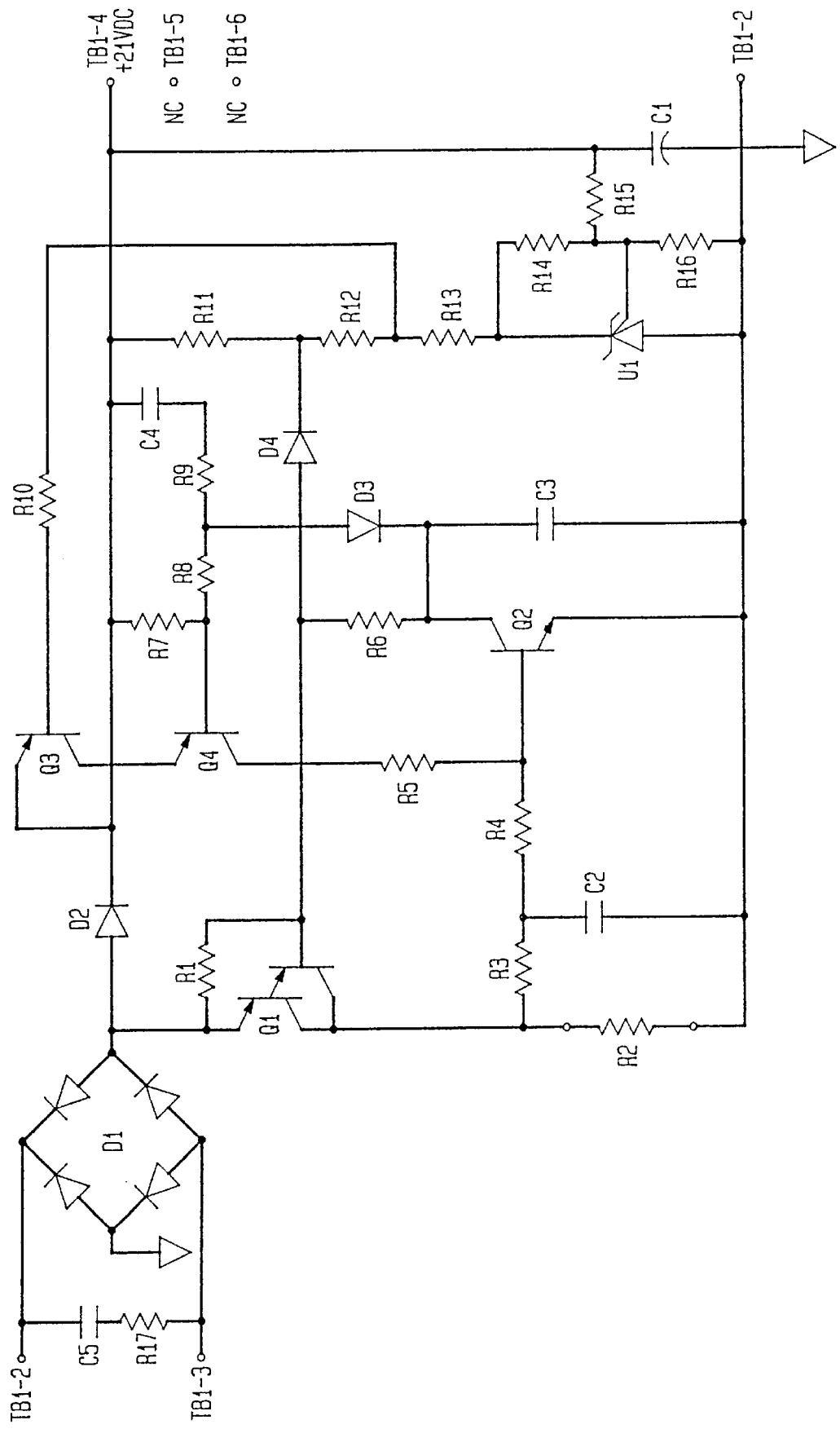
FIG. 9B is a wiring diagram for circuitry associated with a DC power supply used in accordance with another embodiment of the present invention.

Turning to FIG. 9B, the regulated A.C. current is supplied to terminals TB1-2 and TB1-3 (input). The voltage zero crossing is stabilized by damping action of C5 and R17. The current is then rectified by the bridge D1, and passes through the fast recovery diode D2, and sources the storage capacitor C1.

As to the analog regulator, the voltage stored in C1 is divided by R15 and R16 and enters the Op-amp part of U1, where it is compared to the internal 2.5 volt reference. If the voltage is found to exceed the reference, the output of U1 will provide a sinking current to Q1 via R13 to R12 to D4.

Turning to the current sinking amplifier, the emitter of Q1 controls the voltage of C1 by sinking the current supplied by D1. As current flows from the emitter to the collector, a proportionate voltage develops across resistor R2. As to the comparator, the base/emitter junction of transistor Q2 is used as a comparator with a fixed threshold (i.e. +0.65 volts). When the current sampling resistor R2 obtains the level of +0.65 volts and this signal passes through the integrator R3 and C2, the transistor Q2 turns on, pulling R6 and the base of Q1 low. Q1 is now in the switch condition with an emitter voltage of less than 2 volts and will remain so until the current supplied by D1 is interrupted during zero crossing of the input power period.

With respect to the 100 uS delay, when the collector of Q2 goes low, diode D3 pulls R8 low without delay, but when the collector of Q2 goes high during zero crossing of the input power, the charge in C4 delays R8 going high by 100 uS.

Turning to the transistor NAND gate, when D3 pulls R8 low (approximately 2 volts less than level seen at C1), the transistor Q4 turns on pulling R6 high. A resistor R6 now provides 0.2 milliamp of positive feedback current to the base of Q2 for the purpose of adding hysteresis. During extremely fast zero crossings of the input power, transistor Q1 could remain switched low. When this occurs, U1 stops sinking current, pulling up resistor R11 via R10. This pulls the base of transistor Q3 high and being cascaded with Q4, turns off Q4 removing the hysteresis provided by R6. This action allows the comparator to turn off and Q1 to unlatch from being switched low.

With respect to diode D2 and D4, diode D2 prevents the discharge of storage capacitor C1 when transistor Q1 switches low. Diode D4 prevents pulling Q1 low, when transistor Q1 switches low.

A circuit diagram of the subject DC power supply is provided in FIG. 9B.

FIGS. 10, 10A1, 10A2 and 10B show the component parts and wiring assembly for a remote controller transceiver in accordance with the wiring diagram of FIG. 5, as it would appear from a sectioned view of its protective water-proof canister, in accordance with one embodiment of the present invention.

FIG. 10 shows plug connectors 100*b*, 100*c* and 100*d* respectively at the ends of leads 100*f*, 100*g* and 100*h* which extend through the top lid weldment assembly 101 of the canister 102. Also shown are connector caps 100*j*, 100*k* and 100*l* (see also FIGS. 10A1 and 10B). The top lid weldment assembly 101 also supports handle 103, air pressure inlet 105 and pressure relief valve 104. The air pressure inlet 105 and pressure relief valve 104 allow the canister to be tested for water tightness by pressurizing the canister and submerging it in water to check for air leaks. The pressure may then be released before installation.

Beneath the lid and within the canister is disposed snubber network assembly 145. Canister 102 contains cylindrical plastic sheath 106 and plastic shield plate 107 which supports power line computer PCB assembly 108 (DC power supply). Also supported on the plastic plate are voltage transformer 110.

FIG. 10A1 shows plug connectors 100*a*, 100*b*, 100*c* and 100*d* respectively at the ends of leads 100*e*, 100*f*, 100*g*, and 100*h* which extend through the top lid weldment assembly 101 of the canister 102. Also shown are connector caps 100*i*, 100*j*, 100*k* and 100*l* (see also FIG. 10B). The top lid weldment assembly 101 also supports handle 103, air pressure inlet 105 and pressure relief valve 104.

Beneath the lid and within the canister is disposed plastic sheath 106 and plastic shield plate 107 which supports power line computer PCB assembly 108 (DC power supply) and power supply PCB 109 (held in position by standoff pieces 114). Also supported on the plastic plate are voltage transformer 110, current transformer 111, power supply transformer 112 and high frequency transformer 113.

Turning to FIG. 10B, this view shows power supply PCB 109, filter choke 115 (100 uH), power supply transformer 112 and high frequency transformer 113. Also shown is the position of power transistor/resistor assembly 122.

Turning to FIG. 10C2, this Figure shows a sectioned view of the connection extending through the canister lid, such as for lead 100*g* (see also FIG. 10C1). FIG. 10C2 snows lead 100*g* which passes through connector cap 100*k* and connector grommet 100*m*, and through threaded connector body 100*n*. The lead 100*g* is spliced as shown to reveal wire 100*q* and the bottom portion of the connector body 100*n* is sealed with epoxy 100*p*. Once installed in the canister lid, the connections can be sealed by using an appropriate adhesive, such as Permex.

FIG. 10D shows a top view of lid 101 which supports connector caps 100*i*, 100*j*, 100*k* and 100*l*; handle 103; air pressure inlet 105 and pressure relief valve 104; ground attachment 115; 8-pin connector 116 (for testing microprocessor, see FIGS. 10E1, 10E2 and 10E3); fail-safe port 117*a* and DIP switch fixture 117 (see FIGS. 10F1, 10F2 and 10F3).

FIGS. 10E1, 10E2 and 10E3 show the construction of test port 116 and wiring harness 116*a*.

FIGS. 10F1, 10F2 and 10F3 show DIP switch fixture 117 which is made up of DIP switch 118, EMT connector 119, ribbon assembly 120 and plug 121. DIP switch 118 is centered in EMT connector 119 and held in place by removable jig 119*a* (see FIGS. 11A and 11B) while epoxy is used to affix the DIP switch in position. Also shown are lock nut 118*a*, water-proof cover 118*b* and socket 118*c*.

FIGS. 10G1, 10G2 and 10G3 shows the power transistor/resistor assembly which may be used in accordance with the present invention for mounting the power transistor/resistor. FIGS. 10G1 and 10G2 show transistor/resistor 122 comprising transistor 123 and resistor 124. These components are held in place on mounting plate 125 and between mica members 126, 127 and 128, by non-conductive Lexan shield 129 and aluminum clip 130 via screws 132 (see FIG. 10G3). The assembly may be additionally firmed through use of adhesive such as at positions 131. The assembly 122 is held to the inner surface of the canister by screws 133 (see FIGS. 10H1 and 10H2).

FIG. 10H1 shows the underside of canister lid 101 showing mounting plate 107 and transistor/resistor assembly 122.

Figure 10I:
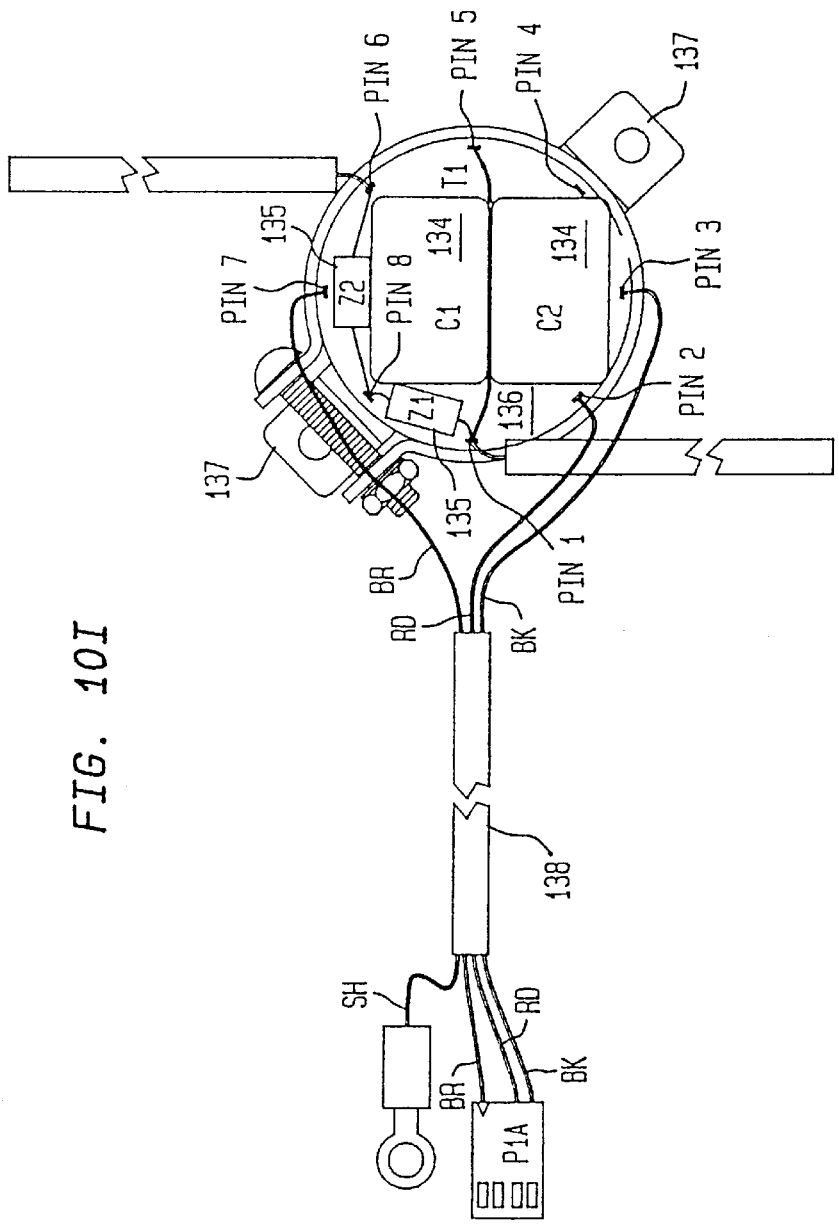
FIG. 10I is a detailed plan view of the high frequency transformer assembly mounted in the canister shown in FIG. 10B.

FIG. 10I is a detailed view of the high frequency transformer used in the present invention. This Figure shows capacitors 134, bi-directional zeners 135, high frequency transformer 136, mounting bracket 137 and wiring harness 138.

Figure 10J:
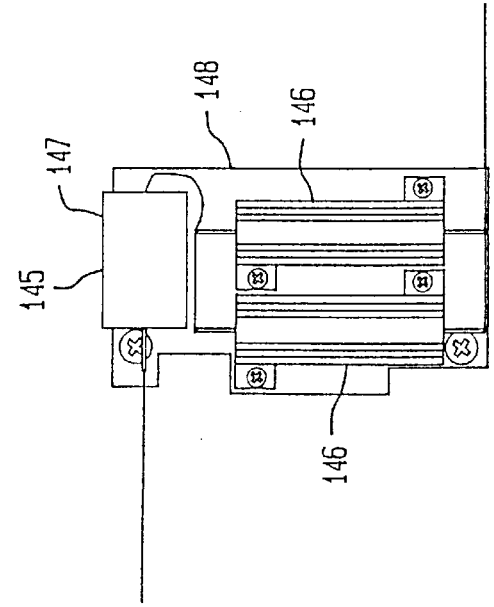
FIG. 10J is a detailed plan view of the snubber network assembly mounted on the underside of the lid of the canister shown in FIG. 10.

FIG. 10J shows snubber network assembly 145 (the resistors and capacitor across the secondary) which comprises resistor 146 and capacitors 147, on mounting plate 148.

FIGS. 11A and 11B show mounting jig 150 which is used to mount the DIP switch or the fail safe toggle switch in the externally mounted fixture such as one of the type shown in FIGS. 10F1, 10F2 and 10F3.

Figure 12:
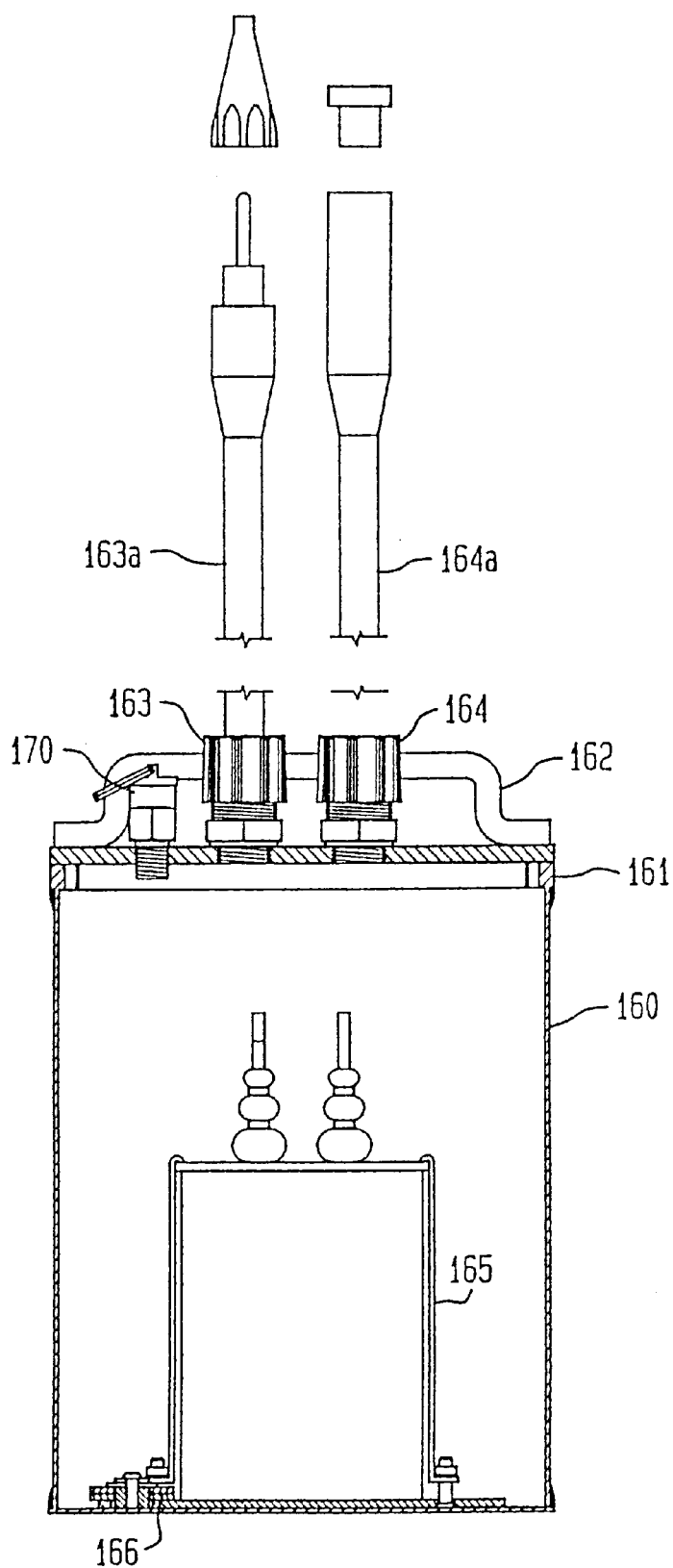
FIG. 12 is a sectioned view of a protective canister containing a by-pass device in accordance with an embodiment of the invention.

FIG. 12 shows a sectioned view of a protective metal canister 160 having lid 161 being fitted with handle 162, and connectors 163 and 164 (such as those detailed in FIG. 10C2), accommodating leads 163*a* and 164*a*, respectively. Canister 160 contains by-pass device 165 (for by-passing portions of the electrical circuit as shown in FIGS. 2B1, 2B2 and 2B3, item 207, and FIG. 2D) mounted on plate 166. Also shown is pressure release valve 170.

Figure 12B:
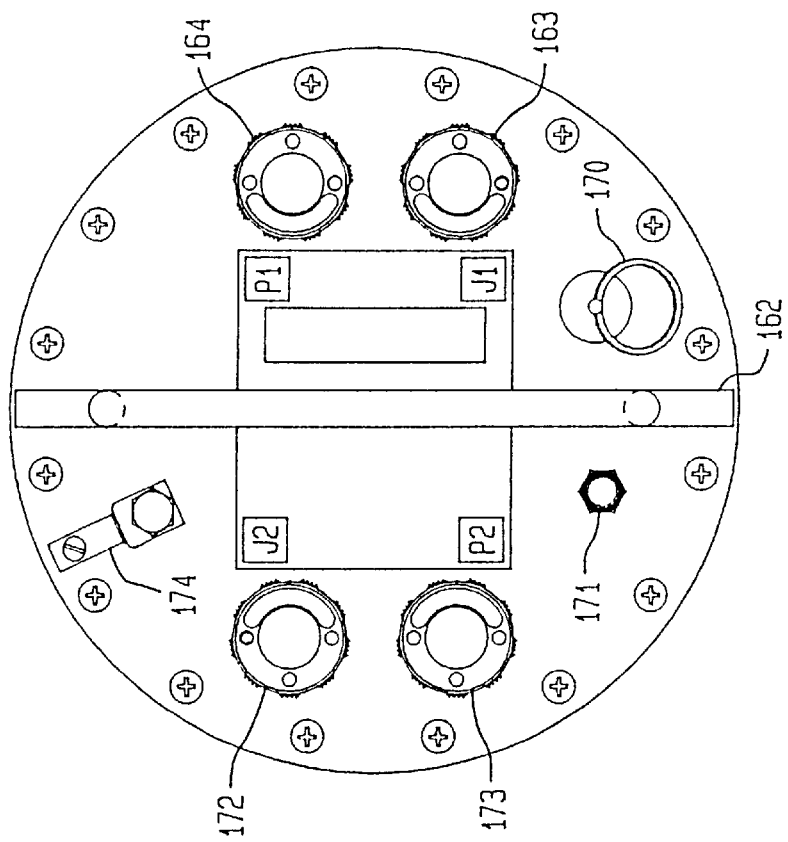
FIG. 12B is a plan view of the lid of the canister shown in FIG. 12.
Figure 12A:
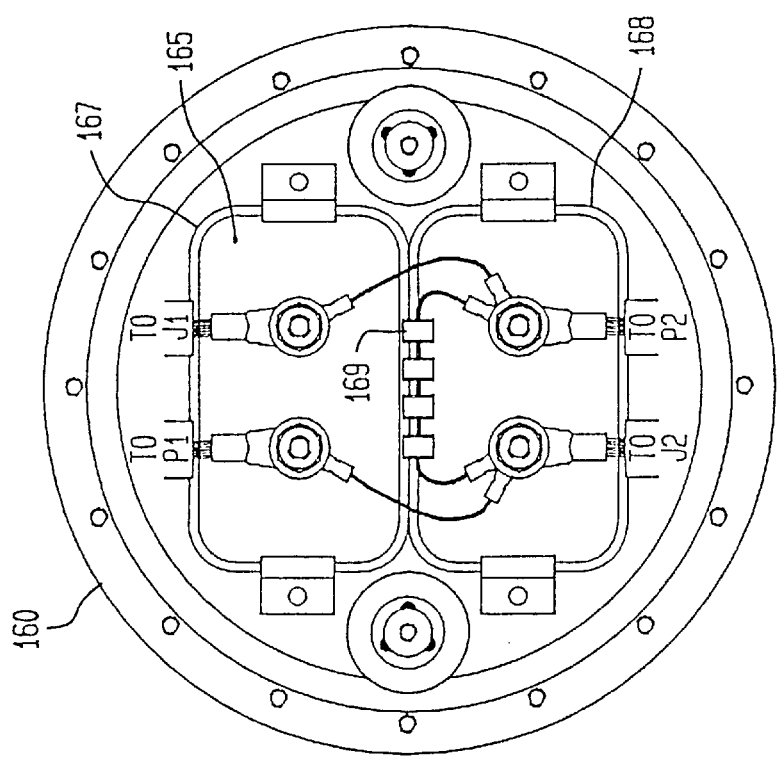
FIG. 12A is a plan view of a protective canister (without the lid) containing a by-pass device in accordance with an embodiment of the invention.

FIG. 12A shows a plan view of the assembly of FIG. 12 without the lid. FIG. 12A shows canister 160 containing by-pass device 165 which comprises capacitors 167 and 168, and surge protectors 169.

FIG. 12B shows a top view of lid 161 which supports connector caps 163, 164, 172 and 173; handle 162; air pressure inlet 171 and pressure relief valve 170; and ground attachment 174. The air pressure inlet 171 and pressure relief valve 170 allow the canister to be tested for water tightness by pressurizing the canister and submerging it in water to check for air leaks. The pressure may then be released before installation.

In view of the foregoing disclosure it will be within the ability of one skilled in the relevant arts to make alterations or variations to the present invention, such as through the substitution or equivalent parts and materials, or the integration or disintegration of elements, to practice the invention without departing from its spirit as reflected herein.

What is claimed is:

1. An airfield lighting system, said system comprising:
    (a) an electrical circuit, said circuit adapted to conduct a current and a control electrical signal, and comprising a plurality of transformers connected in series, each of said transformers adapted to energize at least one airfield light, said electrical circuit additionally comprising a low pass filter disposed between a master control module and a constant current regulator, said low pass filter comprising a pair of inductors disposed in series on either side of said circuit, and at least one capacitor connected across said circuit and connecting at points disposed between each of said pair of inductors;
    (b) a general control microprocessor;
    (c) said master control module adapted to accept a control digital signal from said general control microprocessor, to convert said control digital signal to a control electrical signal, and to send said control electrical signal through said circuit;
    (d) remote controller means connected to each of said transformers, each of said remote controller means comprising:
        (i) means to accept said control electrical signal and to convert said control electrical signal to a converted control digital signal,
        (ii) switching means to control said at least one airfield light, and
        (iii) remote controller microprocessor means adapted to process said converted control digital signal and control said switching means in accordance with said converted control digital signal; and
    (e) said constant current regulator adapted to control the current flowing through said circuit.

2. An airfield lighting system, said system comprising:
    (a) an electrical circuit, comprising a constant current regulator having first and second output terminals, a plurality of transformers connected in series from the first output terminal of the constant current regulator to the second output terminal of the constant current regulator, each of said transformers adapted to energize at least one airfield light, a low pass filter disposed between a master control module and the first terminal of the constant current regulator, and a bypass circuit coupled in parallel with the low-pass filter to provide a relatively low-impedance path for control electrical signals provided by said master control module to propagate to one of the plurality of series-connected transformers coupled to the second output terminal of the constant current regulator;
    (b) a general control microprocessor;
    (c) said master control module being adapted to accept a control digital signal from said general control microprocessor, to convert said control digital signal to one of said control electrical signals, and to send said one control electrical signal through said circuit, wherein said master control module is adapted to provide bi-directional communications and control among at least said master control module and said at least one airfield light;
(d) remote controller means connected to each of said transformers, each of said remote controller means comprising:
  (i) means to accept said control electrical signal and to convert said control electrical signal to a converted control digital signal,
  (ii) switching means to control said at least one airfield light, and
  (iii) remote controller microprocessor means adapted to process said converted control digital signal and control said switching means in accordance with said converted control digital signal; and
(e) said constant current regulator adapted to control the current flowing through said circuit.

3. An airfield lighting system according to claims 1 or 2 wherein said remote controller microprocessor means is adapted to generate a return digital signal, and wherein said remote controller means further comprises means to convert said return digital signal to a return electrical signal and to send said return electrical signal through said circuit; and wherein said master control module is adapted to accept said return electrical signal, to convert said return electrical signal to a converted return digital signal, and to send said converted return digital signal to said general control microprocessor.

4. An airfield lighting system according to claims 1 or 2 wherein said master control module is adapted to accept a detection control digital signal from said general control microprocessor, to convert said detection control digital signal to a detection control electrical signal, and to send said detection control electrical signal through said circuit, said circuit comprising at least one additional transformer connected to said electrical circuit, said at least one additional transformer adapted to energize an aircraft detection means; and detection remote controller means connected to each of said transformers, each of said detection remote controller means comprising:
  (i) means to accept said detection control electrical signal and to convert said detection control electrical signal to a converted detection control digital signal,
  (ii) electrical control means to control said at least one aircraft detection means, and
  (iii) detection remote controller microprocessor means adapted to process said converted detection control digital signal and control said electrical control means in accordance with said converted detection control digital signal.

5. An airfield lighting system according to claim 4 wherein said detection remote controller means is a adapted to generate a detection return digital signal, and wherein said detection remote controller means further comprises means to convert said detection return digital signal to a detection return electrical signal and to send said detection return electrical signal through said circuit; and wherein said master control module is adapted to accept said detection return electrical signal, to convert said detection return electrical signal to a converted detection return digital signal, and to send said converted detection return digital signal to said general control microprocessor.

6. An airfield lighting system according to claims 1 or 2 wherein at least one of said plurality of transformers additionally comprises at least one by-pass capacitor parallel to the primary of said at least one transformer.

7. An airfield lighting system according to claim 6 wherein at least one of said plurality of transformers additionally comprises a plurality of by-pass capacitors parallel to the primary of said at least one transformer.

8. An airfield lighting system according to claim 6 wherein at least one of said plurality of transformers additionally comprises a plurality of parallel by-pass capacitors parallel to the primary of said at least one transformer.

9. An airfield lighting system according to claims 6, 7 or 8 wherein said at least one of said plurality of transformers additionally comprises lighting arresting means.

10. An airfield lighting system according to claims 1 or 2 wherein said at least one of said plurality of transformers additionally comprises a series comprising at least one by-pass capacitor and at least one by-pass resistor parallel to the secondary of said at least one of said plurality of transformers.

11. An airfield lighting system according to claim 10 wherein said at least one by-pass capacitor comprises a plurality of by-pass capacitors.

12. An airfield lighting system according to claim 10 wherein said at least one by-pass resistor comprises a plurality of by-pass resistors.

13. An airfield lighting system according to claim 11 wherein said plurality of by-pass capacitors comprises a plurality of parallel by-pass capacitors.

14. An airfield lighting system according to claim 12 wherein said plurality of by-pass resistors comprises a plurality of parallel by-pass resistors.

15. An airfield lighting system according to claim 10 wherein said series additionally comprises at least one inductor.

16. An airfield lighting system according to claims 10, 11, 12, 13, 14 or 15 wherein said at least one resistor is in contact with a heat sink material.

17. An airfield lighting system according to claims 9, 10, 11, 12, 13 or 14 wherein said at least one resistor is disposed a sufficient distance from the respective transformer and the respective remote controller means with which said at least one resistor is associated so as to sufficiently insulate said at least one resistor therefrom.

18. An airfield lighting system according to claim 1 or 2 wherein at least two transformers of said plurality of transformers are by-passed by at least one capacitor.

19. An airfield lighting system according to claims 1, 3 or 2 wherein each said remote controller means is disposed in a water-proof container and each said remote controller microprocessor means comprising an addressable digital switch, said addressable digital switch extending through respective water-proof container so as to be accessible from outside said container.

20. An airfield lighting system according to claims 1, 3 or 2 wherein each said remote controller means is disposed in a water-proof container and each said remote controller microprocessor means comprising a test port, said test port extending through respective water-proof container so as to be accessible from outside said container.

21. An airfield lighting system according to claims 1, 3 or 2 wherein said electrical circuit additionally comprises a by-pass device disposed between said master control module and said constant current regulator, said by-pass device comprising at least one by-pass capacitor disposed across said electrical circuit.

22. An airfield lighting system according to claims 1, 3 or 2 wherein said switching means comprises fail-safe circuit means which causes said at least one airfield light to be energized in the event said remote controller microprocessor means ceases to be operative.

23. An airfield lighting system according to claims 1, 3 or 2 wherein said switching means comprises fail-safe circuit means which causes said at least one airfield light to be deenergized in the event said remote controller microprocessor means ceases to be operative.

24. An airfield lighting system according to claim 1 or 2 wherein said at least one of said plurality of transformers comprises a secondary and wherein said secondary comprises a current transformer in series with said secondary, said current transformer providing a series-derived current source to said remote controller means.

\* \* \* \* \*